(12) United States Patent
Horstmeyer et al.

(10) Patent No.: US 10,718,934 B2
(45) Date of Patent: Jul. 21, 2020

(54) EPI-ILLUMINATION FOURIER PTYCHOGRAPHIC IMAGING FOR THICK SAMPLES

(71) Applicant: California Institute of Technology, Pasadena, CA (US)

(72) Inventors: Roarke W. Horstmeyer, San Marino, CA (US); Changhuei Yang, Alhambra, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 604 days.

(21) Appl. No.: 14/979,154

(22) Filed: Dec. 22, 2015

(65) Prior Publication Data

US 2016/0178883 A1 Jun. 23, 2016

Related U.S. Application Data

(60) Provisional application No. 62/095,648, filed on Dec. 22, 2014.

(51) Int. Cl.
| | |
|---|---|
| G02B 21/36 | (2006.01) |
| G02B 21/00 | (2006.01) |
| H04N 5/225 | (2006.01) |
| G02B 21/08 | (2006.01) |
| G02B 27/58 | (2006.01) |

(52) U.S. Cl.
CPC ....... *G02B 21/367* (2013.01); *G02B 21/0092* (2013.01); *G02B 21/084* (2013.01); *G02B 27/58* (2013.01)

(58) Field of Classification Search
CPC .............. G02B 21/367; G02B 21/0092; G02B 21/084; G02B 27/58

USPC .......................................................... 348/80
See application file for complete search history.

(56) References Cited

U.S. PATENT DOCUMENTS

| | | | |
|---|---|---|---|
| 5,475,527 | A | 12/1995 | Hackel et al. |
| 6,144,365 | A | 11/2000 | Young et al. |
| 6,154,196 | A | 11/2000 | Fleck et al. |
| 6,320,174 | B1 | 11/2001 | Tafas et al. |
| 6,320,648 | B1 | 11/2001 | Brueck et al. |
| 6,747,781 | B2 | 6/2004 | Trisnadi |
| 6,759,949 | B2 | 7/2004 | Miyahara |
| 6,905,838 | B1 | 6/2005 | Bittner |
| 7,436,503 | B1 | 10/2008 | Chen et al. |
| 7,460,248 | B2 | 12/2008 | Kurtz et al. |

(Continued)

FOREIGN PATENT DOCUMENTS

| | | |
|---|---|---|
| CN | 1688254 A | 10/2005 |
| CN | 1932565 A | 3/2007 |

(Continued)

OTHER PUBLICATIONS

Tian et al., "Multiplexed Coded illumination for Fourier Ptychography with an LED array microscope", Jul. 1, 2014, Biomedical Optics Express vol. 5, Issue 7, pp. 2376-2389. (Year: 2014).*

(Continued)

*Primary Examiner* — Matthew K Kwan
(74) *Attorney, Agent, or Firm* — Sheila Martinez-Lemke; Weaver Austin Villeneuve & Sampson LLP

(57) ABSTRACT

Certain aspects pertain to epi-illumination Fourier ptychographic imaging systems and methods for high resolution imaging of thick samples.

19 Claims, 15 Drawing Sheets

(56) References Cited

U.S. PATENT DOCUMENTS

| | | |
|---|---|---|
| 7,706,419 B2 | 4/2010 | Wang et al. |
| 7,738,095 B2 | 6/2010 | Gardner, Jr. et al. |
| 7,787,588 B1 | 8/2010 | Yun et al. |
| 8,271,251 B2 | 9/2012 | Schwartz et al. |
| 8,313,031 B2 | 11/2012 | Vinogradov |
| 8,497,934 B2 | 7/2013 | Milnes et al. |
| 8,624,968 B1 | 1/2014 | Zheng et al. |
| 8,654,201 B2 | 2/2014 | Lim et al. |
| 8,942,449 B2 | 1/2015 | Maiden |
| 9,029,745 B2 | 5/2015 | Maiden |
| 9,426,455 B2 | 8/2016 | Horstmeyer et al. |
| 9,497,379 B2 | 11/2016 | Ou et al. |
| 9,829,695 B2 | 11/2017 | Kim et al. |
| 9,864,184 B2 | 1/2018 | Ou et al. |
| 9,892,812 B2 | 2/2018 | Zheng et al. |
| 9,983,397 B2 | 5/2018 | Horstmeyer et al. |
| 9,993,149 B2 | 6/2018 | Chung et al. |
| 9,998,658 B2 | 6/2018 | Ou et al. |
| 10,162,161 B2 | 12/2018 | Horstmeyer et al. |
| 10,168,525 B2 | 1/2019 | Kim et al. |
| 10,222,605 B2 | 3/2019 | Kim et al. |
| 10,228,550 B2 | 3/2019 | Ou et al. |
| 10,401,609 B2 | 9/2019 | Ou et al. |
| 10,419,665 B2 | 9/2019 | Ou et al. |
| 10,568,507 B2 | 2/2020 | Chung et al. |
| 2001/0055062 A1 | 12/2001 | Shioda et al. |
| 2002/0141051 A1 | 10/2002 | Vogt et al. |
| 2003/0116436 A1 | 6/2003 | Amirkhanian et al. |
| 2003/0118223 A1 | 6/2003 | Rahn et al. |
| 2004/0057094 A1 | 3/2004 | Olszak et al. |
| 2004/0146196 A1 | 7/2004 | Van Heel |
| 2004/0190762 A1 | 9/2004 | Dowski, Jr. et al. |
| 2005/0211912 A1 | 9/2005 | Fox |
| 2006/0098293 A1 | 5/2006 | Garoutte et al. |
| 2006/0158754 A1 | 7/2006 | Tsukagoshi et al. |
| 2006/0173313 A1 | 8/2006 | Liu et al. |
| 2006/0291707 A1 | 12/2006 | Kothapalli et al. |
| 2007/0057184 A1 | 3/2007 | Uto et al. |
| 2007/0133113 A1 | 6/2007 | Minabe et al. |
| 2007/0159639 A1 | 7/2007 | Teramura et al. |
| 2007/0171430 A1 | 7/2007 | Tearney et al. |
| 2007/0189436 A1 | 8/2007 | Goto et al. |
| 2007/0206200 A1 | 9/2007 | Lindner et al. |
| 2007/0269826 A1* | 11/2007 | Geddes ............... G01N 33/553 435/6.11 |
| 2008/0101664 A1 | 5/2008 | Perez |
| 2008/0182336 A1 | 7/2008 | Zhuang et al. |
| 2009/0046164 A1 | 2/2009 | Shroff et al. |
| 2009/0079987 A1 | 3/2009 | Ben-Ezra et al. |
| 2009/0125242 A1 | 5/2009 | Choi et al. |
| 2009/0284831 A1 | 11/2009 | Schuster et al. |
| 2009/0316141 A1 | 12/2009 | Feldkhun |
| 2010/0135547 A1 | 6/2010 | Lee et al. |
| 2010/0271705 A1 | 10/2010 | Hung |
| 2011/0075928 A1 | 3/2011 | Jeong et al. |
| 2011/0181869 A1 | 7/2011 | Yamaguchi et al. |
| 2011/0192976 A1 | 8/2011 | Own et al. |
| 2011/0235863 A1 | 9/2011 | Maiden |
| 2011/0255163 A1* | 10/2011 | Merrill ............... G02B 5/0841 359/487.02 |
| 2012/0069344 A1 | 3/2012 | Liu |
| 2012/0099803 A1 | 4/2012 | Ozcan et al. |
| 2012/0105618 A1 | 5/2012 | Brueck et al. |
| 2012/0118967 A1 | 5/2012 | Gerst |
| 2012/0157160 A1 | 6/2012 | Ozcan et al. |
| 2012/0176673 A1* | 7/2012 | Cooper ............... G02B 21/16 359/386 |
| 2012/0182541 A1 | 7/2012 | Canham |
| 2012/0218379 A1 | 8/2012 | Ozcan et al. |
| 2012/0248292 A1 | 10/2012 | Ozcan et al. |
| 2012/0250032 A1 | 10/2012 | Wilde et al. |
| 2012/0281929 A1 | 11/2012 | Brand et al. |
| 2013/0057748 A1 | 3/2013 | Duparre et al. |
| 2013/0083886 A1 | 4/2013 | Carmi et al. |
| 2013/0093871 A1 | 4/2013 | Nowatzyk et al. |
| 2013/0094077 A1 | 4/2013 | Brueck et al. |
| 2013/0100525 A1 | 4/2013 | Chiang et al. |
| 2013/0170767 A1 | 7/2013 | Choudhury et al. |
| 2013/0182096 A1 | 7/2013 | Boccara et al. |
| 2013/0223685 A1 | 8/2013 | Maiden |
| 2014/0007307 A1 | 1/2014 | Routh, Jr. et al. |
| 2014/0029824 A1 | 1/2014 | Shi et al. |
| 2014/0043616 A1 | 2/2014 | Maiden et al. |
| 2014/0050382 A1 | 2/2014 | Adie et al. |
| 2014/0085629 A1 | 3/2014 | Bodkin et al. |
| 2014/0118529 A1 | 5/2014 | Zheng et al. |
| 2014/0126691 A1 | 5/2014 | Zheng et al. |
| 2014/0133702 A1 | 5/2014 | Zheng et al. |
| 2014/0139840 A1 | 5/2014 | Judkewitz et al. |
| 2014/0152801 A1 | 6/2014 | Fine et al. |
| 2014/0153692 A1 | 6/2014 | Larkin et al. |
| 2014/0160236 A1 | 6/2014 | Ozcan et al. |
| 2014/0160488 A1 | 6/2014 | Zhou |
| 2014/0217268 A1 | 8/2014 | Schleipen et al. |
| 2014/0267674 A1 | 9/2014 | Mertz et al. |
| 2014/0347672 A1 | 11/2014 | Pavillon et al. |
| 2014/0368812 A1 | 12/2014 | Humphry et al. |
| 2015/0003714 A1 | 1/2015 | McCarty et al. |
| 2015/0036038 A1 | 2/2015 | Horstmeyer et al. |
| 2015/0044098 A1 | 2/2015 | Smart et al. |
| 2015/0054979 A1 | 2/2015 | Ou et al. |
| 2015/0160450 A1 | 6/2015 | Ou et al. |
| 2015/0264250 A1 | 9/2015 | Ou et al. |
| 2015/0286042 A1 | 10/2015 | Hilbert et al. |
| 2015/0331228 A1 | 11/2015 | Horstmeyer et al. |
| 2016/0088205 A1 | 3/2016 | Horstmeyer et al. |
| 2016/0110584 A1 | 4/2016 | Remiszewski et al. |
| 2016/0156880 A1 | 6/2016 | Teich et al. |
| 2016/0202460 A1 | 7/2016 | Zheng |
| 2016/0210763 A1 | 7/2016 | Horstmeyer et al. |
| 2016/0216208 A1 | 7/2016 | Kim et al. |
| 2016/0216503 A1 | 7/2016 | Kim et al. |
| 2016/0266366 A1 | 9/2016 | Chung et al. |
| 2016/0320595 A1 | 11/2016 | Horstmeyer et al. |
| 2016/0320605 A1 | 11/2016 | Ou et al. |
| 2016/0341945 A1 | 11/2016 | Ou et al. |
| 2017/0061599 A1 | 3/2017 | Remiszewski et al. |
| 2017/0146788 A1 | 5/2017 | Waller et al. |
| 2017/0178317 A1 | 6/2017 | Besley et al. |
| 2017/0188853 A1 | 7/2017 | Nakao et al. |
| 2017/0273551 A1 | 9/2017 | Chung et al. |
| 2017/0299854 A1 | 10/2017 | Kim et al. |
| 2017/0354329 A1 | 12/2017 | Chung et al. |
| 2017/0363853 A1 | 12/2017 | Besley |
| 2017/0371141 A1 | 12/2017 | Besley |
| 2018/0045569 A1 | 2/2018 | Nath et al. |
| 2018/0048811 A1 | 2/2018 | Waller et al. |
| 2018/0078447 A1 | 3/2018 | Viner et al. |
| 2018/0078448 A9 | 3/2018 | Shockley, Jr. et al. |
| 2018/0088309 A1 | 3/2018 | Ou et al. |
| 2018/0120553 A1 | 5/2018 | Leshem et al. |
| 2018/0231761 A1 | 8/2018 | Dai et al. |
| 2018/0307017 A1 | 10/2018 | Horstmeyer et al. |
| 2018/0316855 A1 | 11/2018 | Ou et al. |
| 2018/0329194 A1 | 11/2018 | Small et al. |
| 2018/0348500 A1 | 12/2018 | Naaman, III et al. |
| 2018/0373016 A1 | 12/2018 | Leshem et al. |
| 2019/0049712 A1 | 2/2019 | Kim et al. |
| 2019/0056578 A1 | 2/2019 | Horstmeyer et al. |
| 2019/0077610 A1 | 3/2019 | Flammann |
| 2019/0097523 A1 | 3/2019 | Schaefer |
| 2019/0097524 A1 | 3/2019 | Lin |
| 2019/0137753 A1 | 5/2019 | Chan et al. |
| 2019/0317311 A1 | 10/2019 | Kim et al. |
| 2019/0331902 A1 | 10/2019 | Ou et al. |
| 2019/0391382 A1 | 12/2019 | Chung et al. |

FOREIGN PATENT DOCUMENTS

| | | |
|---|---|---|
| CN | 1311392 C | 4/2007 |
| CN | 101408623 A | 4/2009 |
| CN | 101680848 A | 3/2010 |
| CN | 101743519 A | 6/2010 |
| CN | 101868740 A | 10/2010 |

(56) References Cited

FOREIGN PATENT DOCUMENTS

| | | |
|---|---|---|
| CN | 101872033 A | 10/2010 |
| CN | 101957183 A | 1/2011 |
| CN | 102292662 A | 12/2011 |
| CN | 102608597 A | 7/2012 |
| CN | 102629371 A | 8/2012 |
| CN | 102652680 A | 9/2012 |
| CN | 102753935 A | 10/2012 |
| CN | 103096804 A | 5/2013 |
| CN | 103154662 A | 6/2013 |
| CN | 103201648 A | 7/2013 |
| CN | 103377746 A | 10/2013 |
| CN | 104101993 A | 10/2014 |
| CN | 104181686 A | 12/2014 |
| CN | 104200449 A | 12/2014 |
| EP | 0 760 109 B1 | 4/2007 |
| JP | 2007-299604 A | 11/2007 |
| JP | 2008-147629 A | 6/2008 |
| JP | 2010-012222 A | 1/2010 |
| KR | 10-1998-0075050 A | 11/1998 |
| TW | 201428339 A | 7/2014 |
| WO | WO 96/28751 A1 | 9/1996 |
| WO | WO 99/53469 A1 | 10/1999 |
| WO | WO 2002/102128 A1 | 12/2002 |
| WO | WO 2003/062744 A1 | 7/2003 |
| WO | WO 2008/116070 A1 | 9/2008 |
| WO | WO 2011/093043 A1 | 8/2011 |
| WO | WO 2012/037182 A1 | 3/2012 |
| WO | WO 2014/070656 A1 | 5/2014 |
| WO | WO 2015/017730 A1 | 2/2015 |
| WO | WO 2015/027188 A1 | 2/2015 |
| WO | WO 2016/090331 | 6/2016 |
| WO | WO 2016/106379 A1 | 6/2016 |
| WO | WO 2016/118761 A1 | 7/2016 |
| WO | WO 2016/123156 A1 | 8/2016 |
| WO | WO 2016/123157 A1 | 8/2016 |
| WO | WO 2016/149120 A1 | 9/2016 |
| WO | WO 2016/187591 A1 | 11/2016 |
| WO | WO 2017/066198 A1 | 4/2017 |
| WO | WO 2017081539 A1 | 5/2017 |
| WO | WO 2017081540 A1 | 5/2017 |
| WO | WO 2017081542 A2 | 5/2017 |

OTHER PUBLICATIONS

U.S. Notice of Allowance dated Aug. 23, 2016 in U.S. Appl. No. 14/466,481.
U.S. Office Action dated Aug. 16, 2016 in U.S. Appl. No. 14/065,280.
U.S. Office Action dated Sep. 16, 2016 I U.S. Appl. No. 14/065,305.
U.S. Notice of Allowance dated Nov. 2, 2016 in U.S. Appl. No. 14,572,493.
U.S. Office Action dated Nov. 22, 2016 in U.S. Appl. No. 15/003,559.
U.S. Supplemental Notice of Allowance dated Dec. 12, 2016 in U.S. Appl. No. 14/572,493.
U.S. Notice of Allowance dated Jan. 13, 2017 in U.S. Appl. No. 14/065,305.
U.S. Final Office Action dated Jan. 23, 2017 in U.S. Appl. No. 15/007,196.
U.S. Office Action dated Feb. 21, 2017 in U.S. Appl. No. 14/960,252.
U.S. Supplemental Notice of Allowability dated Mar. 2, 2017 in U.S. Appl. No. 14/065,305.
U.S. Notice of Allowance dated Mar. 8, 2017 in U.S. Appl. No. 14/572,493.
U.S. Office Action dated Mar. 13, 2017 in U.S. Appl. No. 14/658,019.
U.S. Notice of Allowance dated Mar. 22, 2017 in U.S. Appl. No. 15/007,196.
U.S. Office Action dated Mar. 24, 2017 in U.S. Appl. No. 14/710,947.
U.S. Notice of Allowance dated Mar. 31, 2017 in U.S. Appl. No. 14/572,493.
U.S. Final Office Action dated Apr. 3, 2017 in U.S. Appl. No. 14/065,280.
International Search Report and Wrtitten Opinion dated Sep. 5, 2016 issued in PCT/US2016/033638.
Chinese Office Action [Description in English] dated Jul. 11, 2016 issued in Application No. CN 201380068831.6.
Chinese Office Action [Description in English] dated Dec. 13, 2016 issued in Application No. CN201480057911.6.
Extended European Search Report dated Feb. 16, 2017 issued in Application No. 14837844.1.
Extended European Search Report dated Feb. 15, 2017 issued in Applicatoin No. 14832857.8.
Chinese Second Office Action [Description in English] dated Feb. 17, 2017 issued in Application No. CN201380068831.6.
Kim, M., et al, "High-speed synthetic aperture microscopy for live cell imaging," Optics Letters, vol. 36, No. 2, Jan. 15, 2011, pp. 148-150. <doi:10.1364/OL.36.000148>.
Lu, H., et al, "Quantitative phase imaging and complex field reconstruction by pupil modulation differential phase contrast," Optics Express, vol. 24, No. 22, Oct. 31, 2016, pp. 25345-25361. <doi:10.1364/OE.24.025345>.
Ou, X., et al, "Aperture scanning Fourier ptychographic microscopy," Biomedical Optics Express, vol. 7, No. 8, Aug. 1, 2016, pp. 3140-3150. <doi:10.1364/BOE.7.003140>.
Horstmeyer, R., et al, "Diffraction tomography with Fourier ptychography," Optica, vol. 3, No. 8, Aug. 2016, pp. 827-835. <doi:10.1364/OPTICA.3.000827>.
Bian, L., et al, "Fourier ptychographic reconstruction using Poisson maximum likelihood and truncated Wirtinger gradient," NPG: Scientific Reports 6, article No. 27384, Jun. 10, 2016, pp. 1-10. <doi:10.1038/srep27384> [URL: http://www.nature.com/scientificreports/].
Wu, J., et al, "Harmonically matched grating-based full-field quantitative high-resolution phase microscopy for observing dynamics of transparent biological samples," OSA Publ., Optics Express, vol. 15, No. 26, Dec. 24, 2007, pp. 18141-18155. <doi:10.1364/OE.15.018141>.
Wu, J., et al, "Paired-angle-rotation scanning optical coherence tomography forward-imaging probe," OSA Publ., Optics Letters, vol. 31, No. 9, May 1, 2006, pp. 1265-1267. <doi: 10.1364/OL.31.001265>.
Kawata, S. et al, "Optical microscope tomography. I. Support constraint," Journal Optical Society America A, vol. 4, No. 1, Jan. 1987, pp. 292-297. <doi:10.1364/JOSAA.4.000292>.
Chai, A., et al, "Array imaging using intensity-only measurements," IOP Publishing: Inverse Problems, vol. 27, No. 1, Jan. 2011, pp. 1-16. <doi:10.1088/0266-5611/27/1/015005> [Retrieved on Mar. 24, 2017] [URL: http://www.stacks.iop.org/IP/27/015005].
U.S. Appl. No. 15/068,389, filed Mar. 11, 2016 entitled "Correcting for Aberrations in Incoherent Imaging Systems Using Fourier Ptychographic Techniques".
U.S. Appl. No. 15/081,659, filed Mar. 25, 2016 entitled "Fourier Ptychographic Retinal Imaging Methods and Systems".
U.S. Appl. No. 15/160,941, filed May 20, 2016 entitled "Laser-Based Fourier Ptychographic Imaging Systems and Methods".
U.S. Office Action dated Oct. 5, 2015 in U.S. Appl. No. 14/065,305.
U.S. Notice of Allowance dated Dec. 4, 2015 in U.S. Appl. No. 14/065,305.
U.S. Notice of Allowance dated Jan. 14, 2016 in U.S. Appl. No. 14/448,850.
U.S. Notice of Allowance dated Jan. 22, 2016 in U.S. Appl. No. 14/466,481.
U.S. Notice of Allowance dated Apr. 13, 2016 in U.S. Appl. No. 14/448,850.
U.S. Notice of Allowance dated Apr. 22, 2016 in U.S. Appl. No. 14/466,481.
U.S. Office Action dated Jul. 14, 2016 in U.S. Appl. No. 15/007,196.
International Search Report and Written Opinion dated Feb. 21, 2014 in PCT/US2013/067068.
International Preliminary Report on Patentability dated May 14, 2015 in PCT/US2013/067068.
European Third-Party Observations, dated Jan. 20, 2016 in EP Application No. 13851670.3.
European Extended Search Report dated Mar. 31, 2016 in EP Application No. 13851670.3.
International Preliminary Report on Patentability dated Mar. 3, 2016 issued in PCT/US2014/052351.

(56) References Cited

OTHER PUBLICATIONS

International Search Report and Written Opinion dated Dec. 5, 2014 issued in PCT/US2014/052351.
International Search Report and Written Opinion dated Nov. 13, 2014 issued in PCT/US2014/049297.
International Preliminary Report on Patentability dated Feb. 11, 2016 issued in PCT/US2014/049297.
International Search Report and Written Opinion dated Feb. 22, 2016 issued in PCT/US2015/064126.
International Search Report and Written Opinion dated Apr. 19, 2016 issued in PCT/US2015/067498.
International Search Report and Written Opinion dated May 4, 2016 issued in PCT/US2016/015001.
International Search Report and Written Opinion dated May 11, 2016 issued in PCT/US2016/015002.
International Search Report and Written Opinion dated Jun. 27, 2016 issued in PCT/US2016/022116.
International Search Report and Written Opinion dated Jun. 30, 2016 issued in PCT/US2016/014343.
"About Molemap," Retrieved Oct. 23, 2015, 2 pages. [http://molemap.net.au/about-us/].
Abramomwitz, M. et al, "Immersion Media," Olympus Microscopy Resource Center, 2012, 6 pp. [http://www.olympusmicro.com/primer/anatomy/immersion.html].
Abramomwitz, M., et al, "Field Curvature," Olympus Microscopy Resource Center, 2012, 3 pp. [http://www.olympusmicro.com/primer/anatomy/fieldcurvature.html].
"Age-Related Macular Degeneration (AMD) | National Eye Institute." [Online]. Available: https://www.nei.nih.gov/eyedata/amd#top. [Accessed: Apr. 5, 2016].
Alexandrov, S., et al, "Spatial information transmission beyond a system's diffraction limit using optical spectral encoding of the spatial frequency," Journal of Optics A: Pure and Applied Optics 10, 025304 (2008).
Alexandrov, S.A., et al, "Synthetic Aperture Fourier holographic optical microscopy," Phys. Rev. Left. 97, 168102 (2006).
Arimoto, H., et al, "Integral three-dimensional imaging with digital reconstruction," Opt. Lett. 26, 157-159 (2001).
Balan, R., et al, "On signal reconstruction without phase, Applied and Computational Harmonic Analysis 20," No. 3 (2006): 345-356.
Balan, R., et al, "Painless reconstruction from magnitudes of frame coefficients," J. Fourier Anal Appl 15:488-501 (2009).
Bauschke, H.H., et al, "Phase retrieval, error reduction algorithm, and Fienup variants: a view from convex optimization," J Opt Soc Am A 19:1334-1345 (2002).
Becker, S., et al, "Templates for convex cone problems with applications to sparse signal recovery," Technical report, Department of Statistics, Stanford University, (2010), 48 Pages.
Betti, R., et al, "Observational study on the mitotic rate and other prognostic factors in cutaneous primary melanoma arising from naevi and from melanoma de novo," Journal of the European Academy of Dermatology and Venereology, 2014.
Bian, L., et al, "Fourier ptychographic reconstruction using Wirtinger flow optimization," Opt. Express 23:4856-4866 (2015).
Bian, Z., et al, "Adaptive system correction for robust Fourier ptychographic imaging," Optics express, 2013. 21(26): p. 32400-32410.
BioTek® Brochure: BioTek's Multi-Mode Microplate Reading Techonologies, 2016, 2 pp. [http://www.biotek.com].
Bishara, W., et al,"Holographic pixel super-resolution in portable lensless on-chip microscopy using a fiber-optic array," Lab Chip 11(7), 1276-1279 (2011).
Bishara, W., et al, "Lensfree on-chip microscopy over a wide field-of-view using pixel super-resolution," Opt. Express 18(11), 11181-11191 (2010).
Blum, A., et al, "Clear differences in hand-held dermoscopes," JDDG: Journal der Deutschen Dermatologischen Gesellschaft, 2006, 4(12): p. 1054-1057.
Blum, A., et al, Dermatoskopie von Hauttumoren: Auflichtmikroskopie; Dermoskopie; digitale Bildanalyse; mit 28 Tabellen. 2003: Springer DE, Chapter 4 "Dermatoskopisch sichtbare Strukturen" p. 15-66.
Born, M., et al, "Principles of Optics: Electromagnetic theory of propagation, interference and diffraction of light" 7th Ed., Cambridge Univ. Press, (1999) pp. 1-31.
Brady, D., et al, "Multiscale gigapixel photography," Nature 486, 386-389 (2012).
Burer, S., et al, "A nonlinear programming algorithm for solving semidefinite programs via low-rank factorization," Math Program, Ser B 95:329-357 (2003).
Burer, S., et al, "Local minima and convergence in low-rank semidefinite programming. Math Program," Ser A 103:427-444 (2005).
Candes, E.J., et al, "Phase retrieval via matrix completion," SIAM J. Imaging Sci. 6:199-225 (2012).
Candes, E.J., et al, "Phase retrieval via Wirtinger flow: theory and algorithms," IEEE Trans. Info. Theory 61:1985-2007 (2015).
Candes, E.J., et al, "PhaseLift: exact and stable signal recovery from magnitude measurements via convex programming.," Comm Pure Appl Math 66:1241-1274 (2013).
Carroll, J., "Adaptive optics retinal imaging: applications for studying retinal degeneration," Arch. Ophthalmol., vol. 126, pp. 857-858, 2008.
Chao, W. et al, "Soft X-ray microscopy at a spatial resolution better than 15 nm," Nature Letters, vol. 435/30, Jun. (2005) pp. 1210-1213.
Chen, T., et al, "Polarization and phase shifting for 3D scanning of translucent objects," Proc. CVPR, (2007).
Chin, L., et al, "Malignant melanoma: genetics and therapeutics in the genomic era," Genes & development, 2006, 20(16): p. 2149-2182.
Choi, W., et al, "Tomographic phase microscopy," Nature Methods 4(9) (2007), pp. 1-3 Published Online Aug. 12, 2007.
Chung, J., et al, "Counting White Blood Cells from a Blood Smear Using Fourier Ptychographic Microscopy," PLoS One 10(7), e0133489 (2015).
Chung, J., et al, "Wide field-of-view fluorescence image deconvolution with aberration-estimation from Fourier ptychography," Feb. 1, 2016, vol. 7, No. 2, Biomedical Optics Express 352.
Colomb, T., et al, "Automatic procedure for aberration compensation in digital holographic microscopy and applications to specimen shape compensation," Appl. Opt. 45, 851-863 (2006).
De Sa, C., et al, "Global convergence of stochastic gradient descent for some non convex matrix problems," Proc. 32nd Int. Conf. Machine Learning (2015), 10 pp.
Debailleul, M., et al, "High-resolution three-dimensional tomographic diffractive microscopy of transparent inorganic and biological samples," Optic Letters 34 (2008).
Denis, L., et al, "Inline hologram reconstruction with sparsity constraints," Opt. Lett. 34, pp. 3475-3477 (2009).
Di, J., et al, "High resolution digital holographic microscopy with a wide field of view based on a synthetic aperture technique and use of linear CCD scanning," Appl. Opt. 47, pp. 5654-5659 (2008).
Dierolf, M., et al, "Ptychographic coherent diffractive imaging of weakly scattering specimens," New J. Phys. 12, 035017 (2010).
Dierolf, M., et al, "Ptychographic X-ray computed tomography at the nanoscale," Nature, vol. 467, pp. 436-439, (2010).
"Doctor Mole—Skin Cancer App," Retrieved Oct. 23, 2015, 1 page. [http://www.doctormole.com].
Dong, S., et al, "FPscope: a field-portable high-resolution microscope using a cellphone lens," Biomed. Opt. Express 5(10), 3305-3310 (2014).
Dong, S., et al, "High-resolution fluorescence imaging via pattern-illuminated Fourier ptychography," Opt. Express 22(17), 20856-20870 (2014).
Dong, S., et al, "Aperture-scanning Fourier ptychography for 3D refocusing and super-resolution macroscopic imaging," pp. 13586-13599 (Jun. 2, 2014).
Eldar, Y.C., et al, "Sparse phase retrieval from short-time Fourier measurements," IEEE Signal Processing Letters 22, No. 5 (2015): 638-642.

(56) References Cited

OTHER PUBLICATIONS

Emile, O., et al, "Rotating polarization imaging in turbid media," Optics Letters 21(20), (1996).
Faulkner, H.M.L., and Rodenburg, J.M., "Error tolerance of an iterative phase retrieval algorithm for moveable illumination microscopy," Ultramicroscopy 103(2), 153-164 (2005).
Faulkner, H.M.L., and Rodenburg, J.M., "Movable aperture lensless transmission microscopy: a novel phase retrieval algorithm," Phys. Rev. Lett. 93, 023903 (2004).
Fazel, M.,"Matrix rank minimization with applications," PhD Thesis (Stanford University, Palo Alto, CA). (2002).
Feng, P., et al, "Long-working-distance synthetic aperture Fresnel off-axis digital holography," Optics Express 17, pp. 5473-5480 (2009).
Fienup, J. R., "Invariant error metrics for image reconstruction," Appl. Opt. 36(32), 8352-8357 (1997).
Fienup, J. R., "Lensless coherent imaging by phase retrieval with an illumination pattern constraint," Opt. Express 14, 498-508 (2006).
Fienup, J. R., "Phase retrieval algorithms: a comparison," Appl. Opt. 21, 2758-2769 (1982).
Fienup, J. R., "Reconstruction of a complex-valued object from the modulus of its Fourier transform using a support constraint," J. Opt. Soc. Am. A 4, 118-123 (1987).
Fienup, J. R., "Reconstruction of an object from the modulus of its Fourier transform," Opt. Lett. 3, 27-29 (1978).
Gan, X., et al, "Image enhancement through turbid media under a microscope by use of polarization gating methods," JOSA A 16(9), (1999).
Gerke T.D., et al, "Aperiodic volume optics," Nature Photonics (2010), vol. 4, pp. 188-193.
Ghosh, A., et al, "Multiview face capture using polarized spherical gradient illumination," ACM Transactions on Graphics 30(6) (2011).
Godara, P., et al, "Adaptive optics retinal imaging: emerging clinical applications.," Optom. Vis. Sci., vol. 87, No. 12, pp. 930-941, Dec. 2010.
Goodman, J.W., "Introduction to Fourier Optics," Roberts & Company Publication, Third Edition, chapters 1-6, pp. 1-172 (2005).
Goodson, A.G., et al, "Comparative analysis of total body and dermatoscopic photographic monitoring of nevi in similar patient populations at risk for cutaneous melanoma," Dermatologic Surgery, 2010. 36(7): p. 1087-1098.
Granero, L., et al, "Synthetic aperture superresolved microscopy in digital lensless Fourier holography by time and angular multiplexing of the object information," Appl. Opt. 49, pp. 845-857 (2010).
Grant, M., et al, "CVX: Matlab software for disciplined convex programming," version 2.0 beta. http://cvxr.com/cvx, (Sep. 2013), 3 pages.
Greenbaum, A., et al, "Field-portable wide-field microscopy of dense samples using multi-height pixel super resolution based lensfree imaging," Lab Chip 12(7), 1242-1245 (2012).
Greenbaum, A., et al, "Increased space-bandwidth product in pixel super-resolved lensfree on-chip microscopy," Sci. Rep. 3, p. 1717 (2013).
Gruev, V., et al, "Dual-tier thin film polymer polarization imaging sensor," Optics Express, vol. 18, No. 18, 12 pages (2010).
Guizar-Sicairos, M., and Fienup, J.R.,"Phase retrieval with transverse translation diversity: a nonlinear optimization approach," Opt. Express 16, 7264-7278 (2008).
Gunturk, B.K., et al, "Image Restoration: Fundamentals and Advances," vol. 7, Chapter 3, pp. 63-68 (CRC Press, 2012).
Gustafsson, M.G.L., "Surpassing the lateral resolution limit by a factor of two using structured illumination microscopy," J. Microsc. 198, 82-87 (2000).
Gutzler, T., et al, "Coherent aperture-synthesis, wide-field, high-resolution holographic microscopy of biological tissue," Opt. Lett. 35, pp. 1136-1138 (2010).
Haigh, S. J., et al, (2009) "Atomic structure imaging beyond conventional resolution limits in the transmission electron microscope"; Physical Review Letters 103. 126101-1 126101-4.
Han, C., et al, "Wide Field-of-View On-Chip Talbot Fluorescence Microscopy for Longitudinal Cell Culture Monitoring from within the Incubator" Anal. Chem. 85(4), 2356-2360 (2013).
Hillman, T.R., et al, "High-resolution, wide-field object reconstruction with synthetic aperture Fourier holographic optical microscopy," Opt. Express 17, pp. 7873-7892 (2009).
Hofer, H., et al, "Dynamics of the eye's wave aberration," J. Opt. Soc. Am. A, vol. 18, No. 3, p. 497, 2001.
Hofer, H., et al, "Organization of the human trichromatic cone mosaic.," J. Neurosci., vol. 25, No. 42, pp. 9669-9679, Oct. 2005.
Hong, S-H., et al, "Three-dimensional volumetric object reconstruction using computational integral imaging," Opt. Express 12, 483-491 (2004).
Hoppe, W., "Diffraction in inhomogeneous primary wave fields. 1. Principle of phase determination from electron diffraction interference," Acta Crystallogr. A25, 495-501 1969.
Horstmeyer, R., et al, "A phase space model of Fourier ptychographic microscopy," Optics Express, 2014. 22(1): p. 338-358.
Horstmeyer, R., et al, "Digital pathology with fourier ptychography," Comput. Med. Imaging Graphics 42, 38-43 (2015).
Horstmeyer, R., et al, "Overlapped fourier coding for optical aberration removal," Manuscript in preparation, 19 pages (2014).
Horstmeyer, R., et al, "Solving ptychography with a convex relaxation," Physics Optics (2014) 1-8 pages.
Hüe, F., et al, "Wave-front phase retrieval in transmission electron microscopy via ptychography," Phys. Rev. B 82, 121415 (2010).
Humphry, M., et al, "Ptychographic electron microscopy using high-angle dark-field scattering for sub-nanometre resolution imaging," Nat. Commun. 3, 730 (2012).
IncuCyte® ZOOM System, Brochure, 1-4 pp. (2016) (retrieved Feb. 25, 2016), [http://www.essenbioscience.com/media/uploads/files/8000-0333-E00-IncuCyte ZOOM brochure.pdf].
Jaganathan, K., et al, "Recovery of sparse 1-D signals from the magnitudes of their Fourier transform," IEEE International Symposium on Information Theory Proceedings (2012): 1473-1477.
Jaganathan, K., et al, "Phase retrieval with masks using convex optimization," IEEE International Symposium on Information Theory Proceedings (2015): 1655-1659.
Jaganathan, K., et al, "STFT Phase retrieval: uniqueness guarantees and recovery algorithms," arXiv preprint arXiv:1508.02820 (2015).
Joeres, S., et al, "Retinal imaging with adaptive optics scanning laser ophthalmoscopy in unexplained central ring scotoma.," Arch. Ophthalmol., vol. 126, No. 4, pp. 543-547, Apr. 2008.
Jung, J.H., et al, "Microfluidic-integrated laser-controlled microactuators with on-chip microscopy imaging functionality," Lab Chip 14 (19), Oct. 7, 2014, pp. 3781-3789.
Kay, D. B., et al, "Outer retinal structure in best vitelliform macular dystrophy.," JAMA Ophthalmol., vol. 131, pp. 1207-1215, 2013.
Kim, J., et al, Incubator embedded cell culture imaging system (EmSight) based on Fourier ptychographic microscopy. EmSight manuscript, Optical Society of America, 2015.
Kim, M., et al, "High-speed synthetic aperture microscopy for live cell imaging," Opt. Left. 36, pp. 148-150 (2011).
Kirkland, A.I., et al, "Multiple beam tilt microscopy for super resolved imaging;" Japanese Society of Electron Microscopy: Journal of Electron Microscopy I: 11-22(1997), vol. 46, No. 1 1997.
Kirkland, A.I., et al, "Super-resolution by aperture synthesis: tilt series reconstruction in CTEM," Ultramicroscopy 57, (1995) 355-374, Received May 27, 1994, in final form Oct. 2, 1994; 1995 Elsevier Science B.V. SSDI 0304-3991(94)00191-x.
Kittler, H., et al, "Morphologic changes of pigmented skin lesions: a useful extension of the ABCD rule for dermatoscopy," Journal of the American Academy of Dermatology, 1999. 40(4): p. 558-562.
Kozak, I., "Retinal imaging using adaptive optics technology.," Saudi J. Ophthalmol. Off. J. Saudi Ophthalmol. Soc., vol. 28, No. 2, pp. 117-122, Apr. 2014.
Lauer, V., "New Approach to optical diffraction tomography yielding a vector equation of diffraction tomography and a novel tomography microscope," Journal of Microscopy, vol. 205, Pt 2 Feb. 2002, pp. 165-176, The Royal Microscopical Society 2001.
Lee, K., et al, "Synthetic Fourier transform light scattering," Optics Express 21 (2013).

(56) References Cited

OTHER PUBLICATIONS

Levoy, M., et al, "Light field microscopy," ACM Trans. Graphics 25, (2006).

Levoy, M., et al, "Recording and controlling the 4D light field in a microscope using microlens arrays," J. Microsc. 235 (2009).

Li, X., et al, "Sparse signal recovery from quadratic measurements via convex programming," SIAM Journal on Mathematical Analysis 45, No. 5 (2013): 3019-3033.

Lohmann, A. W., et al, "Space-bandwidth product of optical signals and systems," J. Opt. Soc. Am. A 13, pp. 470-473 (1996).

Lue, N., et al, "Live Cell Refractometry Using Hilbert Phase Microscopy and Confocal Reflectance Microscopy," The Journal of Physical Chemistry A, 113, pp. 13327-13330 (2009).

Luxexcel® Brochure, Luxexcel: 3D Printing Service Description, Retrieved Mar. 7, 2016, 5 pp. [http://www.luxexcel.com].

"Lytro," Retrieved Oct. 23, 2015, 6 pp. [https://www.lytro.com/].

Ma, W., et al, "Rapid Acquisition of Specular and Diffuse Normal Maps from Polarized Spherical Gradient Illumination," University of Southern California, Institute for Creative Technologies, 12 pages (2007).

Mahajan, V. N., "Zernike circle polynomials and optical aberrations of systems with circular pupils," Appl. Opt. 33(34), 8121-8124 (1994).

Maiden, A. M., et al, "A new method of high resolution, quantitative phase scanning microscopy," in: M.T. Postek, D.E. Newbury, S.F. Platek, D.C. Joy (Eds.), SPIE Proceedings of Scanning Microscopy, 7729, 2010.

Maiden, A. M., et al, "An improved ptychographical phase retrieval algorithm for diffractive imaging," Ultramicroscopy 109(10), 1256-1262 (2009).

Maiden, A. M., et al, "Superresolution imaging via ptychography," Journal of the Optical Society of America A. Apr. 2011, vol. 28 No. 4, pp. 604-612.

Maiden, A. M., et al, "Optical ptychography: a practical implementation with useful resolution," Opt. Lett. 35, 2585-2587 (2010).

Marchesini S., "A unified evaluation of iterative projection algorithms for phase retrieval," Rev Sci Instrum 78:011301 (2007).

Marchesini S., et al, "Augmented projections for ptychographic imaging," Inverse Probl 29:115009 (2013).

Marrison, J., et al, "Ptychography—a label free, high-contrast imaging technique for live cells using quantitative phase information," Sci. Rep. 3, 2369 (2013).

Medoff, B.P., et al, "Iterative convolution backprojection algorithms for image reconstruction from limited data," J. Opt. Soc. Am. vol. 73, No. 11, Nov. 1983, pp. 1493-1500.

"Melafind," Retrieved Oct. 23, 2015, 4 pages. [http://www.melafind.com/].

Meyer, R.R., et al, "A method for the determination of the wave aberration function of high-resolution TEM," Ultramicroscopy 99 (2004) 115-123: Elsevier B.V. Doi: 10.1016/j.ultramic.2003.11.001.

Miao, J., et al, "High Resolution 3D X-Ray Diffraction Microscopy," Physical Review Letters, Aug. 19, 2002, vol. 89, No. 8, pp. 1-4.

Mico, V., et al, "Synthetic aperture microscopy using off-axis illumination and polarization coding," Optics Communications, pp. 276, 209-217 (2007).

Mico, V., et al, "Synthetic aperture superresolution with multiple off-axis holograms," JOSA A 23, pp. 3162-3170 (2006).

Mir, M. et al, "Optical measurement of cycle-dependent cell growth," Proceedings of the National Academy of Sciences 108, pp. 13124-13129 (2011).

Mir, M., et al, "Blood screening using diffraction phase cytometry," Journal of Biomedical Optics 15, pp. 027016-027014 (2010).

Moreno, I., "Creating a desired lighting pattern with an LED array," 8th International Conference on Solid State Lighting, Proceedings of SPIE, vol. 7058, 2008, 9 pp.

Mrejen, S., et al, "Adaptive optics imaging of cone mosaic abnormalities in acute macular neuroretinopathy.," Ophthalmic Surg. Lasers Imaging Retina, vol. 45, No. 6, pp. 562-569, Jan. 2014.

Nayar, S. K., et al, "Fast separation of direct and global components of a scene using high frequency illumination," ACM Transactions on Graphics 25(3) (2006).

Ng, R., et al, "Light field photography with a hand-held plenoptic camera", Computer Science Technical Report CSTR, 2005. 2(11).

Nomura, H., and Sato, T., "Techniques for measuring aberrations in lenses used in photolithography with printed patterns," Appl. Opt. 38(13), 2800-2807 (1999).

Ohlsson, H., et al, "Compressive phase retrieval from squared output measurements via semidefinite programming," arXiv:1111.6323 (2011).

Ou, X., et al, "High numerical aperture Fourier ptychography: principle, implementation and characterization," Opt. Express 23:3472-3491 (2015).

Ou, X., et al, "Quantitative phase imaging via Fourier ptychographic microscopy," Optics Letters, 2013. 38(22): p. 4845-4848.

Ou. X., et al, "Embedded pupil function recovery for Fourier ptychographic microscopy," Optics Express 22 (5), pp. 4960-4972 (2014), with Erratum (2015).

Ou. X., et al, "Embedded pupil function recovery for Fourier ptychographic microscopy," submitted Dec. 26, 2013; 13 pp.

Pacheco, S., et al, "Reflective Fourier Ptychography," J. Biomed. Opt. 21(2), pp. 026010-1-026010-7, (Feb. 18, 2016). [http://biomedicaloptics.spiedigitallibrary.org].

Recht, B., et al, "Guaranteed minimum-rank solutions of linear matrix equations via nuclear norm minimization," SIAM Review 52, No. 3 (2010): 471-501.

Reinhard, E., et al, "High Dynamic Range Imaging: Acquisition, Display, and Image-based Lighting" (Morgan Kaufmann, 2010).

Rodenburg, J. M., et al, "A phase retrieval algorithm for shifting illumination," Appl. Phys. Lett. 85, 4795-4797 (2004).

Rodenburg, J. M., et al, "Hard-X-ray lensless imaging of extended objects," Phys. Rev. Lett. 98, 034801 (2007).

Rodenburg, J. M., et al, "The theory of super-resolution electron microscopy via Wigner-distribution deconvolution," Phil. Trans. R. Soc. Lond. A 339, 521-553 (1992).

Rodenburg, J., "Ptychography and related diffractive imaging methods," Adv. Imaging Electron Phys.150, 87-184 (2008).

Rossi, E.A., et al, "In vivo imaging of retinal pigment epithelium cells in age related macular degeneration.," Biomed. Opt. Express, vol. 4, No. 11, pp. 2527-2539, Jan. 2013.

Rowe, M., et al, "Polarization-difference imaging: a biologically inspired technique for observation through scattering media," Optics Letters, vol. 20, No. 6, 3 pages (1995).

Schechner, Y., "Multiplexing for Optimal Lighting," IEEE Transactions on Pattern Analysis and Machine Intelligence, vol. 29, No. 8, 1339-1354 (2007).

Schnars, U., et al, "Digital recording and numerical reconstruction of holograms," Measurement Science and Technology, 13, R85 (2002).

Schwarz, C., et al, "Imaging interferometric microscopy," Optics letters 28, pp. 1424-1426 (2003).

Shechner, Y., et al, "Polarization-based vision through haze," Applied Optics 42(3), (2003).

Shechtman, Y., et al, "Sparsity based sub-wavelength imaging with partially incoherent light via quadratic compressed sensing," Opt Express 19:14807-14822 (2011).

Siegel, R., et al, "Cancer statistics 2013," CA: a cancer journal for clinicians, 2013. 63(1): p. 11-30.

Stoecker, W., et al, "Diagnostic Inaccuracy of Smartphone Applications for Melanoma Detection: Representative Lesion Sets and the Role for Adjunctive Technologies," JAMA Dermatology, 2013. 149(7): p. 884.

Sun, D., et al, "Estimating a signal from a magnitude spectrogram via convex optimization," arXiv:1209.2076 (2012).

Sun, J., et al, "Coded multi-angular illumination for Fourier ptychography based on Hadamard codes," 5 pages (2015).

Tam, K., et al, "Tomographical imaging with limited-angle input," J. Opt. Soc. Am. 21 (1981).

Thibault, P. et al, "Probe retrieval in ptychographic coherent diffractive imaging," Ultramicroscopy 109(4), 338-343 (2009).

Thibault, P., et al, "High-resolution scanning X-ray diffraction microscopy," Science 321, 2008, pp. 379-382.

(56) References Cited

OTHER PUBLICATIONS

Thomas, L., et al, "Semiological value of ABCDE criteria in the diagnosis of cutaneous pigmented tumors," Dermatology, 1998. 197(1): p. 11-17.
Tian, L., et al, "Multiplexed Coded Illumination for Fourier Ptychography with an LED Array Microscope," Optical Society of America, 14 pages (2014).
Tippie, A.E., et al, "High-resolution synthetic-aperture digital holography with digital phase and pupil correction," Opt. Express 19, pp. 12027-12038 (2011).
Turpin, T., et al, "Theory of the synthetic aperture microscope," pp. 230-240 (1995).
Tyson, R., "Principles of Adaptive Optics" (CRC Press, 2010).
Vulovic, M., et al, "When to use the projection assumption and the weak-phase object approximation in phase contrast cryo-EM," Ultramicroscopy 136 (2014) 61-66.
Waldspurger, I., et al, "Phase recovery, maxcut and complex semidefinite programming," Mathematical Programming 149, No. 1-2 (2015): 47-81.
Wang, Q., et al, "Adaptive Optics Microperimetry and OCT Images Show Preserved Function and Recovery of Cone Visibility in Macular Telangiectasia Type 2 Retinal Lesions," Invest. Ophthalmol. Vis. Sci., vol. 56, pp. 778-786 (2015).
Wang, Z., et al, "Tissue refractive index as marker of disease," Journal of Biomedical Optics 16, 116017-116017 (2011).
Watanabe, M., et al, "Telecentric optics for focus analysis," IEEE trans. pattern. anal. mach. intell., 19 1360-1365 (1997).
Wesner, J., et al, "Reconstructing the pupil function of microscope objectives from the intensity PSF," in Current Developments in Lens Design and Optical Engineering III, R. E. Fischer, W. J. Smith, and R. B. Johnson, eds., Proc. SPIE 4767, 32-43 (2002).
Williams, A., et al, "Fourier ptychographic microscopy for filtration-based circulating tumor cell enumeration and analysis," J. Biomed. Opt. 19(6), 066007 (2014).
Wolf, J., et al, "Diagnostic Inaccuracy of Smartphone Applications for Melanoma Detection," JAMA Dermatology, 2013, 149(7): p. 885-885.
Wu, J., et al, "Focal plane tuning in wide-field-of-view microscope with Talbot pattern illumination," Opt. Lett. 36, 2179-2181 (2011).
Wu, J., et al, "Wide field-of-view microscope based on holographic focus grid illumination," Opt. Lett. 35, 2188-2190 (2010).
Xu, W., et al, "Digital in-line holography for biological applications," Proc. Natl Acad. Sci. USA 98, pp. 11301-11305 (2001).
Yuan, C., et al, "Angular multiplexing in pulsed digital holography for aperture synthesis," Optics Letters 33, pp. 2356-2358 (2008).
Zeiss, C., "Microscopy, Cells Need the Perfect Climate, System Solutions for Live Cell Imaging under Physiological Conditions," printed Feb. 2008, 1-42 pgs.
Zhang, Y., et al, "Self-learning based fourier ptychographic microscopy," Optics Express, 16pgs (2015).
Zhang, Y., et al, "Photoreceptor Perturbation Around Subretinal Drusenoid Deposits as Revealed by Adaptive Optics Scanning Laser Ophthalmoscopy," Am. J. Ophthalmol., vol. 158, No. 3, pp. 584-596, 2014.
Zheng, G., et al, "Characterization of spatially varying aberrations for wide field-of-view microscopy," Opt. Express 21, 15131-15143 (2013).
Zheng, G., et al, "Microscopy refocusing and dark-field imaging by using a simple LED array," Opt. Lett. 36, 3987-3989 (2011).
Zheng, G., et al, "0.5 gigapixel microscopy using a flatbed scanner," Biomed. Opt. Express 5, 1-8 (2014).
Zheng, G., et al, "Sub-pixel resolving optofluidic microscope for on-chip cell imaging," Lab Chip 10, pp. 3125-3129 (2010).
Zheng, G. "The ePetri dish, an on-chip cell imaging platform based on subpixel perspective sweeping microscopy (SPSM)," Proc. Natl. Acad. Sci. USA 108, pp. 16889-16894 (2011).
Zheng, G., et al, "Wide-field, high-resolution Fourier ptychographic microscopy," Nature Photonics, vol. 7, pp. 739-745, Published Online Jul. 28, 2013 at www.nature.com/naturephotonics.
Chung, J., et al, "Wide-field Fourier ptychographic microscopy using laser illumination source," Optical Society of America, 13 pgs., Mar. 23, 2016.
Guo, K., et al, "Optimization of sampling pattern and the design of Fourier ptychographic illuminator," Optical Society of America; Optics Express , vol. 23, No. 5, pp. 6171-6180 (2015).
Phillips, Z., et al, "Multi-Contrast Imaging and Digital Refocusing on a Mobile Microscope with a Domed LED Array," PLoS One, 10 (5), pp. 1-13 (2015).
Horstmeyer, R., et al, "Standardizing the resolution claims for coherent microscopy," Nature Photonics, vol. 10, pp. 68-71, Feb. 2016.
Horstmeyer, R., et al, "Solving ptychography with a convex relaxation," New Journal of Physics, vol. 17 (2015) 1-14 pages.
Preliminary Amendment dated Mar. 17, 2014 filed in U.S. Appl. No. 14/065,280.
Preliminary Amendment dated Apr. 25, 2016 filed in U.S. Appl. No. 14/710,947.
Preliminary Amendment dated Nov. 28, 2016 filed in U.S. Appl. No. 15/206,859.
Preliminary Amendment dated Mar. 17, 2014 filed in U.S. Appl. No. 14/065,305.
Preliminary Amendment dated Nov. 28, 2016 filed in U.S. Appl. No. 15/209,604.
U.S. Notice of Allowance dated Jun. 9, 2017 in U.S. Appl. No. 14/065,305.
U.S. Notice of Allowance dated Jun. 9, 2017 in U.S. Appl. No. 15/206,859.
U.S. Notice of Allowance dated Jun. 9, 2017 in U.S. Appl. No. 15/007,196.
U.S. Notice of Allowance dated Jun. 20, 2017 in U.S. Appl. No. 14/572,493.
U.S. Supplemental Notice of Allowance dated Jun. 28, 2017 in U.S. Appl. No. 15/206,859.
U.S. Final Office Action dated Jul. 27, 2017 in U.S. Appl. No. 15/003,559.
U.S. Notice of Allowance dated Aug. 16, 2017 in U.S. Appl. No. 15/209,604.
Office Action dated Aug. 31, 2017 in U.S. Appl. No. 15/636,494.
U.S. Notice of Allowance dated Sep. 1, 2017 in U.S. Appl. No. 15/206,859.
Office Action dated May 19, 2017 in U.S. U.S. Appl. No. 15/081,659.
Notice of Allowance dated Sep. 20, 2017 in U.S. Appl. No. 15/007,196.
Notice of Allowance dated Oct. 11, 2017 in U.S. Appl. No. 14/572,493.
Notice of Allowance dated Oct. 20, 2017 in U.S. Appl. No. 15/081,659.
Office Action dated Nov. 3, 2017 in U.S. Appl. No. 15/068,389.
Office Action dated Nov. 30, 2017 in U.S. Appl. No. 15/007,159.
Notice of Allowance dated Dec. 4, 2017 in U.S. Appl. No. 14/065,305.
Final Office Action dated Dec. 14, 2017 in U.S. Appl. No. 14/960,252.
Final Office Action dated Dec. 28, 2017 in U.S. Appl. No. 14/710,947.
Final Office Action dated Jan. 17, 2018 in U.S. Appl. No. 14/658,019.
Notice of Allowance dated Jan. 23, 2018 in U.S. Appl. No. 15/206,859.
Office Action dated Jan. 25, 2018 in U.S. Appl. No. 14/065,280.
Notice of Allowance dated Jan. 26, 2018 in U.S. Appl. No. 15/209,604.
Notice of Allowance dated Feb. 9, 2018 in U.S. Appl. No. 15/081,659.
Office Action dated Apr. 4, 2018 issued in U.S. Appl. No. 15/003,559.
Office Action dated Apr. 13, 2018 issued in U.S. Appl. No. 15/160,941.
Chinese Office Action [Description in English] dated May 31, 2016 issued in Application No. CN 201380068831.6.
Chinese Second Office Action [Description in English] dated Jan. 22, 2017 issued in Application No. CN201380068831.6.
International Preliminary Report on Patentability dated Jun. 15, 2017 issued in Application No. PCT/US2015/064126.
European Office Action dated May 16, 2017 issued in European Patent Application No. 13851670.3.
International Preliminary Report on Patentability dated Jul. 6, 2017 issued in Application No. PCT/US2015/067498.
International Preliminary Report on Patentability dated Aug. 3, 2017 issued in Application No. PCT/US2016/014343.

(56) References Cited

OTHER PUBLICATIONS

International Preliminary Report on Patentability dated Aug. 10, 2017 issued in Application No. PCT/US2016/015001.
International Preliminary Report on Patentability dated Aug. 10, 2017 issued in Application No. PCT/US2016/015002.
Chinese Third Office Action [Summary in English] dated Jul. 24, 2017 issued in Application No. 201380068831.6.
Chinese First Office Action [Summary in English] dated Aug. 2, 2017 issued in Application No. CN 201480054301.0.
Australian Office Action dated Sep. 18, 2017 issued in Application No. AU 2014296034.
International Preliminary Report on Patentability dated Sep. 28, 2017 issued in Application No. PCT/US2016/022116.
Japanese Office Action dated Oct. 17, 2017 issued in Application No. 2015-539884.
Chinese Office Action [Summary in English] dated Oct. 26, 2017 issued in CN 201480057911.6.
International Preliminary Report on Patentability dated Nov. 30, 2017 issued in PCT/US2016/033638.
Australian Examination Report 1/Office Action dated Jan. 18, 2018 issued in AU 2014308673.
Chinese First Office Action dated Feb. 24, 2018 issued in CN 201680003937.1.
Abrahamsson, S., et al., "Fast multicolor 3D imaging using aberration-corrected mulitfocus microscopy," Brief Communications: Nature Methods, vol. 10, No. 1, Jan. 2013, pp. 60-65. <doi:10.1038/nmeth.2277>.
Bunk, O., et al, "Influence of the overlap parameter on the convergence of the ptychographical iterative engine," Ultramicroscopy, vol. 108, (2008), pp. 481-487. <doi: 10.1016/j.ultramic.2007.08.003>.
Holloway, J., et al. "SAVI: Synthetic apertures for long-range, subdiffraction-limited visible imaging using Fourier ptychography," Science Advances | Research Article, vol. 3, No. 4, Apr. 14, 2017, pp. 1-11. <doi:10.1126/sciadv.1602564> [retrieved on Nov. 28, 2017] <URL:http://advances.sciencemag.org/>.
Hoppe, W., "Diffraction in inhomogeneous primary wave fields. 1. Principle of phase determination from electron diffraction interference." Acta Crystallographica Section a-Crystal Physics Diffraction Theoretical and General Crystallography, A25, Jan. 1, 1969, pp. 495-501. (English Machine Translation Incl.).
Kner, P., "Phase diversity for three-dimensional imaging," Journal of the Optical Society of America A, vol. 30, No. 10, Oct. 1, 2013, pp. 1980-1987. <doi:10.1364/JOSAA.30.001980>.
Reinhard, E., et al, "High Dynamic Range Imaging: Acquisition, Display, and Image-based Lighting" Second Edition § 5.2 HDR Image Capture: Morgan Kaufmann, May 28, 2010, pp. 148-151. <ISBN: 9780123749147>.
Sankaranarayanan, Aswin C., et al, "CS-MUVI: Video Compressive Sensing for Spatial-Multiplexing Cameras," Proceedings of the IEEE International Conference Computational Photography (ICCP), Apr. 2012, pp. 11. <doi:10.1109/ICCPhot.2012.6215212>.
Tian, L., et al, "3D differential phase-contrast microscopy with computational illumination using an LED array," Optics Letters, vol. 39, No. 5, Mar. 1, 2014, pp. 1326-1329. <doi:10.1364/OL39.001326>.
Tian, L., et al, "Computational illumination for high-speed in vitro Fourier ptychographic microscopy," Optica: Research Article, vol. 2, No. 10, Oct. 14, 2015, pp. 904-911. <doi:10.1364/OPTICA.2.000904>.
Wills, S., "Synthetic Apertures for the Optical Domain," Optics & Photonics News Article [webpage], The Optical Society (OSA), Apr. 18, 2017, pp. 2. <URL:https://www.osa-opn.org/home/newsroom/2017/april/synthetic_apertures_for_the_optical_domain/>.
Yeh, et al., "Experimental robustness of Fourier ptychography phase retrieval algorithms," Optics Express, vol. 23, No. 26, Dec. 28, 2015, pp. 33214-33240. <doi: 10.1364/OE.23.033214>.

Zheng, G., "Fourier Ptychographic Imaging: A MATLAB tutorial," IOP Concise Physics, Morgan & Claypool Publication, San Rafael, CA., May 2016, pp. 96. <ISBN: 978-1-6817-4272-4 (ebook)> <doi: 10.1088/978-1-6817-4273-1>.
Zheng, G., et al, "Wide-field, high-resolution Fourier ptychographic microscopy," Nature Photonics, vol. 7, Sep. 2013, Published Online Jul. 28, 2013, pp. 739-746. <doi:10.1038/NPHOTON.2013.187>.
Preliminary Amendment dated Jun. 13, 2018 filed in U.S. Appl. No. 15/820,295.
U.S. Final Office Action dated Nov. 29, 2018 in U.S. Appl. No. 14/065,280.
U.S. Office Action dated Dec. 26, 2018 in U.S. Appl. No. 15/963,966.
U.S. Office Action dated Dec. 26, 2018 in U.S. Appl. No. 15/959,050.
U.S. Notice of Allowance dated Sep. 17, 2018 in U.S. Appl. No. 15/820,295.
U.S. Office Action dated Oct. 4, 2018 in U.S. Appl. No. 14/658,019.
U.S. Notice of Allowance dated Jul. 25, 2018 in U.S. Appl. No. 14/710,947.
U.S. Office Action dated Dec. 13, 2018 in U.S. Appl. No. 14/960,252.
U.S. Notice of Allowance dated Jun. 27, 2018 in U.S. Appl. No. 15/636,494.
U.S. Notice of Allowance dated Oct. 5, 2018 in U.S. Appl. No. 15/636,494.
U.S. Notice of Allowance dated Jul. 16, 2018 in U.S. Appl. No. 15/007,159.
U.S. Final Office Action dated Dec. 10, 2018 issued in U.S. Appl. No. 15/003,559.
U.S. Office Action Interview Summary dated May 3, 2018 in U.S. Appl. No. 15/068,389.
U.S. Final Office Action dated Jun. 6, 2018 issued in U.S. Appl. No. 15/068,389.
U.S. Notice of Allowance dated Oct. 19, 2018 issued in U.S. Appl. No. 15/160,941.
Japanese First Office Action dated Jul. 31, 2018 issued in Application No. JP 2016-531919.
European Extended Search Report dated Jun. 6, 2018 issued in Application No. 15865492.1.
Extended European Search Report dated Aug. 8, 2018 issued in Application No. EP 16744002.3.
European Extended Search Report dated Aug. 14, 2018 issued in EP 16744003.1.
Extended European Search Report dated Jul. 3, 2018 issued in Application No. EP 15874344.3.
Extended European Search Report dated Sep. 12, 2018 issued in Application No. EP 16740769.1.
Chinese Second Office Action dated Jul. 3, 2018 issued in Application No. CN 201480054301.0.
Extended European Search Report dated Oct. 25, 2018 issued in Application No. EP 16765505.9.
Chinese Third Office Action dated Jul. 13, 2018 issued in CN 201480057911.6.
Godden, T.M. et al., "Ptychographic microscope for three-dimensional imaging," Optics Express, vol. 22, No. 10, May 19, 2014, pp. 12513-12523.
Jacques, et al., "Imaging Superficial Tissues With Polarized Light," Lasers in Surgery and Medicine, vol. 26, No. 2, Apr. 25, 2000, pp. 119-129.
Jensen, et al. "Types of imaging, Part 2: An Overview of Fluorescence Microscopy." The Anatomical Record, vol. 295, No. 10, Oct. 1, 2012, pp. 1621-1627.
Maiden, A.M., et al., "Ptychographic transmission microscopy in three dimensions using a multi-slice approach," Journal of the Optical Society of America A., vol. 29, No. 8, Aug. 1, 2012, pp. 1606-1614.
Sarder, et al. "Deconvolution Methods for 3-D Fluorescence Microscopy Images," IEEE Signal Processing Magazine, vol. 23, No. 3, May 2006, pp. 32-45.
U.S. Appl. No. 16/162,271, filed Oct. 16, 2018, Kim et al.
U.S. Appl. No. 16/171,270, filed Oct. 25, 2018, Horstmeyer et al.
U.S. Appl. No. 16/179,688, filed Nov. 2, 2018, Chan et al.
U.S. Appl. No. 16/242,934, filed Jan. 8, 2019, Kim et al.
U.S. Office Action dated Jun. 26, 2019 issued in U.S. Appl. No. 14/065,280.

(56) References Cited

OTHER PUBLICATIONS

U.S. Notice of Allowance dated Apr. 19, 2019 in U.S. Appl. No. 15/963,966.
U.S. Final Office Action dated Jun. 3, 2019 in U.S. Appl. No. 15/959,050.
U.S. Notice of Allowance dated Nov. 20, 2019 in U.S. Appl. No. 15/959,050.
U.S. Notice of Allowance dated Jan. 14, 2019 in U.S. Appl. No. 15/820,295.
U.S. Notice of Allowance dated Apr. 16, 2019 in U.S. Appl. No. 15/820,295.
U.S. Final Office Action dated May 30, 2019 in U.S. Appl. No. 14/658,019.
U.S. Office Action dated Mar. 8, 2019 in U.S. Appl. No. 16/171,270.
U.S. Notice of Allowance dated Aug. 12, 2019 in U.S. Appl. 14/960,252.
U.S. Notice of Allowance dated Sep. 17, 2019 in U.S. Appl. No. 14/960,252.
U.S. Ex Parte Quayle Action dated Aug. 8, 2019 issued in U.S. Appl. No. 16/242,934.
U.S. Notice of Allowance dated Nov. 4, 2019 issued in U.S. Appl. No. 16/242,934.
U.S. Office Action dated Apr. 4, 2019 in U.S. Appl. No. 16/162,271.
U.S. Office Action dated Jun. 26, 2019 issued in U.S. Appl. No. 15/003,559.
U.S. Office Action dated Jan. 17, 2019 issued in U.S. Appl. No. 15/068,389.
U.S. Final Office Action dated Jun. 19, 2019 issued in U.S. Appl. No. 15/068,389.
U.S. Notice of Allowance dated Sep. 16, 2019 issued in U.S. Appl. No. 15/068,389.
U.S. Office Action dated Sep. 23, 2019 issued in U.S. Appl. No. 16/252,465.
U.S. Notice of Allowance dated Jan. 15, 2019 issued in U.S. Appl. No. 15/620,674.
U.S. Notice of Allowance dated Apr. 29, 2019 issued in U.S. Appl. No. 15/620,674.
U.S. Notice of Allowance dated Aug. 14, 2019 issued in U.S. Appl. No. 15/620,674.
U.S. Notice of Allowance dated Sep. 25, 2019 issued in U.S. Appl. No. 15/620,674.
U.S. Office Action dated Oct. 11, 2019 issued in U.S. Appl. No. 16/179,688.
Chinese First Office Action dated Jan. 28, 2019 issued in CN 201580072950.8.
Chinese First Office Action dated Dec. 28, 2018 issued in Application No. CN 201680005491.6.
Chinese First Office Action dated Apr. 19, 2019 issued in Application No. CN 201680006738.6.
Chinese First Office Action dated Dec. 26, 2018 issued in Application No. CN 201580067354.0.
Chinese First Office Action dated Apr. 19, 2019 issued in Application No. CN 201680014898.5.
International Search Report and Written Opinion dated Feb. 22, 2019 issued in PCT/US2018/059059.
Adie, et al., "Computational adaptive optics for broadband optical interferometric tomography of biological tissue," Proc. Natl. Acad. Sci. USA 109, 7175-7180 (May 8, 2012).
Bian, et al., "Content adaptive illumination for Fourier ptychography," Optics Letters, vol. 39, Aug. 2014, pp. 1-6.
Bioucas-Dias, et al., "Total variation-based image deconvolution: a majorization-minimization approach," ICASSP (2), pp. 861-864 (May 14, 2006).
Booth, "Adaptive optical microscopy: the ongoing quest for a perfect image," Light Sci. Appl. 3, e165 (Apr. 25, 2014).
Chung, et al., "Computational aberration compensation by coded-aperture-based correction of aberration obtained from optical Fourier coding and blur estimation," Optica, vol. 6, May 10, 2019, pp. 647-661.
Desjardins, et al., "Angle-resolved Optical Coherence Tomography with sequential selectivity for speckle reduction" Optics Express, vol. 15, No. 10, May 14, 2007, pp. 6200-6209.
Dowski, et al., "Extended depth of field through wavefront coding," Applied Optics, vol. 34, No. 11, Apr. 10, 1995, pp. 1859-1866.
Evered, et al., "Accuracy and perceptions of virtual microscopy compared with glass slide microscopy in cervical cytology," Cytopathology, vol. 22, Feb. 2, 2010, pp. 82-87.
Fergus, et al., "Removing camera shake from a single photograph," ACM Trans. Graph. 25, 787-794 (2006).
Fienup and Miller, "Aberration correction by maximizing generalized sharpness metrics," J. Opt. Soc. Am. A 20, pp. 609-620 (Apr. 2003).
Fried, D.L.,"Anisoplanatism in adaptive optics," J. Opt. Soc. Am. vol. 72, No. 1, Jan. 1982, pp. 52-61.
Gunjala, et al., "Aberration recovery by imaging a weak diffuser," Optics Express vol. 26, No. 16, Aug. 6, 2018, pp. 21054-21068.
McConnell, et al., "A novel optical microscope for imaging large embryos and tissue volumes with sub-cellular resolution throughout," eLife 5, e18659, Sep. 23, 2016, pp. 1-15.
Muyo, et al., "Wavefront coding for athermalization of infrared imaging systems," Proc. SPIE 5612, Dec. 6, 2004, pp. 227-235.
Muyo, et al., "Infrared imaging with a wavefront-coded singlet lens," Optics Express, vol. 17, Nov. 5, 2009, pp. 21118-21123.
Ginner, et al., "Holographic line field en-face OCT with digital adaptive optics in the retina in vivo," Biomed. Opt. Express 9, 472-485 (Feb. 1, 2018).
Ginner, et al., "Noniterative digital aberration correction for cellular resolution retinal optical coherence tomography in vivo," Optica, vol. 4, Aug. 2017, pp. 924-931.
Gustafsson, M.,"Nonlinear structured-illumination microscopy: widefield fluorescence imaging with theoretically unlimited resolution," Proc. Natl. Acad. Sci. USA 102, 13081-13086 (Sep. 13, 2005).
Hofer, et al., "Improvement in retinal image quality with dynamic correction of the eye's aberrations," Opt. Express 8, May 21, 2001, pp. 631-643.
Hillmann, et al., "Aberration-free volumetric high-speed imaging of in vivo retina," Sci. Rep. 6, 35209 (Oct. 20, 2016).
Kamal, et al., "In situ retrieval and correction of aberrations in moldless lenses using Fourier ptychography," Opt. Express, vol. 26, No. 3, pp. 2708-2719 (Feb. 5, 2018).
Kuang, et al., "Digital micromirror device-based laserillumination Fourier ptychographic microscopy," Optics Express, vol. 23, Oct. 5, 2015, pp. 26999-27010.
Kubala, et al., "Reducing complexity in computational imaging systems," Optics Express vol. 11, Sep. 8, 2003, pp. 2102-2108.
Kumar, et al., "Subaperture correlation based digital adaptive optics for full field optical coherence tomography," Optics Express, vol. 21, May 6, 2013, pp. 10850-10866.
Kundur, et al., "Blind Image Deconvolution," IEEE Signal Processing Magazine, vol. 13, No. 3, May 1996, pp. 43-64.
Levin et al., "Image and depth from a conventional camera with a coded aperture," ACM Transactions on Graphics, vol. 26, No. 3, Article 70, Jul. 2007, pp. 70-1-70-9.
Levin, et al., "Understanding blind deconvolution algorithms," IEEE Trans. Pattern Anal. Mach. Intell., vol. 33, No. 12, Dec. 2011, pp. 2354-2367.
Li, et al., "Separation of three dimensional scattering effects in tilt-series Fourier ptychography," Ultramicroscopy 158, 1-7 (Jun. 14, 2015).
Li, et al., "GPU accelerated parallel FFT processing for Fourier transform hyperspectral imaging," Applied Optics, vol. 54, No. 13, May 1, 2015, pp. D91-D98.
Marcos, et al., "Vision science and adaptive optics, the state of the field," Vision Research, vol. 132, Feb. 27, 2017, pp. 3-33.
Martins da Silva et al., "Photosensitivity and epilepsy: current concepts and perspectives-a narrative review," Seizure, vol. 50, Apr. 4, 2017, pp. 209-218.
Neumaier, "Solving ill-conditioned and singular linear systems: a tutorial on regularization," SIAM Rev. 40, (1998), pp. 636-666.
Pan, et al., "Subwavelength resolution Fourier ptychography with hemispherical digital condensers," Opt. Express 26, 23119-23131 (Sep. 3, 2018).

(56) References Cited

OTHER PUBLICATIONS

Pan, et al., "System calibration method for Fourier ptychographic microscopy," J. Biomed. Opt. 22, 096005 (Sep. 12, 2017).

Pan, et al., "Three-dimensional space optimization for near-field ptychography," Opt. Express 27, 5433-5446 (Feb. 18, 2019).

Pankajakshan, P., "Blind Deconvolution for Confocal Laser Scanning Microscopy," Doctoral dissertation, Universite Nice Sophia Antipolis, 2009. <URL: https://tel.archives-ouvertes.fr/tel-00474264>.

Qian, et al., "Large-scale 3D imaging of insects with natural color," Opt. Express 27, 4845-4857 (Feb. 18, 2019).

Reinig, et al., "Adaptative optics microscopy enhances image quality in deep layers of Clarity processed brains of YFP-H mice" Proc., of SPIE, vol. 9690, (Mar. 9, 2016) pp. 969008-1-969008-12. <doi:10.1117/12.2213283>.

Rha, et al., "Adaptive optics flood-illumination camera for high speed retinal imaging," Opt. Express vol. 14, May 15, 2006, pp. 4552-4569.

Shemonski, et al., "Computational high-resolution optical imaging of the living human retina," Nat. Photonics, vol. 9, Jul. 2015, pp. 440-443.

Soulez, et al., "Blind deconvolution of 3D data in wide field fluorescence microscopy" in 2012 9th IEEE International Symposium on Biomedical Imaging (ISBI) May 2, 2012, pp. 1735-1738.

Sun, et al., "Efficient positional misalignment correction method for Fourier ptychographic microscopy," Biomedical Optics Express vol. 7, No. 4, Mar. 17, 2016, pp. 1336-1350.

Sun, et al., "Resolution-enhanced Fourier ptychographic microscopy based on high-numerical-aperture illuminations," Scientific Reports, vol. 7, No. 1187, Apr. 26, 2017, pp. 1-11.

Sun, et al., "Sampling criteria for Fourier ptychographic microscopy in object space and frequency space," Optics Express vol. 24, No. 14, Jul. 11, 2016, pp. 15765-15781.

Thiébaut and Conan, "Strict a priori constraints for maximumlikelihood blind deconvolution," J. Opt. Soc. Am. A, vol. 12, No. 3, Mar. 1995, pp. 485-492.

Tian and Waller, "3D intensity and phase imaging from light field measurements in an LED array microscope," Optica vol. 2, No. 2, Feb. 2015, pp. 104-111.

Tomer et al., "Advanced Clarity for rapid and high-resolution imaging of intact tissues," Nat. Protoc., vol. 9, No. 7, Jul. 2014, pp. 1682-1697.

Wade, et al., "A fast, robust pattern recognition system for low light level image registration and its application to retinal imaging," Optics Express vol. 3, No. 5, Aug. 31, 1998, pp. 190-197.

Williams, D., "Imaging Single Cells in the Living Retina," Vis. Res. 51, pp. 1379-1396 (Jul. 1, 2011).

Yaroslaysky, "Image Resampling and Building Continuous Image Models", Chapter 6, Theoretical Foundations of Digital Imaging Using MATLAB , pp. 293-342 (CRC Press, 1 edition, Nov. 26, 2012).

Yuan, et al., "Image deblurring with blurred/noisy image pairs," ACM Trans. Graph. 26, Jul. 29, 2007, pp. 1-10.

Zhou, et al., "What are Good Apertures for Defocus Deblurring?" in 2009 IEEE International Conference on Computational Photography (IEEE, Apr. 16-17, 2009), pp. 1-8.

U.S. Appl. No. 16/552,948, filed Aug. 27, 2019, Chung et al.

U.S. Appl. No. 16/572,497, Sep. 16, 2019, Ou et al.

U.S. Notice of Allowance dated Jan. 29, 2020 issued in U.S. Appl. No. 14/065,280.

U.S. Office Action dated Jan. 9, 2020 in U.S. Appl. No. 14/658,019.

U.S. Notice of Allowance dated Jan. 6, 2020 in U.S. Appl. No. 14/960,252.

U.S. Notice of Allowance dated Feb. 18, 2020 issued in U.S. Appl. No. 16/242,934.

U.S. Notice of Allowance dated Dec. 9, 2019 in U.S. Appl. No. 16/162,271.

U.S. Notice of Allowance dated Jan. 17, 2020 issued in U.S. Appl. No. 15/003,559.

U.S. Notice of Allowance dated Jan. 24, 2020 issued in U.S. Appl. No. 15/068,389.

Chinese Second Office Action dated Dec. 31, 2019 issued in CN 201580072950.8.

Chinese Second Office Action dated Nov. 28, 2019 issued in Application No. CN 201680006738.6.

\* cited by examiner

EPI-ILLUMINATION FOURIER PTYCHOGRAPHIC IMAGING FOR THICK SAMPLES

CROSS-REFERENCES TO RELATED APPLICATIONS

This application claims priority to U.S. Provisional Patent Application No. 62/095,648 titled "Epi-illumination Fourier Ptychographic Microscopy for Thick Biological Samples" and filed on Dec. 22, 2014, which is hereby incorporated by reference in its entirety and for all purposes.

FIELD

Certain aspects pertain generally to digital imaging, and more specifically, to epi-illumination Fourier ptychographic imaging systems and methods for imaging of thick samples, which can be used in applications such as, for example, industrial inspections and biomedical imaging.

BACKGROUND

Fourier ptychographic imaging is a technique used to acquire a high resolution sample amplitude and phase measurement from a series of lower resolution intensity images captured under varied illumination conditions. More conventionally, a Fourier ptychographic imaging system uses an array of light emitting diodes (LEDs) located beneath a thin, semi-transparent sample of interest as the variable illumination source. The light from each LED passed through the thin sample and into an imaging lens (e.g., a microscope objective) to form each unique Fourier ptychographic image acquired by the imaging sensor. This set of acquired Fourier ptychographic images was then combined into a high-resolution complex measurement through a phase-retrieval algorithm. Details of the reconstruction process used by these conventional Fourier ptychographic imaging systems can be found in Guoan Zheng, Roarke Horstmeyer, and Changhuei Yang, "Wide-field, high resolution Fourier ptychographic microscopy," *Nature Photonics* (2013), which is hereby incorporated by reference in its entirety.

SUMMARY

Certain aspects pertain to epi-illumination Fourier ptychographic imaging systems and methods for high resolution imaging of thick samples.

Certain aspects pertain to epi-illumination Fourier ptychographic imaging system comprising a variable illumination source configured to provide radiation sequentially at a plurality of incidence angles a first polarizer system configured to polarize radiation from the variable illumination source to a first polarization state incident upon a sample. The epi-illumination Fourier ptychographic imaging system further comprises collection optics configured to receive radiation issuing from the sample. The collection optics are located to the same side of the sample from which the variable illumination source provides radiation. The epi-illumination Fourier ptychographic imaging system further comprises a second polarizer system configured to receive radiation passed through the collection optics, the second polarizer system having a first polarizer in a first orientation and a second polarizer in a second orientation orthogonal the first orientation. The epi-illumination Fourier ptychographic imaging system further comprises a radiation detector configured to receive radiation from the second polarizer system, the radiation detector configured to acquire a first sequence of intensity images of the sample through the first polarizer and a second sequence of intensity images of the sample through the second polarizer, wherein each intensity image corresponds to a different incidence angle of the plurality of incidence angles. The epi-illumination Fourier ptychographic imaging system further comprises a processor configured to determine a sequence of de-scattered surface intensity images from the first sequence of intensity images and the second sequence of intensity images.

Certain aspects pertain to an epi-illumination Fourier ptychographic imaging system comprising a variable illumination source configured to provide radiation sequentially at a plurality of incidence angles and a first polarizer system configured to polarize radiation received from the variable illumination source to a first polarization state incident upon a sample. The epi-illumination Fourier ptychographic imaging system further comprises collection optics configured to receive radiation issuing from the sample, wherein the collection optics are located to the same side of the sample from which the variable illumination source provides radiation. The epi-illumination Fourier ptychographic imaging system further comprises a second polarizer system configured to receive radiation passed through the collection optics, the second polarizer system having a polarizer rotated between a first orientation and a second orientation orthogonal the first orientation. The epi-illumination Fourier ptychographic imaging system further comprises a radiation detector configured to receive radiation from the second polarizer system, the radiation detector configured to acquire a first sequence of intensity images of the sample through the polarizer in the first orientation and a second sequence of intensity images of the sample through the polarizer in the second orientation, wherein each intensity image corresponds to a different incidence angle of the plurality of incidence angles. The epi-illumination Fourier ptychographic imaging system further comprises a processor configured to determine a sequence of de-scattered surface intensity images from the first sequence of intensity images and the second sequence of intensity images.

Certain aspects pertain to an epi-illumination Fourier ptychographic imaging system comprising an illumination source configured to provide radiation of a first polarization state incident upon the sample and a first optical element configured to receive radiation from the sample, wherein the first optical element is located to the same side of the sample from which the illumination source provides radiation. The epi-illumination Fourier ptychographic imaging system further comprises a second optical element and an aperture scanner configured to generate an aperture at a plurality of aperture locations in an intermediate plane, the aperture configured to pass radiation via aperture from the first optical element to the second optical element. The epi-illumination Fourier ptychographic imaging system further comprises a second polarizer system configured to receive radiation passed through the collection optics, the second polarizer system having a first polarizer in a first orientation and a second polarizer in a second orientation orthogonal the first orientation and a radiation detector configured to receive radiation from the second polarizer system, the radiation detector configured to acquire a first sequence of intensity images of the sample through the first polarizer and a second sequence of intensity images of the sample through the second polarizer, wherein each intensity image corresponds to a different aperture location of the plurality of aperture locations. The epi-illumination Fourier ptychographic imaging system further comprises a processor configured to determine a sequence of de-scattered surface intensity images from the first sequence of intensity images and the second sequence of intensity images.

Certain aspects pertain to an epi-illumination Fourier ptychographic imaging system comprising an illumination source configured to provide radiation of a first polarization state incident upon a sample and a first optical element configured to receive radiation from the sample, wherein the first optical element is located to the same side of the sample from which the illumination source provides radiation. The epi-illumination Fourier ptychographic imaging system further comprises a second optical element and an aperture scanner configured to generate an aperture at a plurality of aperture locations in an intermediate plane, the aperture configured to pass radiation via aperture from the first optical element to the second optical element. The epi-illumination Fourier ptychographic imaging system further comprises a second polarizer system configured to receive radiation passed through the collection optics, the second polarizer system having a polarizer rotated between a first orientation and a second orientation orthogonal the first orientation and a radiation detector configured to receive radiation from the second polarizer system, the radiation detector configured to acquire a first sequence of intensity images of the sample through the polarizer in the first orientation and a second sequence of intensity images of the sample through the polarizer in the second orientation, wherein each intensity image corresponds to a different aperture location of the plurality of aperture locations. The epi-illumination Fourier ptychographic imaging system further comprises a processor configured to determine a sequence of de-scattered surface intensity images from the first sequence of intensity images and the second sequence of intensity images.

Certain aspects pertain to an epi-illumination Fourier ptychographic imaging methods comprising illuminating a sample with radiation of a first polarization state. These methods further comprise receiving radiation, at a radiation detector, issuing from the sample at collection optics located to the same side of the sample from which radiation is provided to the sample. These methods further comprise acquiring, with the radiation detector, a first sequence of intensity images of the sample based on a second polarizer system with one or more polarizers in a first orientation. These methods further comprise acquiring, with the radiation detector, a second sequence of intensity images of the sample based on a second polarizer system with one or more polarizers in a second orientation. These methods further comprise determining a sequence of de-scattered surface intensity images from the first sequence of intensity images and the second sequence of intensity images. These methods further comprise constructing a higher resolution image of the sample by iteratively combining the sequence of de-scattered surface intensity images in Fourier space.

These and other features are described in more detail below with reference to the associated drawings.

DETAILED DESCRIPTION

Embodiments of the present invention will be described below with reference to the accompanying drawings.

I. Introduction

Certain embodiments described herein pertain to epi-illumination Fourier ptychographic imaging ("EPI-FP-THICK") systems and methods for high resolution imaging of thick samples. Each EPI-FP-THICK system is configured to acquire a sequence of Fourier ptychographic images by illuminating and imaging the sample of interest from the same side i.e. in an epi-illumination imaging configuration. In this configuration, light reflected from the sample is used to form each unique Fourier ptychographic image. To achieve this, incident illumination is provided from the same side of the sample from which the collection optics is located. In one example, the EPI-FP-THICK imaging system has an array of LEDs that provide varied illumination at a plurality of angles incident upon the sample, and the illumination reflected from the sample at each incidence angle is collected and used to form each unique Fourier ptychographic image. In this example, the LED array is located on the same side of the sample as the collecting optics such as an imaging lens. Illustrated examples of EPI-FP-THICK imaging systems with an LED array located on the same side of the sample as the collection optics are shown, for example, in FIG. 3 and FIG. 4. The EPI-FP-THICK systems are configured so that the thin sample constraint required by conventional Fourier ptychographic imaging techniques is no longer needed for high resolution imaging. As discussed in more detail below, conventional Fourier ptychographic imaging techniques require that the imaged sample be thin to avoid substantial scattering below the surface that would prevent the "angle-shift" condition from being met. The EPI-FP-THICK systems are configured to use one or more techniques so that the thin sample constraint is no longer needed. In one aspect, the removal of the thin sample constraint is achieved by adding a first polarizer system to ensure that the illumination incident the sample is of a single (linear) polarization, and a second polarizer system to analyze the linear polarization of the light issuing from the sample. Other techniques are described herein.

Figure 1A:
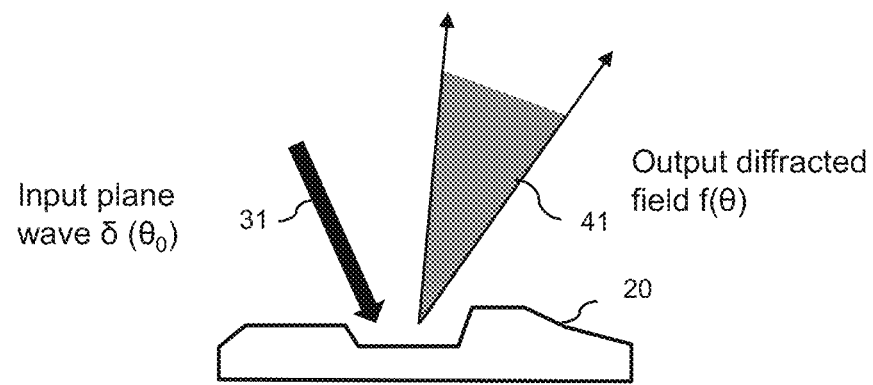
FIG. 1A is a diagram illustrating the output diffracted field from a thin sample associated with an input plane wave, according to an embodiment.
Figure 1B:
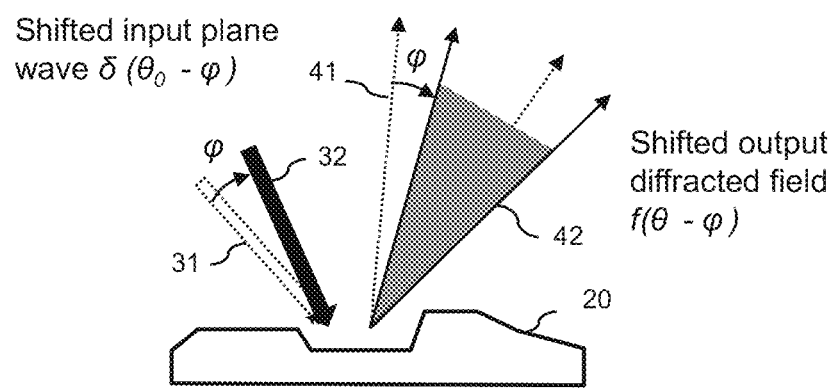
FIG. 1B is a diagram illustrating the "angle-shift" of the output diffracted field from a thin sample associated with an input plane wave, according to an embodiment.

The EPI-FP-THICK imaging methods generally include a Fourier ptychographic reconstruction process described in detail in Section IV. Generally speaking, this Fourier ptychographic reconstruction process stitches together Fourier ptychographic images from different regions of Fourier space corresponding to the incidence angles of illumination. For best results, the Fourier ptychographic reconstruction process requires that a certain condition is met: the incident illuminating field's shifting angle (i.e., the angle between the incident plane wave and the optical axis) must map to an equivalent angular shift in the output reflected field (i.e., a tilt of the field emerging from the sample surface by the same angle). This "angle-shift" condition is illustrated in FIGS. 1A and 1B. Sample objects that would most likely satisfy this "angle-shift" condition are those that are primarily "specular," or have a reflective surface. Some types of samples that typically satisfy the "angle-shift" condition are semiconductor chips, complex interconnect circuit boards, and certain samples in metrology inspection. Objects do not need to be flat (either macroscopically or microscopically flat) to satisfy the "angle-shift" condition.

As introduced above, FIGS. 1A and 1B include diagrams illustrating the "angle-shift" condition being met by a thin sample 20, according to an embodiment. In both FIG. 1A and FIG. 1B, the thin sample 20 is illuminated by an input plane wave $\delta(\theta_0)$ 31. In both FIG. 1A and FIG. 1B, light diffracted from the sample 20 illuminated by input plane wave $\delta(\theta_0)$ 31 is shown as output diffracted field $f(\theta)$ 41. For the Fourier ptychographic reconstruction process to operate most effectively, any light diffracted from the sample under one illumination must shift, unchanged, if the incident light is rotated to a new incidence angle. To illustrate the "angle-shift" condition, FIG. 1B shows an angular shift, $\varphi$, to the input plane wave $\delta(\theta_0)$ 31 for a shifted input plane wave $\delta(\theta_0\text{-}\varphi)$ 32. As shown, the shifted output diffracted field $f(\theta_0\text{-}\varphi)$ 42 is shifted by the angular shift, $\varphi$, which is equal to the amount of angular shift applied to the input field. In the illustration, the "angle-shift" condition is met.

Some examples of conventional epi-illumination Fourier ptychographic systems are described in U.S. patent application Ser. No. 14/466,481, titled "VARIABLE-ILLUMINATION FOURIER PTYCHOGRAPHIC IMAGING DEVICES, SYSTEMS, AND METHODS" and filed on Aug. 22, 2014; and in U.S. Provisional Application 61/868,967 titled "Alternative Optical Implementations for Fourier Ptychographic Microscopy" and filed on Aug. 22, 2013; both of which are hereby incorporated by reference in their entirety. When imaging thick samples, these conventional epi-illumination Fourier ptychographic systems may not be able to successfully improve an image's resolution beyond the cutoff spatial frequency of the imaging lens or other collection optics. This is because a thick sample may not satisfy the "angle-shift" condition. With a thick sample, incident illumination may penetrate into the sample (i.e., beneath the surface) by a non-negligible amount, where sub-surface scattering can occur. Sub-surface scattering can cause the output light to respond in an unpredictable manner to shifting the angle of incident illumination (i.e., to not obey the angle-shift condition).

In some aspects, EPI-FP-THICK systems use the polarization state of detected light to isolate contributions of the output diffracted field that only reflect off the surface of the sample without scattering. That is, optical scattering can cause light to depolarize, or turn into a random polarization state. This is discussed in Guoan Zheng, Roarke Horstmeyer, and Changhuei Yang, "Wide-field, high resolution Fourier ptychographic microscopy." *Nature Photonics* (2013), Y. Y. Shechner, S. G. Narasimhan and S. K. Nayar, "Polarization-based vision through haze," *Applied Optics* 42(3), 2003, X. Gan, S. P. Schilders and M. Gu, "Image enhancement through turbid media under a microscope by use of polarization gating methods," JOSA A 16(9), 1999, and O. Emile, F. Bretenaker and A. Le Floch, "Rotating polarization imaging in turbid media," *Optics Letters* 21(20), 1996; all of which are hereby incorporated by reference for this discussion. On the other hand, surface reflection primarily preserves the polarization state of incident illumination.

In certain aspects, EPI-FP-THICK systems are configured to use a technique that estimates and removes components based on light that depolarized from sub-surface scattering from the captured images in order to isolate the components directly reflected from the sample surface. With this technique, the EPI-FP-THICK systems are capable of high-resolution Fourier ptychographic imaging of the surface of thick samples. One direct technique for configuring an EPI-FP-THICK system to detect surface-reflected light is to include a first polarizer system located (e.g., at the illumination source) so that incident illumination is polarized in a first polarization state, called "H" in certain examples for simplicity. Two examples of illuminating a sample with polarized light can be found in A. Ghosh et al., "Multiview face capture using polarized spherical gradient illumination," *ACM Transactions on Graphics* 30(6) (2011) and S. K. Nayar, G. Krishnan, M. D. Grossberg, and R. Raskar, "Fast separation of direct and global components of a scene using high frequency illumination," *ACM Transactions on Graphics* 25(3) (2006), which are hereby incorporated by reference for these examples. The EPI-FP-THICK system also includes a second polarizer system located, for example, at the radiation detector (e.g., imaging sensor). The second polarizer system enables the radiation detector to capture two images: a first image $I_1$ with the second polarizer oriented along a first direction according to the first polarization state, called "H" in certain examples for simplicity, and a second image $I_2$ with the second polarizer oriented along a second direction according to the second polarization state, called "V" in certain examples for simplicity. The first direction is orthogonal to the second direction. For linear polarizers, the first polarization state H can be a polarizer oriented at zero degrees, and the second polarization state V can be a polarizer oriented at ninety degrees, for example. To use this technique, the randomly depolarized component of light is estimated to contribute equally to the H image $I_1$ and the V image $I_2$. Based on this estimation, taking the difference in image intensity between the first image $I_1$ and the second image $I_2$ (i.e., subtracting $I_2$ from $I_1$) effectively removes the contribution of depolarized light, and hence the majority of sub-surface scattered light from the image intensity. An example of removing sub-surface contribution of depolarized light from human tissue can be found in A. Ghosh et al., "Multiview face capture using polarized spherical gradient illumination," *ACM Transactions on Graphics* 30(6), 2011, which is hereby incorporated by reference for this example. Details of an example of removing depolarized light can be found in T. Chen et al., "Polarization and phase shifting for 3D scanning of translucent objects," *Proc. CVPR,* 2007 and A. Ghosh et al., "Multiview face capture using polarized spherical gradient illumination," *ACM Transactions on Graphics* 30(6), 2011, which are hereby incorporated by reference for this isolation technique.

In one aspect, an EPI-FP-THICK method determines an image of only the surface of the thick sample, and not any part of the thick sample beneath the surface, by estimating the intensity distribution of light directly reflected from the sample surface by taking the difference between the first image $I_1$ and the second image $I_2$ according to Eqn. 1:

$$I_s = I_1 - I_2 \quad \text{(Eqn. 1)}$$

If ideal linear polarizers are used in the EPI-FP-THICK system, the sum of the intensity images is equivalent to an image that would be captured if a polarizer were not located at radiation detector as provided in Eqn. 2.

$$I_{total} = I_1 + I_2 \quad \text{(Eqn. 2)}$$

Figure 2A:
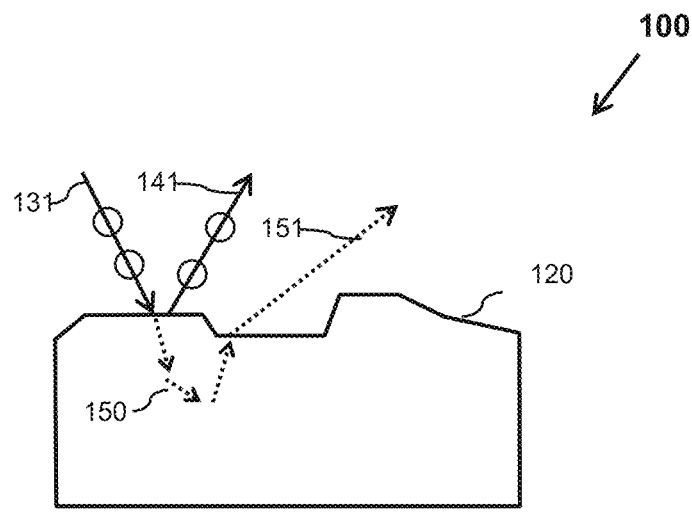
FIG. 2A is a schematic drawing illustrating a technique used by an epi-illumination Fourier ptychographic imaging system to illuminate a thick sample, according to an embodiment.
Figure 2B:
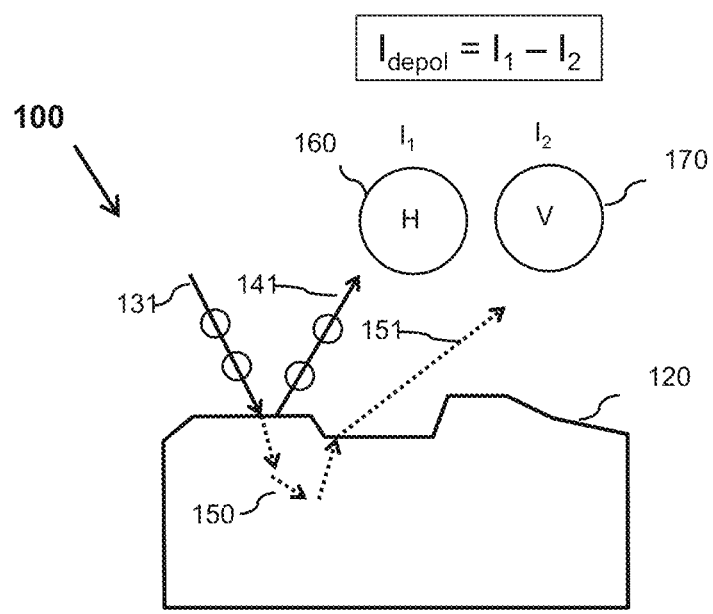
FIG. 2B is a schematic drawing illustrating a technique used by an epi-illumination Fourier ptychographic imaging system to measure surface reflected light from a thick sample, according to an embodiment.

FIGS. 2A and 2B are schematic representations illustrating the technique used by an EPI-FP-THICK system 100 to measure surface reflected light from a thick sample 120, according to embodiments. This technique estimates and removes light components that depolarize in order to isolate components directly reflected from the sample surface. The EPI-FP-THICK system 100 has a first polarizer at the illumination source for polarizing light in a first direction, "H Polarized." In both FIG. 2A and FIG. 2B, a thick sample 120 is shown illuminated by input light 131 polarized in the first direction, "H Polarized." The surface of the thick sample 120 reflects light 141. The surface-reflected light 141 maintains its polarization (depicted by solid lines) in the first direction, "H Polarized." Light that scatters beneath the surface (scattered light 150) of the sample 120 becomes randomly depolarized (depicted by dotted lines) light 151. The EPI-FP-THICK system 100 is configured with one or more additional polarizers at the radiation detector to be able to capture intensity images $I_1$ 160 and $I_2$ 170. In one example, the EPI-FP-THICK system has a second polarizer at the radiation detector. The second polarizer is shifted (e.g., rotated) between the "H" orientation and the "V" orientation perpendicular to the "H" orientation. The first intensity distributions $I_1$ 160 is captured when the second polarizer is in the "H" orientation and the second the intensity distributions $I_2$ 170 is captured when the second polarizer is in the "V" orientation. In another example, an EPI-FP-THICK system has a second polarizer in the "H" orientation and a third polarizer in the "V" orientation. In this example, the radiation detector can capture both intensity distributions $I_1$ and $I_2$ at the same sample time (i.e. intensity measurements taken over an exposure time at the radiation detector). Other examples are discussed herein.

Referring back to FIGS. 2A and 2B, the two images $I_1$ and $I_2$, 160 and 170, are captured based on an "H" orientation and a "V" orientation respectively of the polarizer at the radiation detector. The EPI-FP-THICK system 100 estimates that depolarized light component contributes equally to both of the images $I_1$ and $I_2$, 160 and 170. Based on this estimation, the EPI-FP-THICK system 100 can remove the depolarized light component from the first image $I_1$ 160 by taking the difference between the intensity of the images $I_1$ and $I_2$, 160 and 170. That is, the EPI-FP-THICK system 100 can determine the difference in intensity between the images $I_1$ and $I_2$, 160 and 170, at each discrete light detecting element of the radiation detector, to determine the intensity distribution of a surface image based on reflected light from the surface of the sample 120.

In certain aspects, an EPI-FP-THICK imaging method includes a technique that estimates and removes light components that depolarize in order to isolate components directly reflected from the sample surface. In some cases, this technique may not be perfectly effective at isolating surface-reflected light. First, a certain fraction of sub-surface scattered photons may maintain their original polarization, causing the difference image to also contain their erroneous contribution. However, a larger percentage of these polarization-preserving photons are expected to originate from near the top of the surface, and thus more closely satisfy our desired angle-shift property. A slow degradation in performance, as opposed to a failure of the epi-FPM platform, is therefore expected as a result of this effect. In certain aspects, performance can be improved by capturing a plurality of unique images, each of a unique polarization component of light that is reflected from the sample, and then processing this set of images accordingly. For example, a linear polarizer oriented at 0 degrees, 45 degrees, 90 degrees, and a circular polarizer may be used to capture 4 unique images (one through each polarizer). The first image will be $I_1$ in Eqn. 1 and Eqn. 2, and the last 3 of these images can be $I_2$, which will result in 3 unique equations. The solutions to each of these equations may be added together, for example, or combined in another unique manner, to improve performance.

In certain aspects, a sample is coated with a material (e.g., water) on its surface to preserve polarization upon reflection. Coating the surface may prevent depolarization on a sample or imaging geometry where the reflected light may depolarize otherwise and cause the difference image to contain little signal. In one aspect, an EPI-FP-THICK imaging method may further comprise a coating operation for coating the surface of the sample with this material (e.g., water) to preserve polarization upon reflection. This coating operation occurs prior to image acquisition.

Although the polarization technique is used in many examples to separate surface-reflected and sub-surface scattered light components, the EPI-FP-THICK systems/methods can use alternative techniques that will improve performance. In one example, the EPI-FP-THICK systems/methods may use the projection of shifted high-frequency intensity patterns onto an object has to effectively separate surface-reflected and sub-surface scattered light components. Some examples of other systems that use these techniques can be found in T. Chen et al., "Polarization and phase shifting for 3D scanning of translucent objects," *Proc. CVPR* (2007), and S. K. Nayar, G. Krishnan, M. D. Grossberg, and R. Raskar, "Fast separation of direct and global components of a scene using high frequency illumination," *ACM Transactions on Graphics* 25(3) (2006), which are hereby incorporated by reference in their entirety. When light is projected as a sinusoidal pattern onto a sample, the contrast of the reflected light (as a sinusoidal pattern) will depend upon how specular the object is. For example, for an object where all the incident light is reflected off the surface, like a mirror, the contrast of the detected sinusoid will be maximal. For a less specular object like tissue, the contrast of the detected sinusoid will be less than the mirror. By projecting a sequence of slightly shifted sinusoidal patterns and processing them accordingly, it is possible to isolate the component of light that is reflected off the sample surface and maintains the shape of the sinusoid from the component of light that scatters beneath the surface and contributes to the loss in sinusoid contrast. In another example, the EPI-FP-THICK systems/methods may be based on the expectation that subsurface scattered light scatters more evenly into all directions than the more specular component originating from the surface. The EPI-FP-THICK systems/methods can use a technique that examines the principle components of light emerging from the surface of all images as a function of illumination angle, which may help further isolate any sub-surface scattered photon. For example, one can shine light onto the sample from N slightly different angles and detecting the N corresponding images, which each contain m pixels. These N images can each be considered as a unique vector in an m-dimensional space. The largest principle component associated with this set of N vectors may be considered as the shared component of each image that is caused by sub-surface scattering. One may form a set of N images that primarily contain light reflected from the sample surface by computing the k largest principle components of the N originally detected raw images, and then subtracting these principle components from each of the originally detected raw images.

According to certain aspects, the EPI-FP-THICK systems/methods can provide certain benefits that may find application in a host of imaging scenarios. First, its ability to enhance the resolution of an imaging element beyond its optical limit suggests that a lens with a wider field-of-view (lower magnification) may be utilized to achieve a given resolution goal. Such lower magnification lenses naturally offer an increased depth-of-field and increased working distance. In addition, an EPI-FP-systems/methods method can also recover the phase of the optical field reflected from the sample. This phase content may in turn be used to digitally refocus the detected image to different axial planes. This not only increases the system's effective depth-of-field (by roughly a factor of 10 in conventional FP imaging systems), but also facilitates the sharp reconstruction of images of highly curved surfaces, effectively removing the need to manually focus the camera before image acquisition. Besides the capability of integration into a conventional microscope platform, these above benefits suggest that EPI-FP-THICK systems/methods may find a solid application in dermatology applications such as, for example, in tracking melanoma. As another example, the EPI-FP-THICK systems/methods could be used for the high-resolution imaging of large embryos (with significantly curved surfaces. To image large embryos using conventional microscopes, the microscopes take a series of through-focus images or take a lateral shift, refocus and capture approach. The refocusability and large working distance of EPI-FP-THICK systems may speed up, improve the accuracy and simplify such embryo imaging.

In certain aspects, an EPI-FP-THICK system uses a technique that allows the optical arrangement to image surface-reflected light from a thick biological sample (i.e., light that does obey the angle-shift property). Using an EPI-FP-THICK method, this system can operate to capture images and recover a high-resolution map of the complex optical field at the surface of the sample. This EPI-FP-THICK method will also allow imaging across an extended depth-of-field, and also reconstruct sharp images of a non-flat sample surfaces. Some examples of applications that may benefit from using EPI-FP-THICK systems/methods include melanoma detection and tracking, and the imaging of embryos.

Although certain aspects of EPI-FP-THICK systems are described herein as propagating visible light, in other aspects, other types of electromagnetic radiation can be used such as x-ray radiation, infrared radiation, ultraviolet radiation, etc.

H. System Configurations

The EPI-FP-THICK systems described herein have components that are arranged into configurations that are generally described as two configurations: configuration A and configuration B. The EPI-FP-THICK systems of both configurations A and B have optical components that are arranged for epi-illumination so that shifting radiation (i.e. radiation shifting between different incidence angles) reaching the radiation detector is reflected from the surface of the sample. Some examples of EPI-FP-THICK systems in configurations A and B are provided in this section. Details of optical components arranged for epi-illumination can be found in U.S. patent application Ser. No. 14/466,481, titled "VARIABLE-ILLUMINATION FOURIER PTYCHOGRAPHIC IMAGING DEVICES, SYSTEMS, AND METHODS" and filed on Aug. 22, 2014; U.S. patent application Ser. No. 14/448,850, titled "APERTURE SCANNING FOURIER PTYCHOGRAPHIC IMAGING" and filed on Jul. 31, 2014; U.S. Provisional Application 61/868,967 titled "Alternative Optical Implementations for Fourier Ptychographic Microscopy" and filed on Aug. 22, 2013; U.S. Provisional Application 61/860,786 titled "Generalized Ptychographic Imaging with Optical Transfer Function Modulation" and filed on Jul. 31, 2013; U.S. Provisional Application 61/899,715 titled "Increasing Numerical Aperture of Dry Objective to Unity via Fourier Ptychographic Microscopy" and filed on Nov. 4, 2013; and U.S. Provisional Application 62/000,722 titled "Ultra-High NA microscope Fourier Ptychographic Microscopy" and filed on May 20, 2014; all of which are hereby incorporated by reference in their entirety.

Configuration A

Figure 3:
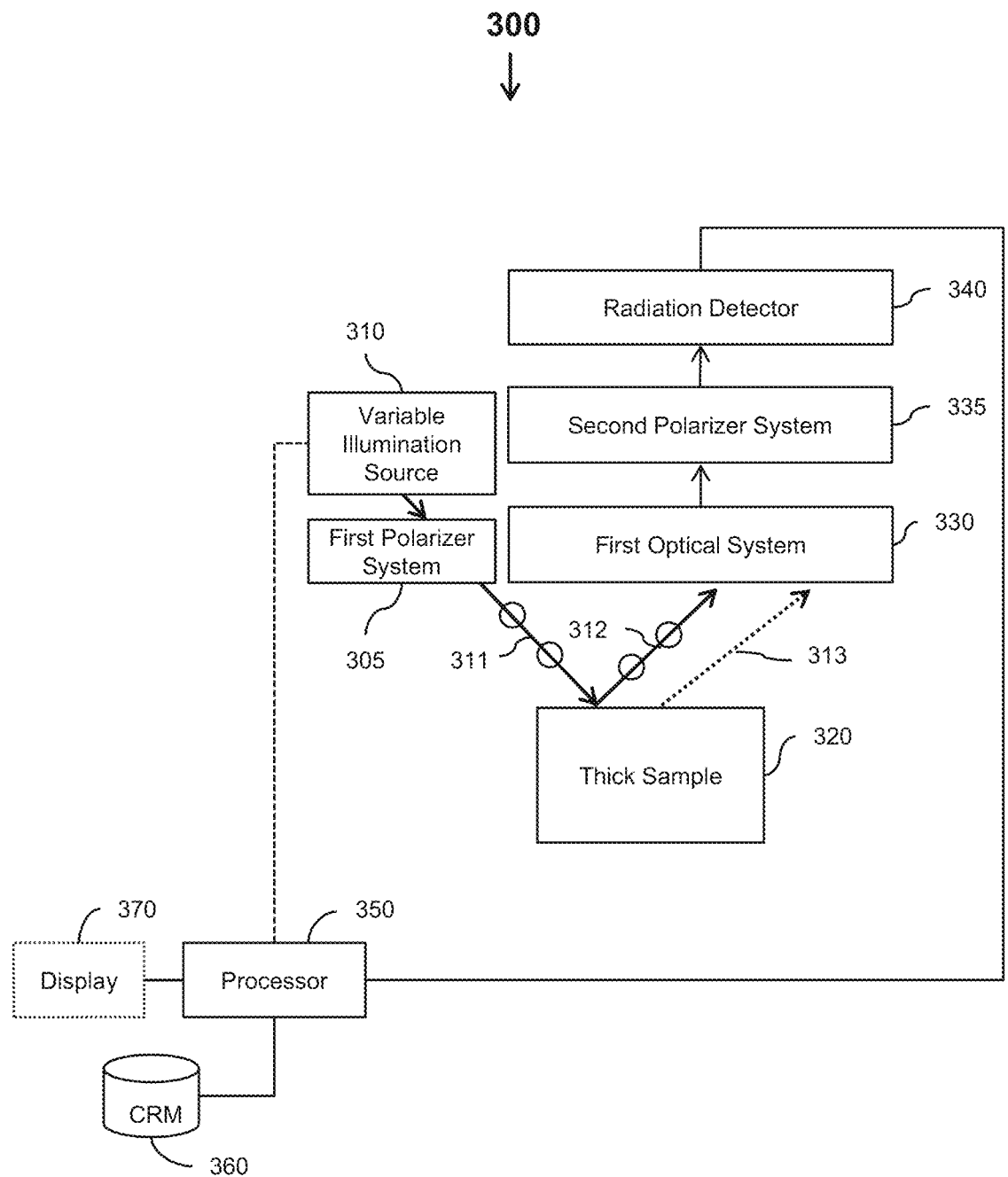
FIG. 3 is a diagram an epi-illumination Fourier ptychographic imaging system with components arranged according to configuration A, in accordance with certain embodiments.

FIG. 3 is a diagram an EPI-FP-THICK system 300 with its components arranged according to configuration A, according to certain aspects. The EPI-FP-THICK system 300 has a variable illumination source 310 providing electromagnetic radiation (e.g., visible light, ultraviolet light, x-ray radiation, etc.) and a first polarizer system 305 receiving the electromagnetic radiation from the variable illumination source 310 and polarizing the electromagnetic radiation to a first polarization state 311. During a run of an image acquisition process, the variable illumination source 310 provides electromagnetic radiation fron N incidence angles sequentially over time.

As used herein, a polarizer generally refers to an optical filter that passes electromagnetic waves of a specific polarization and blocks electromagnetic waves of other polarizations. In certain aspects, the polarizer is in the form of a layer (e.g., thin film) of material, which can be applied to a surface such as the surface of an LED array.

Referring back to FIG. 3, the first polarizer system 305 comprises a first polarizer that passes electromagnetic waves of a first polarization state and blocks electromagnetic waves of other polarizations. As denoted for simplicity by a set of arrows at the thick sample 320, the electromagnetic radiation in the first polarization state, depicted by the solid line arrow 311, is provided incident to the thick sample 320 at a plurality of N incidence angles sequentially during an image acquisition process. The surface of the thick sample 320 reflects electromagnetic radiation in the first polarization state, depicted by the solid line arrow 312. The surface-reflected radiation generally maintains the first polarization state. Radiation that scatters beneath the surface of the thick sample 320 becomes depolarized, depicted by the dotted line arrow 313.

The EPI-FP-THICK system 300 also includes a first optical system 330, a second polarizer system 335 receiving radiation from the first optical system 330, and a radiation detector 340 receiving radiation from the second polarizer system 335. The first optical system 330 comprises one or more components configured to collect radiation issuing from the thick sample 320 and to propagate radiation to the second polarizer system 335. The first optical system 330 includes collection optics such as, for example, an imaging lens (e.g., objective lens).

As used herein, a second polarizer system generally refers to an assembly of components that can analyze the polarization of electromagnetic radiation. In certain aspects, the second polarizer system is configured so that the radiation detector can measure separate intensity distributions $I_1$ and $I_2$ from incident electromagnetic radiation of the first polarization state and of the second polarization state respectively for each incidence angle or for each aperture location. The second polarizer system analyzes the received radiation by passing radiation of the first polarization state to the radiation detector so that it can capture an intensity image based on the first polarization state. The second polarizer system also analyzes the received radiation to pass radiation of the second polarization state to the radiation detector so that it can capture an intensity image based on the second polarization state. In one aspect, the second polarizer system has a first polarizer in a first orientation associated with the first polarization state and a second polarizer in a second orientation orthogonal to the first orientation. In other aspects, the second polarization system is an interwoven arrangement of first and second polarizer elements in orthogonal orientations. In other aspects, the second polarization system has a single polarizer that is rotated between two orthogonal orientations so that it passes radiation in a first polarization state when the polarizer is in a first orientation and passes radiation in a second polarization state when the polarizer is in a second orientation.

In certain aspects, the second polarizer system may include one or more polarizers that are configured to pass electromagnetic radiation of at least a first polarization state and a second polarization state orthogonal to the first polarization state. Although the second polarizer system is described in many examples as passing radiation of two orthogonal polarization states, the second polarization system may pass radiation of three or more polarization states in other examples. In one aspect, the second polarizer system includes one or more polarizers that are configured to pass electromagnetic radiation of at least three polarization states. For example, the second polarizer system may include, one or more polarizers oriented at 0 degrees, 45 degrees, 90 degrees, so that the second polarizer system may be used to allow the radiation detector to capture 4 unique images (one through each polarizer). The first image will be $I_1$ in Eqn. 1 and Eqn. 2, and the last 3 of these images can be $I_2$, which will result in 3 unique equations. The solutions to each of these equations may be added together, for example, or combined in another unique manner, to improve performance.

Referring back to FIG. 3, the second polarizer system 335 analyzes the received radiation by passing radiation of the first polarization state to the radiation detector 340. The radiation detector 340 receives the radiation passed to measure a first intensity distribution $I_1$ based on the first polarization state for each incidence angle. The second polarizer system 335 further analyzes the received radiation by passing radiation of the second polarization state to the radiation detector 340 to capture a second intensity distribution $I_2$ based on the second polarization state for each incidence angle. As shown, the second polarizer system 335 receives electromagnetic radiation propagated from the first optical system 330. The second polarizer system 335 is configured to pass electromagnetic radiation of the first polarization state to the radiation detector 340. The radiation detector 340 measures a sequence of N intensity distributions $I_1$ during sequential illumination at the N incidence angles. The second polarizer system 335 is also configured to pass electromagnetic radiation of a second polarization state to the radiation detector 340. The radiation detector 340 measures a sequence of N intensity distributions $I_2$ at during sequential illumination by the N incidence angles. The second polarizer system 335 is configured so that the radiation detector 340 can measure separate intensity distributions $I_1$ and $I_2$ of electromagnetic radiation of the first polarization state and the second polarization state respectively for each incidence angle. During the image acquisition process, the radiation detector 340 measures intensity distributions $I_1$ and $I_2$ over time to acquire two sequences of N low-resolution intensity measurements (images): $I_{1,i=1 \ to \ N}$ and $I_{2,i=1 \ to \ N}$.

In FIG. 3, the EPI-FP-THICK system 300 also comprises a processor 350 such as one or more microprocessors, a computer readable medium (CRM) 360 in communication with the processor 350, and an optional (denoted by dotted line) display 330 also in communication with the processor 350. The processor 350 is in electronic communication with the radiation detector 340 to receive signal(s) with image data corresponding to two sequences of low-resolution intensity measurements. The image data may include, for example, intensity distributions, associated acquisition times, and/or other data related to imaging. The processor 350 is in electronic communication with CRM 360 (e.g., memory) to be able to transmit signals with image data in order to store to and retrieve image data from the CRM 360. Processor 350 is in electronic communication with optional display 330 to be able to send image data and instructions to display images and other output on the display 330. As depicted by a dotted line, the variable illumination source 310 is optionally in electronic communication with the processor 350, for example, to send instructions for controlling variable illumination source 310. In one case, these control instructions are implemented to synchronize the illumination times at different incidence angles with the image acquisition times of the radiation detector 340. The electronic communication between certain components of this EPI-FP-THICK system 300 and other systems are in wired form in one example, in wireless form in another example, or in a combination of wired and wireless in another example.

The processor 350 retrieves and executes instructions stored on the CRM 360 to perform one or more functions of system 300 such as, for example: 1) interpreting image data, 2) generating a higher resolution image from the image data, and 3) displaying one or more images or other output from the EPI-FP-THICK method on the optional display 330. In certain aspects, the processor 350 executes instructions to perform one or more operations of the EPI-FP-THICK method. In another aspect, the processor 350 executes instructions for illuminating the variable illumination source 310. The CRM (e.g., memory) 360 stores instructions for performing one or more functions of the system 300. These instructions are executable by the processor 360 or other processing components of the system 300. The CRM 360 can also store the image data and other data used and generated by the system 300. The EPI-FP-THICK system 300 also includes an optional display 330 in electronic communication with the processor 350 to receive data (e.g., image data) and provide display data to the display 330 for viewing by an operator of the EPI-FP-THICK system 300.

In certain aspects, an EPI-FP-THICK imaging system performs an EPI-FP-THICK method comprising a measurement (image acquisition) process, reconstruction process, and optional display process. During the image acquisition process, the thick sample 320 is illuminated from a plurality of N incidence angles having a first polarization state using the variable illumination source 310 and the first polarizer system 305. The surface of the thick sample 320 reflects electromagnetic radiation, which generally maintains its first polarization state. Radiation that scatters beneath the surface of the thick sample 320 becomes randomly polarized (depicted by dotted lines) radiation 313. The second polarizer system 335 is configured so that the electromagnetic radiation is passed to the radiation detector 340 so that the radiation detector 340 can measure separate intensity distributions $I_1$ and $I_2$ of electromagnetic radiation of the first polarization state and the second polarization state respectively for each incidence angle. During the image acquisition process, the radiation detector 340 measures intensity distributions $I_1$ and $I_2$ at a plurality of N incidence angles to capture two sequences of N low-resolution intensity measurements (images) $I_{1,i}$ and $I_{2,i}$, where i=1 to N. The processor 350 receives the image data with the two sequences of N low-resolution images. For each incidence angle, the processor 350 determines the difference in values between the intensity distributions: $I_{s,i}=I_{1,i}-I_{2,i}$ to estimate a surface intensity image at that incidence angle. For the N incidence angles, the processor 350 determines a sequence of N surface images $I_{s,i=1 to N}$, based on reflected radiation from the surface of the thick sample 320. During the recovery process, the N surface images $I_{s,i=1 to N}$ are iteratively combined in Fourier space to generate a higher-resolution image data (intensity and/or phase). During an optional display process, the higher resolution image and/or other data is provided as display data to the optional display 330.

Although EPI-FP-THICK systems and methods are generally described herein with reference to imaging of a thick sample, it would be understood that these systems and methods can also be used to image thin samples. As used herein, a thick sample generally refers to a sample having a nominal thickness in the range of 50 µm to 10 mm. In one case, a thick sample has a nominal thickness in the range of 50 µm to 100 µm. In another case, a thick sample has a nominal thickness in the range of 100 µm to 200 µm. In yet another case, a thick sample has a nominal thickness in the range of 2 mm to 3 mm.

In certain aspects, a sample includes one or more objects and/or one or more portions of an object. An object may be, for example, a biological entity or an inorganic entity. Some examples of biological entities are whole cells, cell components, microorganisms such as bacteria or viruses, and cell components such as proteins. An example of an inorganic entity is a semiconductor wafer. In certain cases, the sample being imaged has one or more objects in a medium such as a liquid. Although not shown in illustrated examples, the EPI-FP-THICK systems may have a receptacle for receiving the sample. For example, the receptacle may have one or more transparent walls such as a glass slide.

In certain aspects, an EPI-FP-THICK system comprises a processor (e.g., one or more microprocessors), a computer readable medium (CRM) in communication with the processor, and an optional display in communication with the processor. The processor is communication with the CRM to retrieve stored instructions. The processor executes these instructions to perform one or more functions of the EPI-FP-THICK system such as, for example, 1) interpreting image data, 2) generating a higher resolution image from the image data, and 3) displaying one or more images or other output from the EPI-FP-THICK method on the optional display. In certain aspects, the processor executes instructions to perform one or more operations of the EPI-FP-THICK method. For example, the processor can execute instructions to determine the difference in intensity $I_1-I_2$ at each incidence angle to determine a sequence of N images $I_{i=1 to N}$. During the recovery process, the processor can execute instructions to iteratively combine in Fourier space the N surface images $I_s$ to generate a higher-resolution image data (intensity and/or phase). During the optional display process, the processor can also execute instructions to communicate image data to the display. The CRM (e.g., memory) stores instructions for performing one or more functions of the system. These instructions are executable by the processor or other processing components of the system. The CRM can also store the image data and other data used and generated by the system. The optional display is in electronic communication with the processor to receive data (e.g., image data) and provide display data to the display, for example, to an operator of the EPI-FP-THICK system. In one example, the display is a color display or a black and white display. In one aspect, the display is a two-dimensional display or a three-dimensional display. In another aspect, the display is capable of displaying multiple views.

EPI-FP-THICK systems in configuration A include a variable illumination source with one or more radiation sources configured to provide electromagnetic radiation that approximates plane wave illumination at a sequence of N incidence angles. Generally, N is a value in a range from 2 to 1000. In certain aspects, the variable illumination source activates one or more of its radiation sources to provide approximately plane wave radiation from a single incidence angle, for example, during acquisition of both $I_1$ and $I_2$ intensity images. Over a run of an image acquisition process, the variable illumination source sequentially activates different radiation sources at different locations to provide approximately plane wave radiation from a sequence of N incidence angles. Each incidence angle corresponds to a location of the corresponding acquired image data in Fourier space. Adjacent incidence angles in the spatial domain correspond to neighboring regions in Fourier space.

In certain aspects, the variable illumination source is designed to provide radiation at incidence angles that provide for an overlapping area of neighboring regions of image data in Fourier space where the overlapping area is of at least a certain minimum amount (e.g. 75% overlap, 70% overlap, 80% overlap, etc.).

In certain aspects, the variable illumination source of EPI-FP-THICK systems in configuration A has discrete stationary illuminating elements at different spatial locations. Each illuminating element has one or more radiation sources (e.g., RGB sources). Examples of discrete stationary illuminating elements that provide visible light are a liquid crystal display (LCD) pixels and LEDs. In one aspect, the discrete stationary illuminating elements are arranged in a linear array. In another aspect, the discrete stationary illuminating elements are arranged in a rectangular grid (i.e. two-dimensional array). In one aspect, the discrete stationary illuminating elements are arranged in one or more concentric circles (rings) such as concentric LED array rings. In another aspect, the discrete stationary illuminating elements are arranged in a curvilinear grid.

In certain aspects, the variable illumination source has an illuminating element that is moved to a plurality of N spatial locations using a mechanism such as a raster scanner. In yet other aspects, the variable illumination source has a stationary illuminating element and the other components of the system are moved to different spatial locations to provide the relative movement. Based on this relative movement between the stationary illuminating element and the other components of the system, the illuminating element can provide illumination from the plurality of N incidence angles.

If the variable illumination source has discrete stationary illuminating elements, discrete illuminating elements are sequentially illuminated. The order of illumination is defined in illumination instructions with illumination times of individual elements. In one example where the two-dimensional matrix of discrete illuminating elements is a rectangular array, a central discrete illuminating element is determined. The illumination instructions instruct to illuminate the central discrete illuminating element first, then illuminate the 8 illuminating elements surrounding the central illuminating element going counterclockwise, then illuminate the 16 illuminating elements surrounding the previous illuminating elements going counterclockwise, and so on until the variable illumination source has provided illumination from the plurality of N incidence angles $(\theta x_{i,j}, \theta y_{i,j})$, i=1 to N. In another example where the two-dimensional matrix of illuminating elements is a polar matrix such as one or more concentric rings, the illumination instructions instruct to illuminate the illuminating elements at smallest radius first (e.g., in clockwise, counterclockwise, or random order), then illuminate any illuminating element at a larger radius, and so on until all the variable illumination source has provided radiation from the plurality of N incidence angles $(\theta x_{i,j}, \theta y_{i,j})$, i–1 to N. In another example where the two-dimensional array of illuminating elements is a rectangular or a polar array, an illuminating element closest to the sample is determined. The illumination instructions instruct to illuminate the illuminating element closest to the sample, and then illuminate the illuminating element next closest to the sample, and then illuminate the illuminating element next closest, and so on until the N discrete illuminating elements have been illuminated from the plurality of N incidence angles. In another example, the discrete illuminating elements are illuminated in a random order. In another example, a sequential column by column order is followed such as, for example, $(X_1, Y_1)$, $(X_1, Y_2)$, $(X_1, Y_3)$, ..., $(X_1, Y_n)$, $(X_2, Y_1)$.

The EPI-FP-THICK systems of either configuration A or configuration B comprise one or more radiation sources for providing electromagnetic radiation. Although the radiation source(s) are usually coherent radiation sources in many examples, incoherent radiation source(s) may also be used in some cases and computational corrections applied. In some cases, the radiation sources provide visible light. In other cases, the radiation sources provide x-ray radiation. In other cases, the radiation sources provide microwave radiation. In other cases, the radiation sources provide infrared radiation. In other cases, the radiation sources provide Terahertz radiation. In other cases, the radiation sources provide acoustic radiation. In cases that use visible light radiation, the radiation source(s) is a visible light source. Some examples of a radiation source of visible light include a liquid crystal display (LCD) pixel and a pixel of a light emitting diode (LED) display. In cases that use X-ray radiation, the radiation source comprises an X-ray tube and a metal target. In cases that use microwave radiation, the radiation source comprises a vacuum tube. In cases that use acoustic radiation, the radiation source comprises an acoustic actuator. In cases that use Terahertz radiation, the radiation source comprises a Gunn diode. In cases that use Terahertz radiation, the frequencies of the radiation provided by the radiation source may be in the range of about 0.3 to about 3 THz. In one case that uses microwave radiation, the frequencies of the radiation provided by the radiation source is in the range of about 100 MHz to about 300 GHz. In one case that uses X-ray radiation, the wavelengths of the radiation provided by the radiation source is in the range of about 0.01 nm to about 10 nm. In one case that uses acoustic radiation, the frequencies of the radiation provided by the radiation source is in the range of about 10 Hz to about 100 MHz. For simplicity, visible light is used in description of many systems but it would be understood that other types of electromagnetic radiation may be used.

In EPI-FP-THICK systems of either configuration A or configuration B, the properties of the radiation from the activated radiation source(s) is uniform or nearly uniform. In some cases, the properties vary at different times, for example, by providing n different wavelengths $\lambda_1, \ldots, \lambda_n$ during the image acquisition process. In other cases, the radiation source provides RGB illumination of three wavelengths $\lambda_1$, $\lambda_2$, and $\lambda_3$ corresponding to red, green, blue colors, respectively. In examples that use Terahertz radiation, the frequencies of the radiation provided by the radiation source may be in the range of about 0.3 to about 3 THz. In examples that use microwave radiation, the frequencies of the radiation provided by the radiation source are in the range of about 100 MHz to about 300 GHz. In examples that use X-ray radiation, the wavelengths of the radiation provided by the radiation source are in the range of about 0.01 nm to about 10 nm. In examples that use acoustic radiation, the frequencies of the radiation provided by the radiation source are in the range of about 10 Hz to about 100 MHz.

As used herein, a radiation detector generally refers to a device that measures an intensity distribution of radiation received at the detector plane over a particular exposure time to acquire each intensity image. During an image acquisition process, the radiation detector measures intensity distributions $I_1$ and $I_2$ at each incidence angle to acquire two sequences of N low-resolution intensity measurements (images) $I_1$ and $I_2$, where i=1 to N. If visible light is being measured, the radiation detector is one of a charge coupled device (CCD), a CMOS imaging sensor, an avalanche photo-diode (APD) array, a photo-diode (PD) array, a photomultiplier tube (PMT) array, or like device. If using THz radiation, the radiation detector is an imaging bolometer. If using microwave radiation, the radiation detector is an antenna. If X-ray radiation is used, the radiation detector is an x-ray sensitive CCD. If acoustic radiation is used, the radiation detector is a piezoelectric transducer array. These examples of radiation detectors and others are commercially available. In some cases, the radiation detector is a color detector e.g. an RGB detector. In other cases, the radiation detector need not be a color detector. In certain cases, the radiation detector is a monochromatic detector. In certain aspects, the radiation detector has discrete detecting elements (e.g., pixels). In some cases, the discrete detecting elements have a size in the range of 1 to 10 μm. In one case, the radiation detecting element is a square pixel having a size of 5.5 μm. In some cases, the discrete detecting elements are either circular, rectangular, square, or other geometrical shape. In one example, the radiation detector is a CMOS or CCD sensor. In one example, the radiation detector has discrete APD or PMT detecting elements with a size in the range of 1-4 mm.

As used herein, an acquisition time refers to the instant in time at which the radiation detector starts to measures intensity of incident radiation to capture an intensity image over an exposure time. The radiation detector has a sampling rate for acquiring images. In one case, the sampling rate ranges from 0.1 to 1000 images per second. During an exemplary image acquisition process, the radiation detector measures two sequences of N low-resolution intensity images $I_1$ and $I_2$. In one example, the number of images in each sequence is within the range of 2 to 10,000. In another example, the number of images in each sequence is 100. In another example, the number of images in each sequence is 200. In another example, the number of images in each sequence is 225.

As used herein, Fourier space refers to a mathematical space spanned by wave vectors kx and ky being the coordinate space in which the two-dimensional Fourier transforms of the spatial images created by the EPI-FP-THICK systems reside. Fourier space refers to the mathematical space spanned by wavevectors kx and ky in which the two-dimensional Fourier transforms of the spatial images collected by the radiation sensor reside.

During an exemplary image acquisition process of an EPI-FP-THICK imaging method, the radiation detector measures intensity distributions $I_1$ and $I_2$ at different incident angles or aperture locations to acquire two sequences of N low-resolution intensity measurements (images) $I_{1,i=1\ to\ N}$ and $I_{2,i=1\ to\ N}$. The processor determines the difference between each $I_1$ and $I_2$ to determine N surface images $I_{S,i-1\ to\ N}$. During the ptychographic recovery process, the N surface images are iteratively combined in Fourier space to generate higher-resolution image data (intensity and/or phase). Image data includes one or more of the low-resolution intensity measurements, higher resolution images, acquisition times, exposure times, and other data related to EPI-FP-THICK imaging method.

Each of the N surface images is associated with a region in Fourier space corresponding to an incidence angle for configuration A and corresponding to an aperture location for configuration B. In Fourier space, neighboring regions may share an overlapping area over which they sample the same Fourier domain data. This overlapping area in Fourier space corresponds to the location of neighboring incidence angles of aperture locations. In one aspect, the overlapping area in the Fourier domain data is the range of about 2% to about 99.5% of the area of one of the regions. In another aspect, the overlapping area between neighboring regions has an area that is in the range of about 65% to about 75% the area of one of the regions. In another aspect, the overlapping area between neighboring regions has an area that is about 65% of the area of one of the regions. In another aspect, the overlapping area between neighboring regions has an area that is about 70% of the area of one of the regions. In another case, the overlapping area between neighboring regions has an area that is about 75% of the area of one of the regions.

As used herein, a low-resolution image is an intensity distribution measured by the radiation detector over an exposure time starting at each acquisition time. The radiation detector measures intensity distributions $I_1$ and $I_2$ at each incidence angle for Configuration A and at each aperture location for Configuration B. The processor determines the difference in intensity based on: $I_i = I_{1,i} - I_{2,i}$ at each acquisition time or aperture location to determine a sequence of N surface images $I_{s,i=1 to N}$ using the EPI-FP-THICK method. As used herein, a high resolution image is an image determined from a sequence of N surface images $I_{s,i=1 to N}$ using Fourier ptychographic reconstruction process.

As used herein, a first image $I_1$ generally refers to a intensity distribution of incident radiation in a first polarization state measured by the radiation detector and a second image $I_2$ refers to an intensity distribution of incident radiation in the second polarization state. According to certain aspects, the first polarization state is a single linear polarization and the second polarization state is a single linear polarization.

EPI-FP-THICK systems in configuration A comprise a first optical system with optical components configured to collect radiation issuing from the sample. The first optical system includes collection optics such as, for example, an imaging lens (e.g., objective lens). In certain aspects, the collection optics filters radiation it collects based on its acceptance angle. That is, radiation outside the acceptance angle will not be collected. This acceptance angle of objective lens corresponds to the diameter of a circular pupil region in Fourier space. In one example, the collection optics is an objective lens with an NA of about 0.50.

EPI-FP-THICK systems of either configuration A or configuration B comprise a first polarizer system and a second polarizer system. In certain aspects, each of the first and second polarization systems comprise one or more linear polarizers, each polarizer designed to pass electromagnetic waves of a single linear polarization.

In certain aspects, the first polarizer system has a polarizer that passes electromagnetic waves of a first polarization state and blocks electromagnetic waves of other polarizations. In one example, the first polarizer is a film placed on the surface of an LED array. In certain examples, the first polarizer has a first orientation.

In certain aspects, the second polarizer system refers to an assembly that analyzes incident radiation to separate radiation in a first polarization state from radiation in a second polarization state. The second polarizer system is located between the radiation detector and the sample being imaged. In certain aspects, the second polarization system is located adjacent the radiation detector. The second polarizer system analyzes the received radiation to pass radiation of the first polarization state to the radiation detector so that it can measure an intensity distribution to capture a first intensity image $I_1$ based on the first polarization state. The second polarizer system also analyzes received radiation to pass radiation of the second polarization state to the radiation detector so that it can measure an intensity distribution to capture an second intensity image $I_2$ based on the second polarization state. The second polarizer system is generally configured so that the radiation detector can measure separate intensity distributions $I_1$ and $I_2$ from received electromagnetic radiation of the first polarization state and the second polarization state respectively. The first polarization state refers to the polarization of the radiation issuing from the first polarization system.

In certain aspects, the second polarizer system includes a single polarizer and a mechanism that rotates the polarizer between a first orientation and a second orientation orthogonal to the first orientation (two orthogonal orientations). In some cases, the first orientation is determined so that when the polarizer is in the first orientation, the second polarizer system passes radiation in the first polarization state and blocks electromagnetic waves of other polarizations. Also, the second orientation is determined so that when the polarizer is in the second orientation, the second polarizer system passes radiation in the second polarization state and blocks electromagnetic waves of other polarizations. In these cases, the radiation detector can measure the first intensity distribution h during a first exposure time when the polarizer is in the first orientation and a second intensity distribution $I_f$ during a second exposure time when the polarizer is in the second orientation. In some cases, the first orientation of the second polarizer system is the first orientation of the first polarization system. In one example, the single polarizer is rotated between the horizontal "H" and vertical "V" orientations.

In certain aspects, the second polarizer system includes an interleaved arrangement of polarizer elements. Certain polarizer elements are in a first orientation and other polarizer elements are in a second orientation orthogonal to the first orientation. In one example, the interleaved arrangement is a checkerboard of polarized elements in the first orientation and in the second orientation. In some cases, the polarized elements are aligned in one to one correspondence with the discrete radiation detecting elements of a radiation detector. In one aspect, the interleaved arrangement of polarizer elements is in a layer of material covering an LED array so that each LED is covered by a polarizer element. EPI-FP-THICK systems having a second polarization system with an interleaved arrangement can capture separate intensity distributions $I_1$ and $I_2$ during the same exposure time. In some cases, the first orientation of the second polarizer system is the first orientation of the first polarization system. In one example, the first and second orientations are the horizontal "H" and vertical "V" orientations respectively or the horizontal "H" and vertical "V" orientations respectively.

In certain aspects, the second polarizer system includes a first polarizer in a first orientation and a second polarizer in a second orientation. In these aspects, the polarizers do not change positions. The first polarizer passes radiation in the first polarization state and blocks electromagnetic waves of other polarizations and the second polarizer passes radiation in the second polarization state and blocks electromagnetic waves of other polarizations. In one example, the first polarizer is located next to the second polarizer. In this example, the radiation detector can measure the first intensity distribution $I_1$ and second intensity distribution $I_2$ during the same exposure time. In one aspect, the first polarizer is the horizontal "H" orientation and the second polarizer is in the vertical "V" orientation. In another aspect, the second polarizer is the horizontal "H" orientation and the first polarizer is in the vertical "V" orientation. In some cases, the first orientation of the second polarizer system is the first orientation of the first polarization system.

The second polarizer system is described in certain examples as having two orthogonal polarizers in "H" and "V" orientations or a single polarizer rotated between "H" and "V" orientations, which refer to horizontal and vertical directions respectively. These examples are described, for simplicity, using "H" and "V" orientations, and it would be understood that other orthogonal orientations can be used. For example, polarizers of certain second polarization systems can have orthogonal polarizations that are right-hand circular/left-hand circular. These right-hand circular/left-hand circular polarizers typically contain a linear polarizer that is followed by a quarter wave plate, the latter of which transforms the linearly polarized radiation from the first linear polarizer into circularly polarized radiation. Circular polarizers typically block less electromagnetic radiation than the H" and "V" orientated polarizers and thus may be particularly useful where efficiency is an issue.

Figure 4:
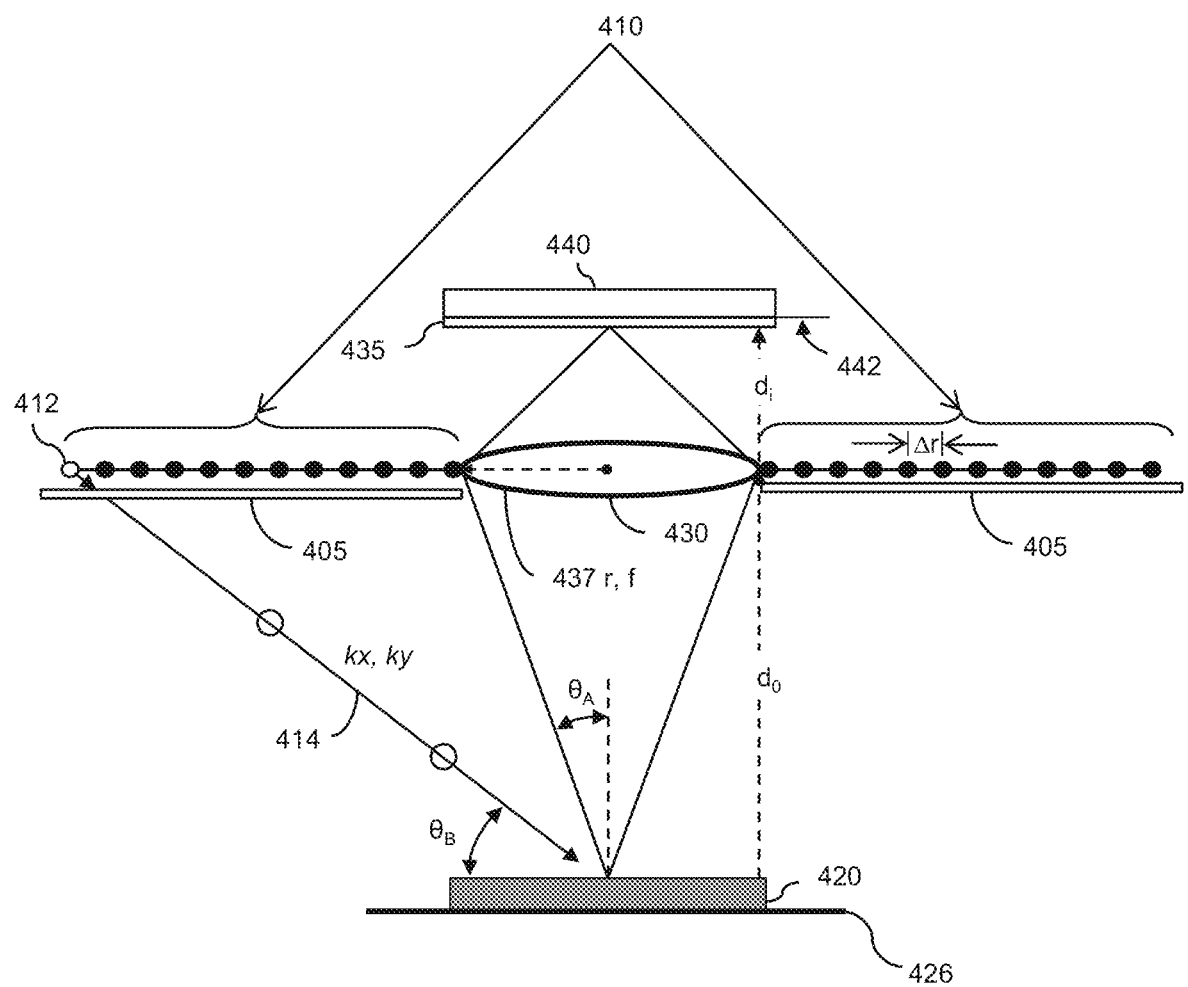
FIG. 4 is a drawing of a cross-sectional view of components of an epi-illumination Fourier ptychographic imaging system with components arranged according to configuration A, according to an embodiment.
Figure 5:
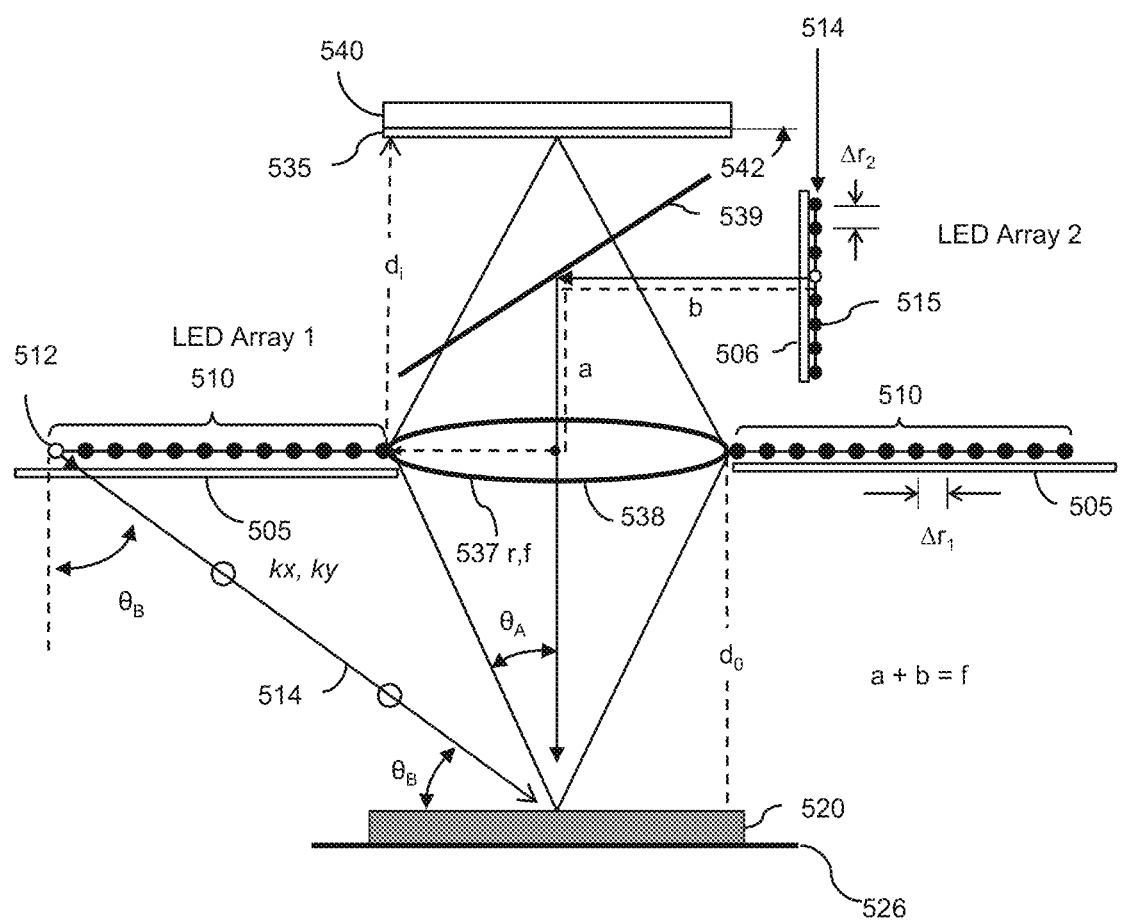
FIG. 5 is a drawing of a cross-sectional view of components of an epi-illumination Fourier ptychographic imaging system with components arranged according to configuration A, according to an embodiment.

FIGS. 4 and 5 depict examples of EPI-FP-THICK systems with components arranged in configuration A. Although not shown in these Figures, these EPI-FP-THICK systems comprise a processor and a CRM in communication with the processor. In one aspect, an optional display is in communication with the processor. The processor is also in communication with the radiation detector to receive image data. In one aspect, the processor is also in communication with the variable illumination source to synchronize radiation at different incidence angles with acquisition times of the radiation detector.

FIG. 4 is a drawing of a cross-sectional view of components of an EPI-FP-THICK system 400 with components arranged in configuration A, according to an embodiment. The EPI-FP-THICK system 400 comprises an image acquisition assembly including a circular variable illumination source 410, a first polarization system 405, an optical system 430 having an imaging lens 437, a second polarization system 435, and a radiation detector 440 having a detector plane 442. A sample 420 is shown on a sample surface 426. The imaging lens 437 has a focal length f, a radius r, and an acceptance angle $20_A$. In one aspect, the imaging lens 437 has an NA in the range of about 0.60 to about 0.75. The cross-sectional view is through the centerline of the first optical system 430 of the image acquisition assembly.

The cicular variable illumination source 410 shown in FIG. 4 is in the form of concentric cicular LED rings. The cicular variable illumination source 410 has discrete illuminating elements 412 (e.g., LEDs) arranged in 12 concentric LED rings equally spaced between each ring and centered around a central axis and around the imaging lens 437. Other numbers concentric rings can be used in other examples such as 1, 2, 3, 4, 5, 6, . . . 20. In FIG. 4, the discrete illuminating elements 412 are located at the sample plane of the imaging lens 437. In other examples, illuminating elements are located at an offset plane, and still remain on the same side of the sample as the imaging lens in order to provide epi-illumination. The concentric rings are equispaced from each other with a uniform radial spacing defined as Δr. The cicular variable illumination source 410 is located at a distance, equal to the working distance $d_o$, above the sample 420.

In FIG. 4, the first polarization system 405 is in the shape of a cicular ring located between the illuminating elements of the cicular variable illumination source 410 and the sample 420. In one aspect, the first polarization system 405 is a polarizer film disposed on the surface of the radiation detector 440 (e.g., LED array). The second polarization system 435 is located adjacent the radiation detector 440 and between the radiation detector 440 and the imaging lens 437. The illustrated example includes a distance $d_i$ between the imaging lens 437 and the radiation detector 440 and a working distance $d_o$ between the imaging lens 437 and the sample 20. Although the dimensions of the illustrated EPI-FP-THICK system 400 are f=5 cm, $d_i$=7.02 cm, $d_o$=17.3, r=0.25 cm, $O_B$=30 degrees, and $O_A$=3 degrees, other dimensions can be used in other examples. In the illustrated example, the imaging lens 437 is shown in the scale of a large camera lens so that the working distance $d_o$ is large such as, for example, in the range of about 10-20 cm. In other examples, a smaller lens can be used, such as a microscope lens, in which case the working distance $d_o$ would be smaller such as, for example, in the range of about 2-3 cm.

In FIG. 4, the EPI-FP-THICK system 400 is shown at a single acqusition time (i.e. instant in time) during an image acquisition process. At this acquisition time, the illuminating element 412 of the variable illumination source 410 is activated to provide radiation at an incidence angle of $\theta_B$ with a wavevector of (kx,ky). The first polarization system 405 polarizes the radiation from the illuminating element 412 to a first polarization state. During a single run of an acquisition process, the variable illumination source 410 together with the first polarization system 405 generates radiation 414 in a first polarization state from a plurality of N incidence angles sequentially.

At each incidence angle, the imaging lens 437 receives radiation issuing from the sample 420 within its acceptance angle. The imaging lens 437 propagates the filtered radiation to the second polarization system 435. For each incidence angle, the second polarization system 435 analyzes the received radiation to pass radiation of the first polarization state to the radiation detector 440 to capture and intensity image $I_1$ based on the first polarization state and passes radiation of the second polarization state to the radiation detector 440 to capture an intensity image $I_2$ based on the second polarization state. During a single run of an acquisition process, the radiation detector 440 measures intensity distributions $I_1$ and $I_2$ at N acquisition times to acquire two sequences of N low-resolution intensity measurements (images): $I_{1,i=1\ to\ N}$ and $I_{2,i=1\ to\ N}$. The processor (not shown) receives the image data with the two sequences of N low-resolution images. For each incidence angle, the processor determines the difference in values between the intensity distributions: $I_s=I_{1,i}-I_{2,i}$ to estimate a surface intensity image at that incidence angle. For the N incidence angles, the processor determines a sequence of N surface images $I_{s,i=1toN}$, based on reflected radiation from the surface of the thick sample 420. During the recovery process, the N surface images $I_{s,i=1toN}$ are iteratively combined in Fourier space to generate a higher-resolution image data (intensity and/or phase). During an optional display process, the higher resolution image and/or other data is provided as display data to the optional display (not shown).

The variable illumination source 410 of FIG. 4 does not have discrete elements at the center where the the imaging lens 437 is located. Without disrete illuminating elements at the center, the intensity images acquired by the radiation detector 440 will not include low spatial frequencies. In some applications, such as charaterization of slowly-varying phase objects, or when accurate knowledge of the reflectance from the entire object surface is required, this low spatial frequency information may be valuable. The EPI-FP-THICK system 400 shown in FIG. 4 has a large working distance that neglects low spatial frequencies, and a simple design with few components. Since the EPI-FP-THICK system 400 does not collect information at low spatial frequencies, the EPI-FP-THICK system 400 is well suited for imaging of high resolution feautures or defects, for example, in chip inspection applications.

FIG. 5 is a drawing of a cross-sectional view of components of an EPI-FP-THICK system 500 with components arranged according to configuration A, according to an embodiment. Certain components of the EPI-FP-THICK system 500 are similar to those of EPI-FP-THICK system 400 shown in FIG. 4. The EPI-FP-THICK system 500 comprises an image acquisition assembly including a variable illumination source with a first set of twelve (12) concentric rings (e.g., LED rings) 510 and a second set of eight (8) concentric rings (e.g., LED rings) 514, a first polarization system with a first polarizer 505 and a second polarizer 506, an optical system 538 with an imaging lens 537, a beamsplitter 539, a second polarization system 535, and a radiation detector 540 with a detector plane 542. A sample 520 is shown on a sample surface 526.

In FIG. 5, the first polarization system comprises a a first polarizer 505 in the shape of a circular ring located between the discrete elements 512 of the first set of twelve (12) concentric rings (e.g., LED rings) 510 and the sample 520. The first polarization system also includes a second polarizer 506 in the shape of a circular ring located between the discrete elements 515 of the second set of eight (8) concentric rings (e.g., LED rings) 514 and the beamsplitter 539. In one aspect, the first and/or second polarizers are films. The second polarization system 535 is located adjacent the radiation detector 540 and between the radiation detector 540 the beamsplitter 539.

In FIG. 5, the EPI-FP-THICK system 500 is configured to capture low spatial frequencies that may be omitted by the configuration shown in FIG. 4. The EPI-FP-THICK system 500 is configured to capture low spatial frequencies by including a beamsplitter 539 and the second concentric rings 514 with a smaller radius on the other side of the imaging lens 538. The discrete discrete elements 515 of the second concentric rings 514 are directed toward the image plane of the imaging optics and are focused through the imaging optics to illuminate the thick sample 520. The illustrated example shows a working distance $d_o$ between the imaging lens 538 and the sample 520. The illustrated example also includes a distance $d_i$ between the imaging lens 538 and the radiation detector 540. The beam-splitter 539 is configured to transmit half the radiation incident at a 45 degree angle to the beam-splitter 539 and not absorbed by the beam-splitter 539. The remaining half of the incident radiation (not absorbed) is reflected by the beam-splitter 539. In one aspect, the beam splitter 539 is comprised of a sheet of glass or other substrate with a coating designed to control the radiation accordingly. In another example, the beam splitter 539 is a half-silvered mirror with a continuous thin coating of reflective material (e.g., metal). In yet another example, the beam splitter 539 is a swiss cheese beam splitter which has a discontinuous coating with holes to obtain the desired ratio of reflection to transmission.

The imaging lens 537 has a focal length f, a radius r, and an acceptance angle $2\theta_A$. In the illustrated example, the imaging lens 138 accepts radiation within its acceptance angle, $2\theta_A$. Although the the dimensions of the illustrated EPI-FP-THICK system 400 are f=6 cm, NA~0.16, $d_i$=12 cm, $d_o$=12, r=2 cm, $\theta_B$=30 degrees, and $\theta_A$=5 degrees, other dimensions can be used. To maintain a large lens-sample distance, the imaging lens 138 has a relatively low NA in the range of about 0.1 to about 0.3. In the illustrated example, the imaging lens 538 has an NA of about 0.16, which is a relatively low NA. In other examples of a system with a low NA, the NA is about 0.08 in one example, about 0.09 in another example, about 0.10 in another example, in a range of between about 0.07 to about 0.20 and another example.

In the illustrated example, the imaging lens 538 may be, for example, a large camera lens having a focal length f of 6 cm and a radius r of 2 cm. If using a large camera lens, the EPI-FP-THICK system 400 will have a corresponding large working distance $d_o$ such as, for example, about 10-20 cm. In other examples, a smaller lens is used such as a microscope lens, in which case the working distance $d_o$ would be smaller such as, for example, about 2-3 cm.

The example shown in FIG. 5 has a large working distance and can capture all spatial frequencies. That is, the missing discrete illuminating elements from the example shown in FIG. 4 are provided by the second set of concentric rings 514 placed behind the optics.

In FIG. 5, the optical path distance between the beam splitter 539 and the second set of concentric rings 514 is designated as b and the optical path distance between the beam spitter 539 and the imaging lens 538 is designated as a. In the illustrated example, the optical system 538 is configured so that the imaging lens 537 is located at a combined optical path distance of a+b=f from the second set of concentric rings 514.

In FIG. 5, the variable illumination source comprises two sets of concentric rings (e.g., circular LED arrays): a first set of twelve (12) equally-spaced concentric rings 510 (e.g., a first LED array) and a second set of eight (8) equally-spaced concentric rings 514 (e.g., a second LED array). Other numbers of concentric rings that can be used in other examples are 1, 2, 3, 4, 5, 6, etc. The first set of concentric rings 510 comprises discrete discrete elements 512 located at the plane of the imaging lens 538 and centered around the imaging lens 538. In other cases, the discrete discrete elements 512 are at one or more offset planes on the same side of the thick sample 520 as the imaging lens 538. The first set of concentric rings 510 are equally-spaced with a uniform radial spacing of $\Delta r_1$. The second set of concentric rings 514 are equally-spaced with a uniform radial spacing of $\Delta r_2$. The first set of concentric rings 514 are located at a distance, equal to the working distance $d_o$, above the sample 520. In this illustrated example, the first set of concentric rings 510 are centered around a central axis of the imaging lens 538 so that the the first set does not have discrete elements 512 across the center of the imaging lens 538. The second set of first set of concentric rings 514 has discrete elements 515 that provide radiation reflected by the beam splitter 539 through the imaging lens 538. The second set of concentric rings 510 comprises discrete elements 512 located at a plane that is at a combined optical path (a+b) of a focal length f from the imaging lens 538.

In FIG. 5, the EPI-FP-THICK 500 is is shown at a single acqusition time (i.e. instant in time) when a single discrete element 512 from the first set of concentric rings 510 is shown providing radiation 514 at an incidence angle of $\theta_B$ with a wavevector of (kx,ky). At certain image acquisition times during an image acquisition process, one of the discrete element 512 from the first set of concentric rings 510 provides radiation 514 at an incidence angle of $\theta_B$ with a wavevector of (kx,ky). The first polarizer 505 polarizes the radiation from the discrete elements 512 of the first set of concentric rings 510 to the first polarization state. At other image acquisition times of the same image acquisition process, one of the discrete elements 515 from the second set of concentric rings 514 provides radiation. The second polarizer 506 polarizes the radiation from the discrete illuminating elements 512 from the second set of concentric rings 514 to the first polarization state. If one of the discrete illuminating elements 515 is illuminated, incident radiation of a first polarization state is received by the beam splitter 539. Half the incident radiation received at the beam splitter 539 (and not absorbed) is reflected to the imaging lens 538 which propates radiation to the sample 520. Since the beam splitter 539 passes half the incident radiation, in certain aspects, each of the discrete elements 515 of the second set of concentric rings 514 has a illumination source with about two (2) times (2×) the intensity of the illumination source of each of the discrete illuminating elements 512 of the first set of concentric rings 510.

The first polarization system polarizes the incident radiation to the sample 520 to a first polarization state. During a run of an image acquisition process, the variable illumination source together with the first polarization system generates radiation in a first polarization state from a plurality of N incidence angles sequentially. Radiation issuing from the sample 520 is received at the imaging lens 538. The imaging lens 538 receives radiation within its acceptance angle to filter the radiation. The imaging lens 538 propagates incident radiation to the beam splitter 538. Half the incident radiation from the imaging lens 538 is transmitted through the beam splitter 538 and propated to the second polarization system 535. For each incidence angle, the second polarization system 535 analyzes the received radiation to pass radiation of the first polarization state to the radiation detector 540 to capture and intensity image $I_1$ based on the first polarization state and passes radiation of the second polarization state to the radiation detector 540 to capture an intensity image $I_2$ based on the second polarization state. During a single run of an image acquisition process, the radiation detector 540 measures intensity distributions $I_1$ and $I_2$ at N acquisition times to acquire two sequences of N low-resolution intensity measurements (images): $I_{1,i=1 \text{ to } N}$ and $I_{2,i=1 \text{ to } N}$. The processor (not shown) receives the image data with the two sequences of N low-resolution images. For each incidence angle, the processor determines the difference in values between the intensity distributions: $I_s=I_{1,i}-I_{2,i}$ to estimate a surface intensity image at that incidence angle. For the N incidence angles, the processor determines a sequence of N surface images $I_{s,i=1 \text{ to } N}$, based on reflected radiation from the surface of the thick sample 520. During the recovery process, the N surface images $I_{s,i=1 \text{ to } N}$ are iteratively combined in Fourier space to generate a higher-resolution image data (intensity and/or phase). During an optional display process, the higher resolution image and/or other data is provided as display data to the optional display (not shown).

Configuration B

EPI-FP-THICK systems with components arranged in configuration B comprise an aperture scanner. In certain aspects, the aperture scanner generates an aperture at a plurality of N aperture locations at different times in an intermediate plane of an optical arrangement. In other aspects, the aperture scanner generates a plurality of apertures that are shifted as a whole to a plurality of N locations at different times in an intermediate plane of the optical arrangement. In most cases, the intermediate plane is a Fourier plane conjugate to the sample plane. The EPI-FP-THICK systems further comprise a radiation detector at a detector plane that is configured to acquire intensity images of the sample.

As used herein, an aperture scanner refers to one or more devices configured to sequentially generate an aperture (or plurality of apertures) at different N locations of the intermediate plane. As used herein, an aperture of an aperture scanner generally refers to an area at a plane that alows incident radiation to pass to the next optical element in the optical arrangement. In one aspect, the area surrounding the aperture at that plane block/reflect or otherwise prevent incident radiation from passing to the next optical element. In certain aspects, the aperture is an optically transparent or substantially optically transparent area. In these aspects, the surrounding area reflects or absorbs the incident radiation. In one example, the aperture is a radiation transmissive region (e.g., hole) in an opaque plate. In other aspects, the aperture is a reflective area (e.g., one or more micromirrors or one or more reflective pixels in a display) that reflects incident radiation to the next optical element. In these aspects, the surrounding area either absorbs incident radiation or reflects incident radiation away from the next optical element. In one example, the aperture is comprised of one or more micromirrors oriented at an angle that reflects incident radiation to the next optical element. In this example, one or more micromirrors in the surrounding area are oriented at a different angle to reflect radiation away from the next optical element. In some cases, an aperture location corresponds to a centroid of the area of the aperture.

Although certain examples describe apertures of an aperture scanner as rectangular in shape with dimensions of width l and height h, other shapes such as a circular shape with radius r, triangular, etc., may be used in other examples. In addition, the aperture at different locations is described in examples as being of constant shape and size. It would be understood however that the aperture can be of varying sizes and shapes at different aperture locations in other exmaples. In one case, the area of the aperture has a size of 0.5 mm×0.5 mm. In another case, the area of the aperture has a size of 5 mm×5 mm. Aperture locations can be arranged in one or two dimensional arrays, for example. In one case, aperture locations are arranged in a linear array. In another case, aperture locations are arranged in a two-dimensional grid. In another case, aperture locations are arranged in a diagonal array. In another case, aperture locations are arranged in a curvilinear grid. In certain aspects, the plurality of N aperture locations includes an overlapping area between two or more of its neighboring apertures (i.e. apertures at adjacent aperture locations). In one example, the overlapping area is about 70% of the aperture area. In another example, the overlapping area is about 75% of the aperture area. In another example, the overlapping area is between about 2 and 90% of the aperture area.

In some aspects, mechancially-based aperture scanners mechanically shift an aperture to different aperture locations. For example, a mechanically-based aperture scanner can comprise an X-Y stage to physically translate and/or rotate a structure having an aperture (e.g., plate of opaque material having an aperture in the form of a transmissive region such as a hole in the plate) to generate the aperture at the different aperture locations. In one example, a plate with an aperture is affixed to the X-Y stage and the X-Y stage translates and/or rotates the plate in the intermediate plane to locate the aperture at the appropriate aperture locations at the corresponding acquisition times. In one case, the plate has a surface with the aperture located orthogonal to the surface. The X-Y stage translates/rotates the plate so that the surface remains in the intermediate plane.

In other aspects, display-based aperture scanners digitally display an aperture at different aperture locations in the intermediate plane. An example of a display-based aperture scanner is a spatial light modulator (SLM). As used herein, an SLM refers to a device(s) that can generate an aperture on its display. In some cases, the SLM uses an electrical and/or optical signal from an SLM illumination source to modulate phase, φ, and/or amplitude of light. In some cases, the SLM illumination source is a collimated light source such as a laser (e.g., Excelsior® 532 SM). In other cases, the SLM light source does not provide collimated light. For example, the light may be spatially filtered light from a light emitting diode (spatial coherence length of approximately 1 mm, spectral bandwidth of 20 nm), or light from a laser source (e.g., 532 nm quasi-monochromatic laser light, spatial coherence length of multiple meters). The SLM light source may be a component of the system or may be a separate component. Certain SLMs may be commercially available. In certain aspects, an SLM comprises an SLM display having a plurality of SLM display elements. Each SLM display element can be set to function as an aperture (aperture setting) or to function as the area surrounding the aperture (field setting). In some configurations, an SLM display element in an aperture setting is transparent or nearly transparent to pass incident radiation and a display element in a field setting may block/reflect or nearly bock/reflect incident radiation. In other configurations, certain SLM display elements are reflective. In these cases, a display element in the aperture setting is oriented at a (first) angle to reflect incident radiation to the next optical element in the optical arrangement and a display element in a field setting is oriented at a different (second) angle that reflects incident radiation away from the next optical element. In these configurations, the SLM display can generate an aperture at one or more SLM display elements by setting these display elements in an aperture setting and/or setting the surrounding display elements in a field setting. At different acquisition times, $t_i$, different sets of one or more display elements are at appropriate settings to generate the aperture at the corresponding aperture location. In some cases, the SLM display has a refresh rate in the range of 30 per second to 100 per second.

In EPI-FP-THICK systems in configuration B comprising an aperture scanner in the form of an SLM, different types of SLM displays can used such as, for example, a reflective liquid-crystal on silicon (LCoS) display, a digital micromirror device (DMD), etc. A reflective liquid-crystal on silicon (LCoS) display is a reflective display having a plurality of reflective display elements. An example of a commercially available LCoS display is the reflective HOLOEYE® SLM, Pluto, phase only LCoS, 8 μm pixel size, 1080×1920 pixels display. A DMD can refer to an optical semiconductor chip having on its surface multiple microscopic micromirrors. In certain aspects, each micromirror is individually rotated to an angle, α. In this way, each micromirror is transitioned to either an aperture setting at angle, α, or to a field setting at no rotation, or vice versa Although these micromirrors are usually arranged in a rectangular array (dimensions o×p), other arrangements may be used. In certain aspects, each micromirror of the DMD corresponds to one or more discrete detector elements (e.g. pixels). In one case, one or more of the micromirrors in the aperture setting is oriented so that an optical axis orthogonal to the surface of the micromirror is oriented at an angle, a, from the Fourier plane.

In EPI-FP-THICK systems comprising an aperture scanner in the form of an SLM, the SLM display is located so that its display plane at the intermediate plane (e.g., Fourier plane). In some cases, the SLM display is in the form of a two-dimensional matrix of display elements (e.g. pixels) at the display plane. The two-dimensional matrix has dimensions of $Pix_1 \times Pix_2$, where $Pix_1$ is the number of pixels in a first direction and $Pix_2$ is the number of pixels in a second direction orthogonal to the first direction. In one example, the SLM display is a 1920-by-1080 pixel display where $Pix_1$ is 1920 and $Pix_2$ is 1080. In certain aspects, the display elements of the SLM are programmed to have particular settings at different acquisition times according to illumination instructions.

EPI-FP-THICK systems with components arranged in Configuration B have an illumination source that provides radiation from a single incidence angle during the image acquisition process. In some cases, the illumination is monochromatic. In another case, the illumination source provides radiation of different wavelengths (e.g., wavelengths associated with RGB) at different acquisition times as discussed below. Although the illumination source(s) may be a coherent source(s), incoherent source(s) may also be used and computational corrections may be applied. Some examples of a source of visible light include an LCD pixel and a pixel of an LED display. In cases that use other forms of radiation, other sources of radiation may be used. For example, in embodiments that use X-ray radiation, the radiation source may comprise an X-ray tube and a metal target. As another example, in cases that use microwave radiation, the radiation source may comprise a vacuum tube. As another example, in cases that use acoustic radiation, the radiation source may be an acoustic actuator. As another example, in cases that use Terahertz radiation, the radiation source may be a Gunn diode.

In color imaging implementations if EPI-FP-THICK systems Configuration B, the illumination source may provide RGB illumination of three wavelengths $\lambda_1$, $\lambda_2$, and $\lambda_3$ corresponding to red, green, blue colors, respectively. In one case that uses Terahertz radiation, the frequencies of the radiation provided by the illumination source may be in the range of 0.3 to 3 THz. In one case that uses microwave radiation, the frequencies of the radiation provided by the variable illuminator may be in the range of 100 MHz to 300 GHz. In one case that uses X-ray radiation, the wavelengths of the radiation provided by the variable illuminator may be in the range of 0.01 nm to 10 nm. In one case that uses acoustic radiation, the frequencies of the radiation provided by the variable illuminator may be in the range of 10 Hz to 100 MHz.

Figure 6:
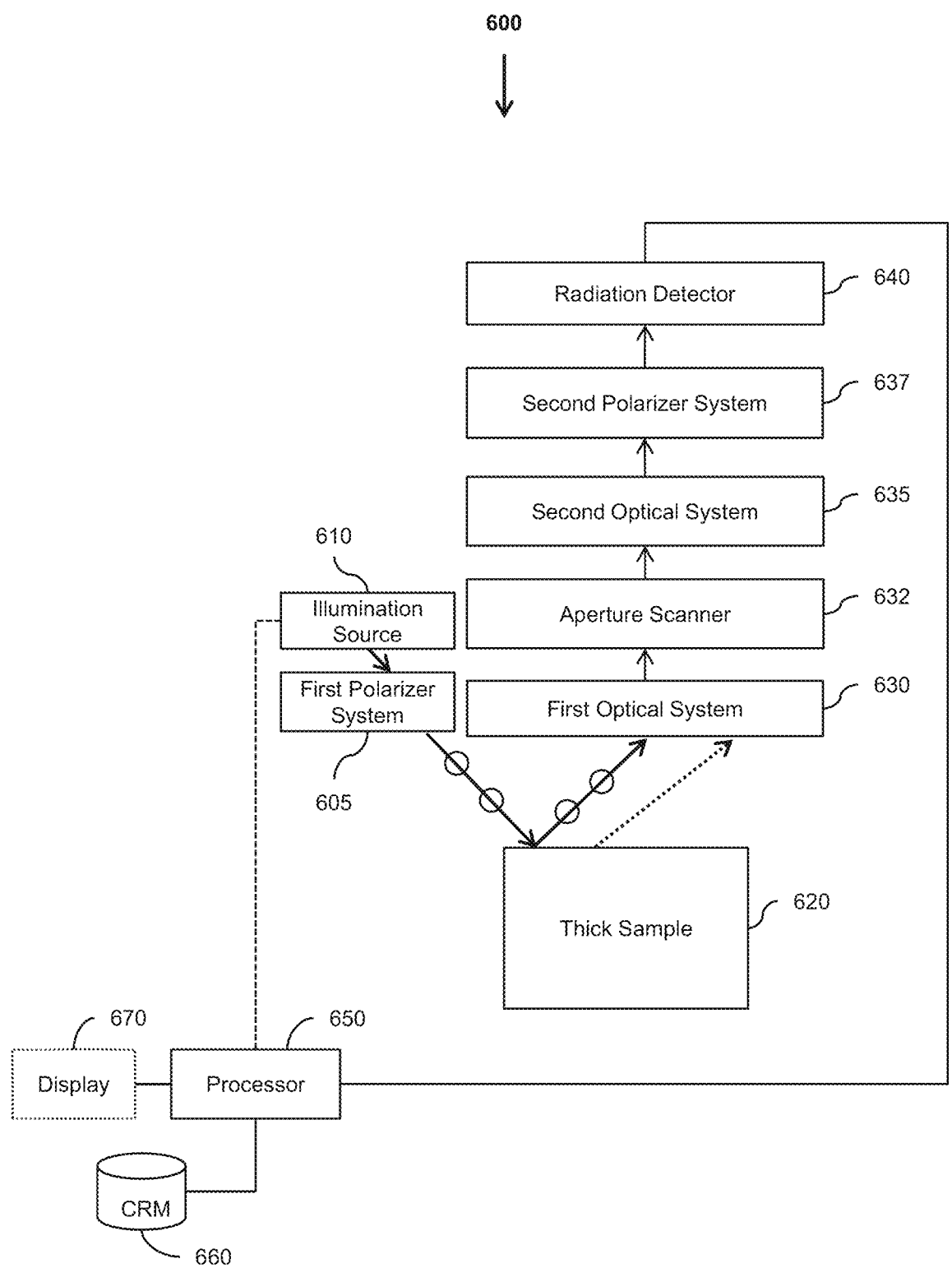
FIG. 6 is a schematic diagram of an epi-illumination Fourier ptychographic imaging system with components arranged according to configuration B, according to embodiments.

FIG. 6 is a schematic diagram an EPI-FP-THICK system 600 with components arranged in configuration B, according to an embodiment. The EPI-FP-THICK system 600 comprises an illumination source 610 providing coherent radiation and a first polarizer system 605 polarizing radiation received from the illumination source 610 to a first polarization state. The illumination source 610 and the first polarizer system 605 together provide radiation in a first polarization to the thick sample 620. The EPI-FP-THICK system 600 also comprises a first optical system 630 (e.g., first objective lens) configured to receive radiation issuing from the sample 620, an aperture scanner 632 configured to generate an aperture at a plurality of N aperture locations in an intermediate plane (e.g., Fourier plane of sample 620), a second optical system 635 (e.g., second objective lens) for receiving radiation through the aperture, a second polarizer system 637, and a detector 640 for measuring intensity distributions of radiation received through via the second polarizer system 637. The EPI-FP-THICK system 600 also comprises a processor 650 (e.g., one or more microprocessors), a computer readable medium (CRM) 660 in electrical communication with the processor 650, and an optional display 670 in electrical communication with the processor 650. The processor 650 is also in electrical communication with the detector 640. Optionally, the processor 650 is in electrical communication with the aperture scanner 632, for example, to synchronize aperture generation at different locations with image acquisition.

During an image acquisition process, the aperture scanner 632 generates an aperture at a plurality of N aperture locations in a plane (e.g., Fourier plane of the optical arrangement). The first optical system 630 receives incident radiation issuing from the sample 620. The second optical system 635 receives radiation as modulated by the aperture. The second polarizer system 637 receives radiation from the second optical system 635. The second polarizer system 637 analyzes the received radiation to pass radiation of the first polarization state to the radiation detector 640. The radiation detector 640 receives the radiation passed to measure a first intensity distribution $I_1$ based on the first polarization state for each aperture location. The second polarizer system 637 passes radiation of the second polarization state to the radiation detector 640 to capture a second intensity distribution $I_2$ based on the second polarization state for each aperture location. The radiation detector 640 measures a sequence of N intensity distributions $I_1$ and a sequence of N intensity distributions $I_2$ corresponding to the N aperture locations. The second polarizer system 640 is configured so that the radiation detector 640 can measure separate intensity distributions $I_1$ and $I_2$ of electromagnetic radiation of the first polarization state and the second polarization state respectively for each aperture location. During the image acquisition process, the radiation detector 640 measures intensity distributions $I_1$ and $I_2$ over time to acquire two sequences of N low-resolution intensity measurements (images): $I_{1,i=1\ to\ N}$ and $I_{2,i=1\ to\ N}$.

The processor 650 receives the image data with the two sequences of N low-resolution images. For each aperture location, the processor 650 determines the difference in values between the intensity distributions: $I_{s,i}=I_{1,i}-I_{2,i}$ to estimate a surface intensity image associated with that aperture location. For the N aperture locations, the processor 650 determines a sequence of N surface images $I_{s,i=1\ to\ N}$, based on reflected radiation from the surface of the thick sample 320. During the recovery process, the processor 650 can iteratively "stitch" together the plurality of N intensity images in Fourier space to recover a wide-field, complex higher resolution image of the sample 620 at the sample plane. In certain aspects, the processor 650 digitally refocuses the complex image to accommodate for any defocus of the sample and/or aberrations in the system. In certain aspects, the processor 650 propagates the complex image to one or more planes. The image data from these propagated complex images at different planes is used to generate a three-dimensional image. In certain aspects, the processor 650 generates a complex image at different illumination wavelengths (RGB) to generate a complex color image.

During an optional display process, the higher resolution image and/or other data is provided as display data to the optional display 670.

Typically, the aperture is generated at a plurality of N aperture locations in a Fourier plane of the sample. However, it would be understood that the aperture could be generated in another intermediate plane conjugate to the sample such as, for example, the aperture plane of a compound lens system or the back-focal plane of a microscope objective.

Figure 7A:
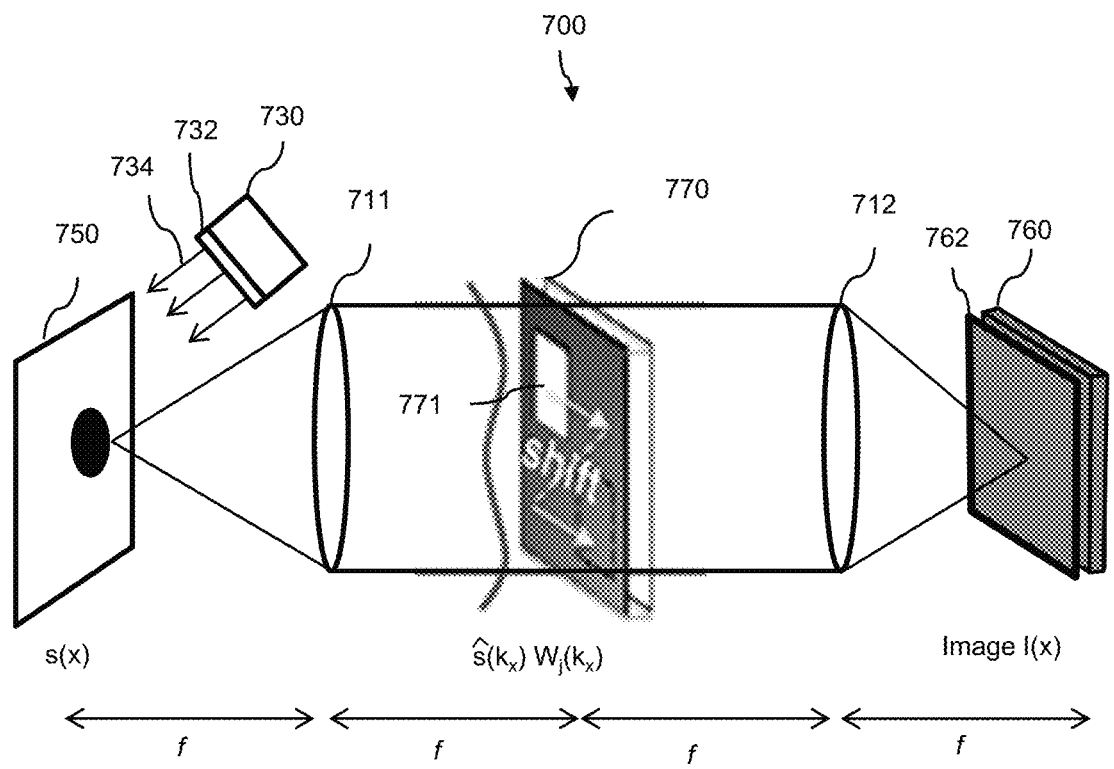
FIG. 7A is a schematic drawing an epi-illumination Fourier ptychographic imaging system with components arranged according to a configuration B, according to embodiments.

FIG. 7A is a schematic drawing of components of an EPI-FP-THICK system 700 in configuration B, according to embodiments. The EPI-FP-THICK system 700 comprises a first optical system (e.g., lens) 711 having a first focal length $f_{1,f}$ (where $f_1=f$), a second optical system (e.g., lens) 712 having a second focal length $f_2$ (where $f_1=f$), and an aperture scanner 770 in the form of a spatial light modulator. The aperture scanner 770 is configured to shift an aperture 771 to a plurality of N locations at an intermediate plane such as the Fourier plane of the sample 750. In other examples, other types of aperture scanners could be used. The EPI-FP-THICK system 700 also includes an illumination source 730 and a first polarization system 732 that provides plane wave radiation 734 of a first polarization state incident to the sample 750. Although not shown, the EPI-FP-THICK system 700 also includes a processor, a CRM in communication with the processor, and optionally a display in communication with the processor. The EPI-FP-THICK system 700 also includes comprises a detector 760 with a (active) detecting surface at a detector plane and a second polarizer system 762. The illustration shows the system during the image acquisition process with a sample 750 being imaged located at a sample plane. Some details of components of this system can be found in Horstmeyer, Roarke et al., "Overlapped Fourier coding for optical aberration removal," (2014), which is hereby incorporated by reference in its entirety.

In FIG. 7A, the optical components of the EPI-FP-THICK system 700 are in a 4f optical arrangement with the first optical system 711 located at a distance from the second optical system 712 equal to their combined focal lengths 2f. The sample plane of the sample 750 is located at the first focal length ($f_1=f$) from the first optical system 702 and the detector plane of the detector 760 is located at an optical path distance of the second focal length (where $f_2=f$) from the second optical system 712. The Fourier plane of the sample is located at an optical path distance of the first focal length (where $f_1=f$) of the first optical system 711 away from the first optical system 711 and located at an optical path distance of the second focal length (where $f_2=f$) of the second optical system 712 away from the second optical system 712.

Figure 7B:
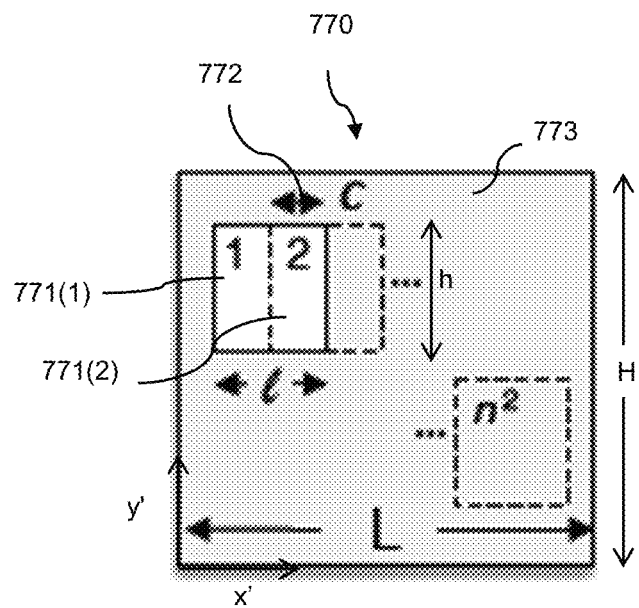
FIG. 7B is a schematic drawing of a cross-sectional view of a display of a spatial light modulator of the epi-illumination Fourier ptychographic imaging system shown in FIG. 7A, according to an embodiment.

FIG. 7B is a schematic drawing of a cross-sectional view of an SLM display 773 of the spatial light modulator 770 shown in FIG. 7A. The cross-sectional view is at a display plane of the SLM display 773. FIG. 7B includes an x'-axis and a y'-axis at the display plane. The SLM display 773 is a rectangular display with dimensions of width L and height H.

The spatial light modulator 770 is configured to digitally generate on its display 773 apertures at a 2-D square grid (n×n) of equally-spaced aperture locations (i.e. equal spacing between neighboring apertures). The spatial light modulator 770 is configured to digitally generate on its display 773 the aperture 771 at a plurality of N locations, where $N=n^2$. In FIG. 7B, both apertures 771(1) and 771(2) have a constant rectangular shape with a width l and height of h. In other embodiments, the spacing between neighboring aperture locations is equally spaced and/or the aperture has different sizes at different locations.

In FIG. 7B, the display 773 is shown at an acquisition time when an aperture 771(1) (shown in sold line) is generated on the SLM display 773. The illustration also includes a neighboring aperture 771(2) (shown in dotted line) that will be displayed at a subsequent acquisition time (e.g., $t_2$) as denoted by a dotted line to illustrate the spatial overlapping relationship between neighboring apertures. As shown, the neighboring apertures 771(1) and 771(2) have an overlap 772 in the x'-direction a distance "c." In some cases, the overlap 772 is at least about 70% of the area of an aperture 771. In other cases, the overlap 772 may be at least about 75% of the area of the aperture 771. In other cases, the overlap 772 may be between 2-90% of the area of the aperture 771. Display instructions may be used by the SLM 770 to generate an aperture on the display 773 in the rectilinear grid. In one aspect, the overlap 772 between neighboring (adjacent) apertures corresponds to setting the n>L/l. For example, if n=9, setting L/l=2.5 will generate an overlap between neighboring apertures of more than 75%.

The SLM display 770 has a 2-D grid with square dimensions (n×n dimensions). In this case, the N aperture locations are described as $(X_i, Y_j)$, i=1 to n, j=1 to n, in the display plane and the number of aperture locations, $N=n^2$. In certain aspects, the aperture 771 is displaced from the origin of this 2-D rectilinear grid by a two-dimensional vector $c_j=(c_{xj}, c_{yj})$ for $1<j<n^2$. In this case, a radiation detector can capture at the detector plane M different intensity images, $I_{k,l}$, (M=k×l) at different aperture locations.

During an exemplary image acquisition process, the aperture scanner 770 generates an aperture at a plurality of N aperture locations at a Fourier plane of the EPI-FP-THICK system 700. The first optical system 711 receives radiation issuing from the sample 750. The second optical system 712 receives radiation as modulated by the aperture. The second polarizer system 762 receives radiation from the second optical system 712. The second polarizer system 762 analyzes the received radiation to pass radiation of the first polarization state to the radiation detector 760. The radiation detector 760 receives the radiation passed to measure a first intensity distribution $I_1$ based on the first polarization state for each aperture location. The second polarizer system 762 passes radiation of the second polarization state to the radiation detector 760 to capture a second intensity distribution $I_2$ based on the second polarization state for each aperture location. The radiation detector 760 measures a sequence of N intensity distributions $I_1$ and a sequence of N intensity distributions $I_2$ corresponding to the N aperture locations. The second polarizer system 762 is configured so that the radiation detector 760 can measure separate intensity distributions $I_1$ and $I_2$ of electromagnetic radiation of the first polarization state and the second polarization state respectively for each aperture location. During the image acquisition process, the radiation detector 760 measures intensity distributions $I_1$ and $I_2$ over time to acquire two sequences of N low-resolution intensity measurements (images): $I_{1,i=1 \ to \ N}$ and $I_{2,i=1 \ to \ N}$.

The processor receives the image data with the two sequences of N low-resolution images. For each aperture location, the processor determines the difference in values between the intensity distributions: $I_{s,i}=I_{1,i}-I_{2,i}$ to estimate a surface intensity image associated with that aperture location. For the N aperture locations, the processor determines a sequence of N surface images $I_{s,i-1 \ to N}$, based on reflected radiation from the surface of the thick sample 750. During the recovery process, the processor can iteratively "stitch" together the plurality of N intensity images in Fourier space to recover a wide-field, complex higher resolution image of the sample 760 at the sample plane. In certain aspects, the processor digitally refocuses the complex image to accommodate for any defocus of the sample and/or aberrations in the system. In certain aspects, the processor propagates the complex image to one or more planes. The image data from these propagated complex images at different planes is used to generate a three-dimensional image. In certain aspects, the processor generates a complex image at different illumination wavelengths (RGB) to generate a complex color image. During an optional display process, the higher resolution image and/or other data is provided as display data to the optional display.

III. EPI-FP-THICK Imaging Methods

The EPI-FP-THICK method is generally described in this section as performed by an EPI-FP-THICK system of either configuration A or configuration B. Several examples of EPI-FP-THICK systems in configuration A or configuration B are provided in Section II above. An EPI-FP-THICK method generally comprises an image acquisition process, a Fourier ptychographic reconstruction process, and an optional display process. Certain details of the Fourier ptychographic reconstruction process are provided in the following Section IV.

Figure 8:
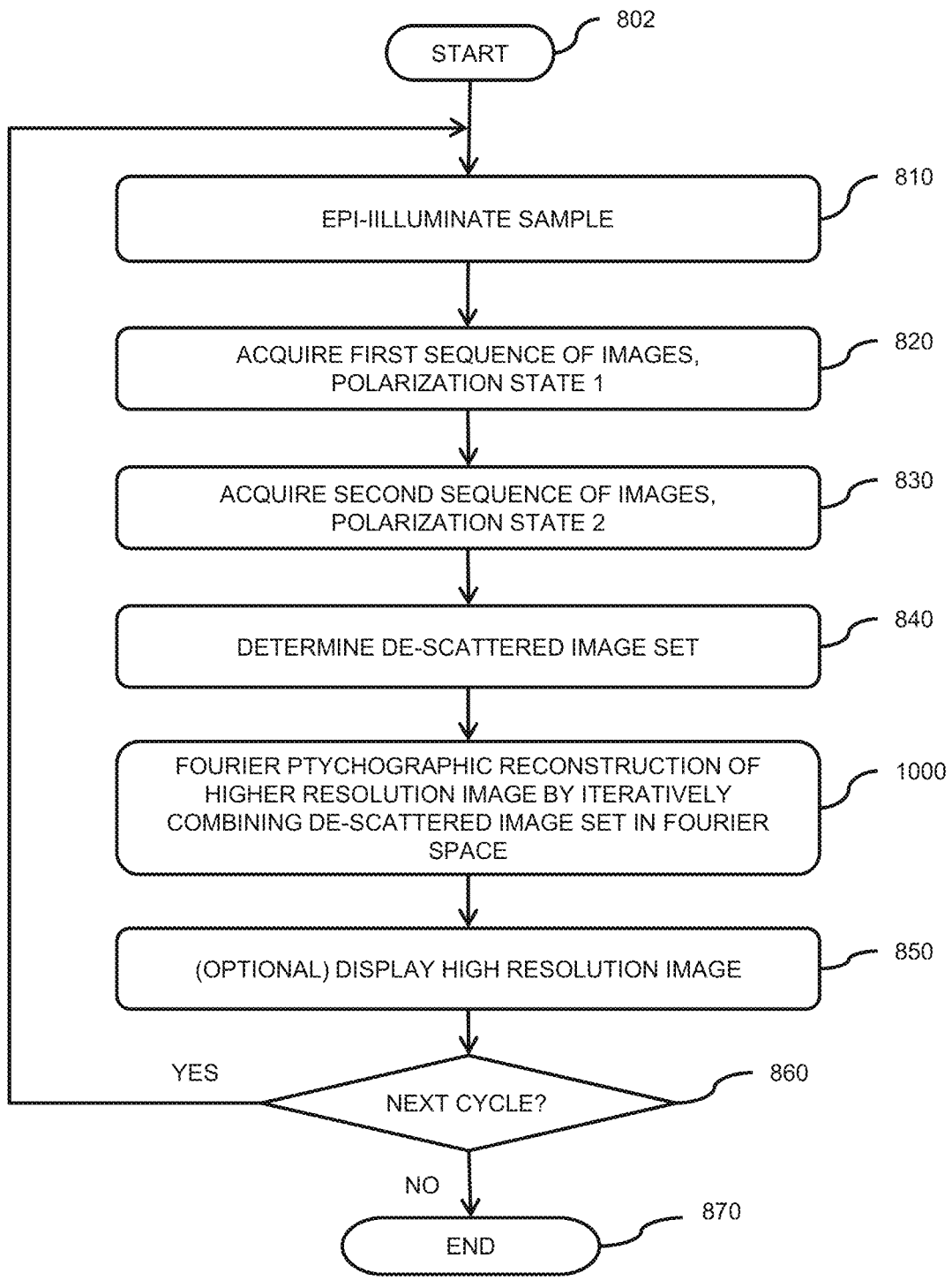
FIG. 8 is a flow chart depicting operations of an epi-illumination Fourier ptychographic imaging method, according to an embodiment.

FIG. 8 is a flow chart depicting operations of an EPI-FP-THICK method, according to an embodiment. The EPI-FP-THICK method starts at operation 802. When using this method, the EPI-FP-THICK system has a second polarization system that is configured with polarizer(s) that are located in one orientation at each exposure time. In this system, the radiation detector measures the first intensity distribution $I_1$ during an exposure time when the polarizer is in the first orientation and a second intensity distribution $I_1$ during another exposure time when the polarizer is in the second orientation. In one example, the second polarizer system is a single polarizer and a mechanism that rotates the polarizer between a first orientation and a second orientation orthogonal to the first orientation.

Figure 9A:
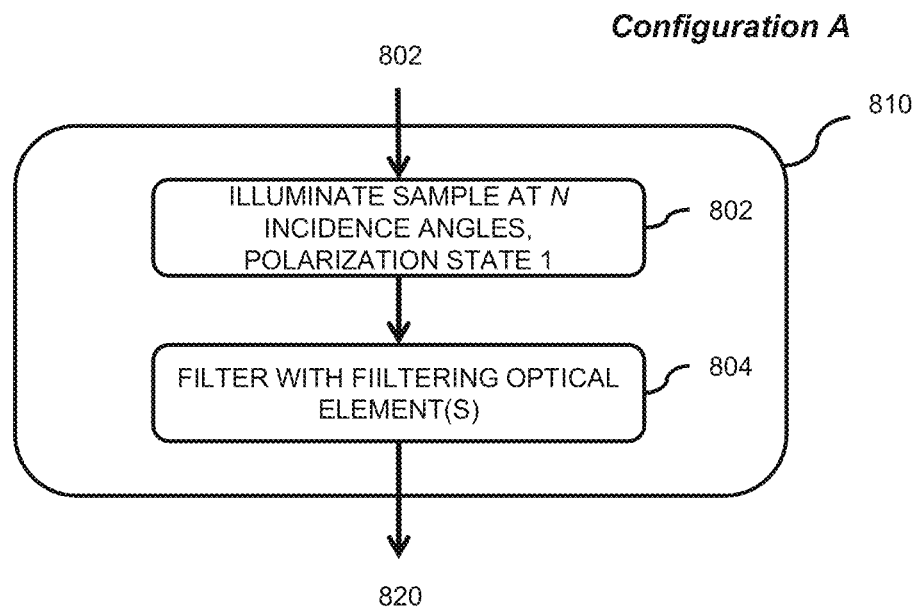
FIG. 9A is a flow chart of sub-operations of a operation of the epi-illumination Fourier ptychographic imaging method depicted in FIG. 8, according to an embodiment.
Figure 9B:
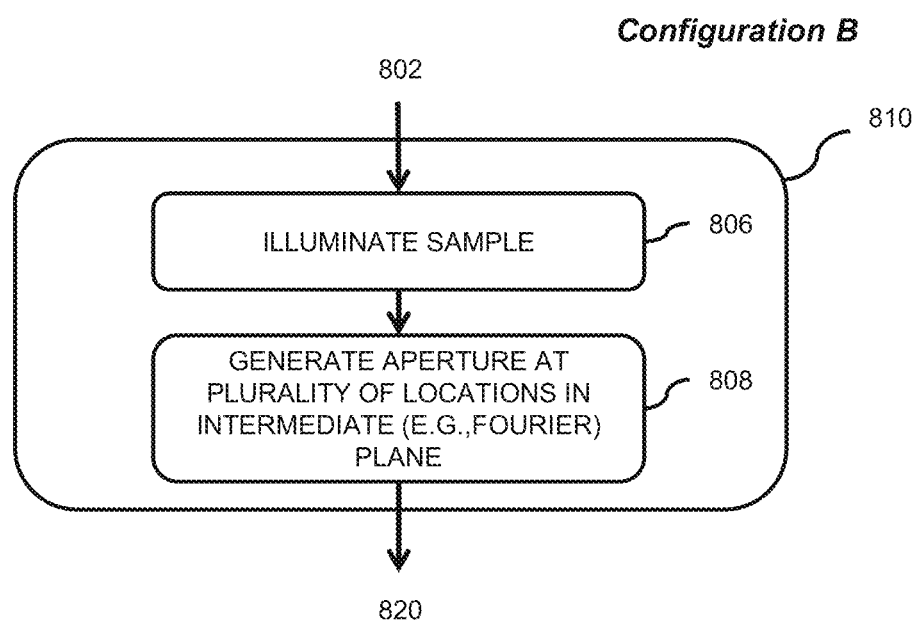
FIG. 9B is a flow chart of sub-operations of a operation of the epi-illumination Fourier ptychographic imaging method depicted in FIG. 8, according to an embodiment.

At operation 810, radiation of a first polarization state also referred to as "Polarization State 1" is provided to the sample from the same side of the sample as the collection optics are located (epi-illumination). The surface of the thick sample reflects the radiation, while primarily maintaining polarization state 1 (i.e. polarized in a first direction). Radiation that scatters beneath the surface of the sample becomes randomly polarized, and does not maintain polarization state 1.

Where the components of the EPI-FP-THICK system are arranged according to configuration A, the operation 810 involves sub-operations depicted in the flowchart shown in FIG. 9A. At sub-operation 802, a variable illumination source and a first polarization system together provide radiation incident the sample at a polarization state 1. Sequential illumination is provided at N incidence angles to the sample. The variable illumination source may control the sequential illumination based on illumination instructions that define the order of the incidence angles and the associated timing of the illumination. These instructions may be implemented with a processor and may be stored on computer readable medium. In certain aspects, the variable illumination source provides plane wave illumination at each incidence angle of the plurality of N incidence angles. Plane wave illumination with a wavevector, kx, $k_y$, in the spatial domain, is equivalent to shifting the center of the image spectrum by ($k_x$, $k_y$) in the Fourier domain. In this respect, the intensity image data in the Fourier domain is shifted from normal incidence image data by (kx, ky), which corresponds to the incidence angle ($\theta_x$, $\theta_y$) applied by the variable illumination source. At sub-operation 804, the first optical system collects radiation issuing from the sample and propagates it to the radiation detector via the second polarization system. The optical system generally comprises a filtering optical element(s) that filters the radiation. In one example, a filtering optical element is an objective lens collecting radiation issuing from an illuminated sample. In this case, the objective lens filters the radiation issuing from the sample by only accepting radiation incident at a range of angles within its numerical aperture (NA). In Fourier space, the filtering function of a filtering optical element such as an objective lens may be represented by a circular pupil with radius of $NA \times k_0$, where $k_0 = 2\pi/\lambda$ is the wave number in vacuum. The Fourier ptychographic reconstruction process described in Section IV updates in Fourier space regions defined by this filtering function and the incidence angles. In certain cases, the filtering optical element and its associated filtering function omits data outside the circular pupil region.

Where the components of the EPI-FP-THICK system are arranged according to configuration B, the operation 810 involves the sub operations depicted in the flowchart shown in FIG. 9B. At sub-operation 806, an illumination source provides epi illumination to the sample. The first optical system receives incident radiation issuing from the sample. At sub-operation 808, an aperture scanner generates an aperture (or plurality of apertures) at a plurality of N aperture locations, ($X_i$, $Y_j$), i=1 to m, j=1 to n, at an intermediate (e.g., Fourier) plane of the optical arrangement of the EPI-FP-THICK system. The aperture scanner may generate the aperture at the different locations based on instructs that define the order of the aperture locations. These instructions may be implemented with a processor and may be stored on computer readable medium. The wave vector in x and y directions is denoted as $k_{xi}$ and $k_{yi}$. The second optical system may receive incident radiation as modulated by the aperture.

At operation 820, the radiation detector measures intensity distributions to acquire a first sequence of N intensity images: $I_{1,i=1 \text{ to } N}$. At operation 830, the radiation detector measures intensity distributions to acquire a second sequence of N intensity images: $I_{2,i=1 \text{ to } N}$. In the method described in FIG. 8, the radiation detector acquires the first sequence of N intensity images: at $I_{1,i=1 \text{ to } N}$ at acquisition times different from the acquisition times during which the radiation detector acquires the second sequence of N intensity images: $I_{2,i=1 \text{ to } N}$. This would be the case when the EPI-FP-THICK system has a second polarizer system configured with polarizer(s) set in one orientation at each exposure time. In one example, a second polarizer system has a single polarizer and a mechanism that rotates the polarizer between a first orientation and a second orientation orthogonal to the first orientation. When the polarizer is in the first orientation, the second polarizer system passes only radiation in the first polarization state (blocks electromagnetic waves of other polarizations) and when the polarizer is in the second orientation, the second polarizer system only passes radiation in the second polarization. In these cases, the radiation detector measures the first intensity distribution $I_1$ during a first exposure time when the polarizer is in the first orientation and a second intensity distribution $I_1$ during a second exposure time when the polarizer is in the second orientation. In one case, the single polarizer is rotated between the horizontal "H" and vertical "V" orientations.

Where the components of the EPI-FP-THICK system are arranged according to configuration A, each of the intensity distributions pairs $I_1$ and $I_2$ acquired during operations 820 and 830 is associated with a different incidence angle. Where the components of the EPI-FP-THICK system are arranged according to configuration B, each of the intensity distributions pairs $I_1$ and $I_2$ acquired during operations 820 and 830 is associated with a different aperture location.

At operation 840, the processor determines the de-scattered image set $I_{2,i=1\ to\ N}$. Based on the estimation that the randomly depolarized component of radiation contributes equally to the first image $I_1$ and the second image $I_2$, the difference between the first image h and the second image $I_2$ effectively removes the contribution of depolarized radiation to generate a de-scattered surface image Is. The processor takes the difference between the first image h and the second image $I_2$ for each incidence angle if using configuration A or for each aperture location if using configuration B. The processor takes this difference to determine the de-scattered image set $I_{2,i=1\ to\ N}$.

At operation 1000, the processor uses a Fourier ptychographic reconstruction process to recovers a higher (i.e. improved) resolution, complex image of the sample based on the de-scattered image set $I_{2,i=1\ to\ N}$ determined in operation 840. The details of this operation are described in Section IV. In this operation, a higher resolution complex image is initialized in the spatial domain and a Fourier transform is applied to the initial value to obtain an initialized Fourier transformed image. The higher-resolution image is computationally constructed by iteratively combining intensity measurements from the de-scattered image set $I_{2,i=1\ to\ N}$ in Fourier space. Details of operation 1000 that apply if the components the EPI-FP-THICK system are arranged according to configuration A are described with respect to FIG. 11 and FIG. 12. Details of operation 1000 that apply if the components the EPI-FP-THICK system are arranged according to configuration B are described with respect to FIG. 13 and FIG. 14.

At an optional operation 850, a display may receive image data such as a higher resolution complex image data and/or other data from the processor, and display the data on a display. At operation 860, the method determines whether there is another cycle. If there is another cycle (YES), the method returns to 810. If there is not another cycle (NO), the method ends (870).

Figure 10:
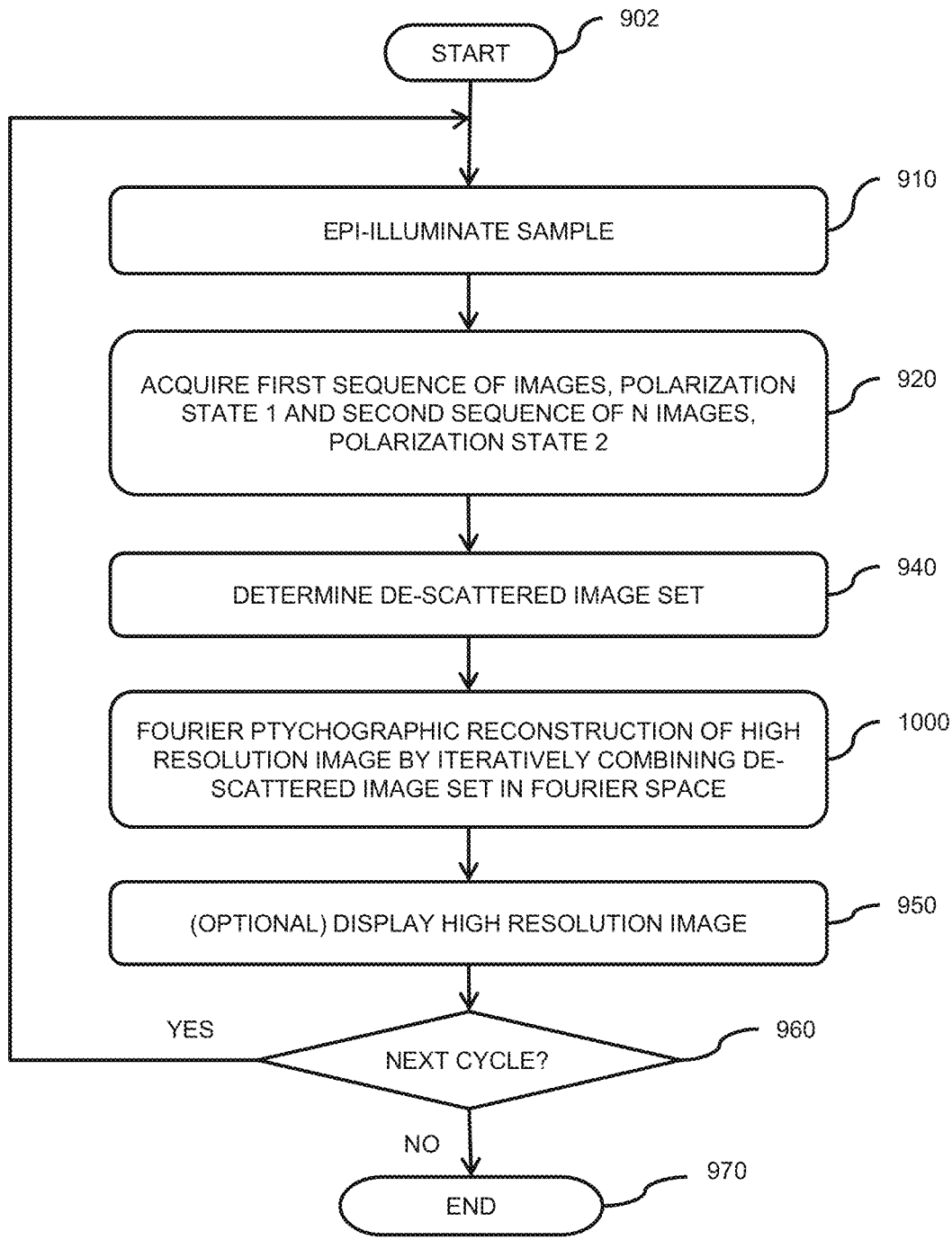
FIG. 10 is a flow chart depicting operations of an epi-illumination Fourier ptychographic imaging method, according to an embodiment.

FIG. 10 is a flow chart depicting operations of an EPI-FP-THICK method, according to an embodiment. When using this method, the EPI-FP-THICK system is configured so that the radiation detector can acquire both images $I_1$ and $I_2$ at both polarizations simultaneously. In one example of such an EPI-FP-THICK system, the second polarizer system has an interleaved arrangement of polarizer elements. In this example, certain polarizer elements are in a first orientation and other polarizer elements are in a second orientation orthogonal to the first orientation. In one case, the interleaved arrangement may form a checkerboard pattern of polarized elements in the first orientation and the second orientation. In one aspect, the polarized elements are aligned in one to one correspondence with the discrete radiation detecting elements of the radiation detector. For example, the interleaved arrangement of polarizer elements may be in a layer of material covering an LED array so that each LED is covered by a polarizer element.

The EPI-FP-THICK method starts at operation 902. At operation 910, radiation of a first polarization state also referred to as "Polarization State 1" is provided to the sample from the same side of the sample as the collection optics are located (epi-illumination). The surface of the thick sample primarily reflects the radiation maintaining polarization state 1 (i.e. polarized in a first direction). Radiation that scatters beneath the surface of the sample becomes randomly polarized, and does not maintain polarization state 1.

Where the components of the EPI-FP-THICK system are arranged according to configuration A, the operation 910 involves sub-operations depicted in the flowchart shown in FIG. 9A. At sub-operation 802, a variable illumination source and a first polarization system together provide radiation incident the sample at a polarization state 1. Sequential illumination is provided at N incidence angles to the sample. At sub-operation 804, the first optical system collects radiation issuing from the sample and propagates it to the radiation detector via the second polarization system. Sub-operations 802 and 804 are described in more detail with reference to operation 810.

Where the components of the EPI-FP-THICK system are arranged according to configuration B, the operation 910 involves the sub operations depicted in the flowchart shown in FIG. 9B. At sub-operation 806, an illumination source provides epi illumination to the sample. The first optical system receives incident radiation issuing from the sample. At sub-operation 808, an aperture scanner generates an aperture (or plurality of apertures) at a plurality of N aperture locations, $(X_i, Y_j)$, i=1 to m, j=1 to n, at an intermediate (e.g., Fourier) plane of the optical arrangement of the EPI-FP-THICK system. Sub-operations 806 and 808 are described in more detail with reference to operation 810.

At operation 920, the radiation detector measures intensity distributions to simultaneously acquire a first sequence of N intensity images: $I_{1,i=1\ to\ N}$ and acquire a second sequence of N intensity images: $I_{2,i=1\ to\ N}$. That is, an intensity image of the first sequence is acquired at the same time as a corresponding intensity image of the second sequence. For example, $I_{1,2}$ and $I_{2,2}$ are acquired during the same exposure time starting at a second acquisition time, $t_2$. For simultaneous acquisition, the system has a second polarizer system with polarizer elements configured so that the radiation detector can take separate images $I_1$ and $I_2$, based on the first polarization state and the second polarization state, at the same exposure time. In one example, the second polarizer system has an interleaved arrangement of polarizer elements where certain polarizer elements are in a first orientation and other polarizer elements are in a second orientation orthogonal to the first orientation. The interleaved arrangement may in the form of a checkerboard pattern of polarized elements in the first orientation and the second orientation, for example. In one aspect, the polarized elements are aligned in one to one correspondence with the discrete radiation detecting elements of the radiation detector. For example, the interleaved arrangement of polarizer elements may be in a layer of material covering an LED array so that each LED is covered by a polarizer element.

Where the components of the EPI-FP-THICK system are arranged according to configuration A, each of the intensity distributions pairs $I_1$ and $I_2$ acquired during operation 920 associated with a different incidence angle. Where the components of the EPI-FP-THICK system are arranged according to configuration B, each of the intensity distributions pairs $I_1$ and $I_2$ acquired during operation 920 is associated with a different aperture location.

At operation 940, the processor determines the de-scattered image set $I_{2,i=1\ to\ N}$. Based on the estimation that the randomly depolarized component of radiation contributes equally to the first image $I_1$ and the second image $I_2$, the difference between the first image $I_1$ and the second image $I_2$ effectively removes the contribution of depolarized radiation to generate a de-scattered surface image $I_s$. The processor takes the difference between the first image $I_1$ and the second image $I_2$ for each incidence angle if using configuration A or for each aperture location if using configuration B. The processor takes this difference to determine the de-scattered image set $I_{2,i=1\ to\ N}$.

At operation 1000, the processor uses a Fourier ptychographic reconstruction process to recovers a higher (i.e. improved) resolution, complex image of the sample based on the de-scattered image set $I_{2,i=1\ to\ N}$ determined in operation 940. The details of this operation are described in Section IV. In this operation, a higher resolution complex image is initialized in the spatial domain and a Fourier transform is applied to the initial value to obtain an initialized Fourier transformed image. The higher-resolution image is computationally constructed by iteratively combining intensity measurements from the de-scattered image set $I_{2,i=1\ to\ N}$ in Fourier space. Details of operation 1000 that apply if the components the EPI-FP-THICK system are arranged according to configuration A are described with respect to FIG. 11 and FIG. 12. Details of operation 1000 that apply if the components the EPI-FP-THICK system are arranged according to configuration B are described with respect to FIG. 13 and FIG. 14.

At an optional operation 950, a display may receive image data such as a higher resolution complex image data and/or other data from the processor, and display the data on a display. At operation 960, the method determines whether there is another cycle. If there is another cycle (YES), the method returns to 910. If there is not another cycle (NO), the method ends (970).

IV. Fourier Ptychographic Reconstruction Process

Certain details of the reconstruction process can be found in Zheng, Guoan, Horstmeyer, Roarke, and Yang, Changhuei, "Wide-field, high-resolution Fourier ptychographic microscopy," Nature Photonics vol. 7, pp. 739-745 (2013) and in U.S. patent application Ser. No. 14/065,280, titled "Fourier Ptychographic Imaging Systems, Devices, and Methods" and filed on Oct. 28, 2013. During the reconstruction operation, overlapping regions in the Fourier domain are iteratively updated with lower the lower resolution intensity image data to generate a higher resolution image.

Figure 11:
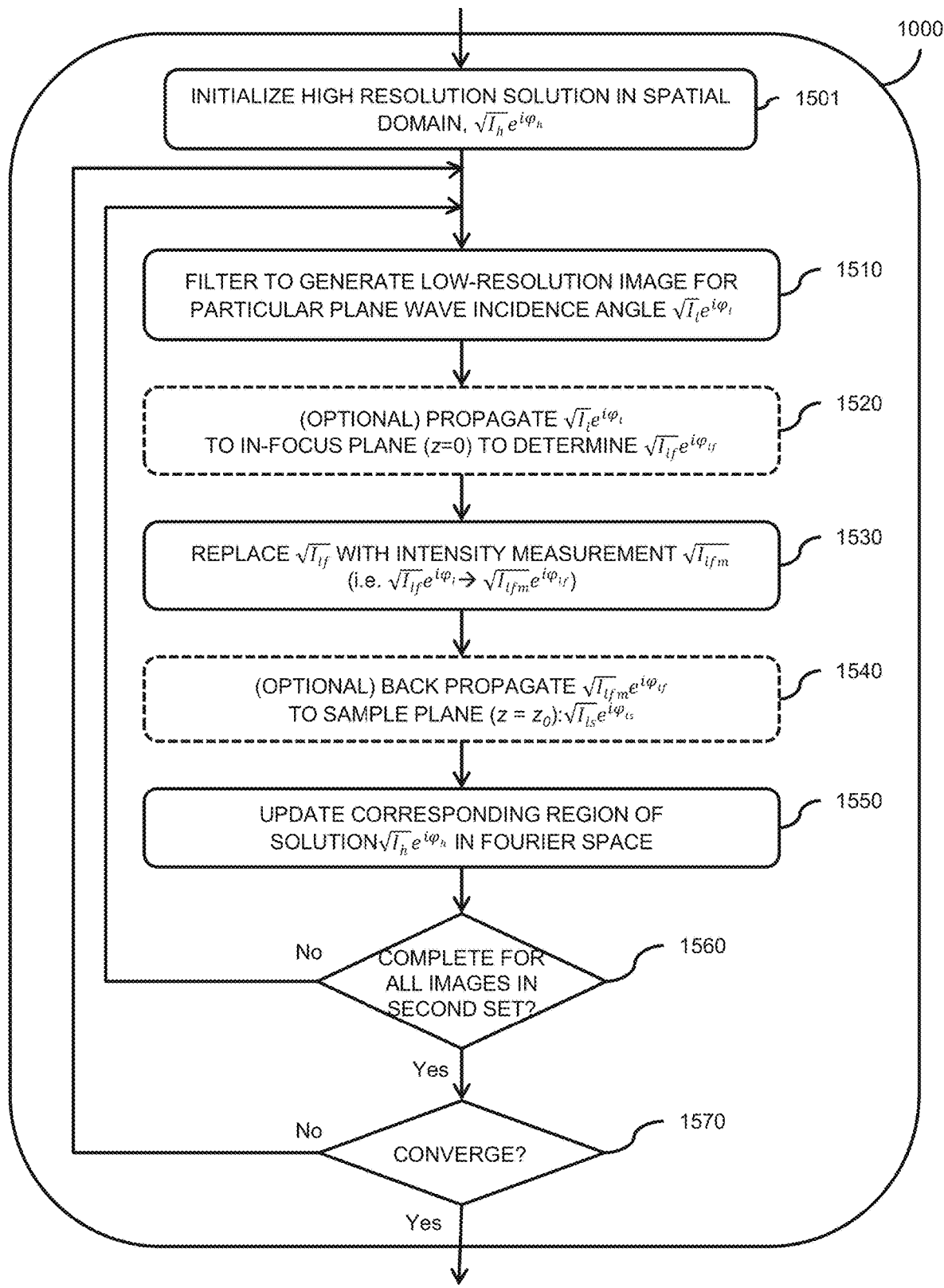
FIG. 11 is a flowchart of an example of a reconstruction process for an epi-illumination Fourier ptychographic imaging system with components arranged according to configuration A, according to an embodiment.
Figure 12:
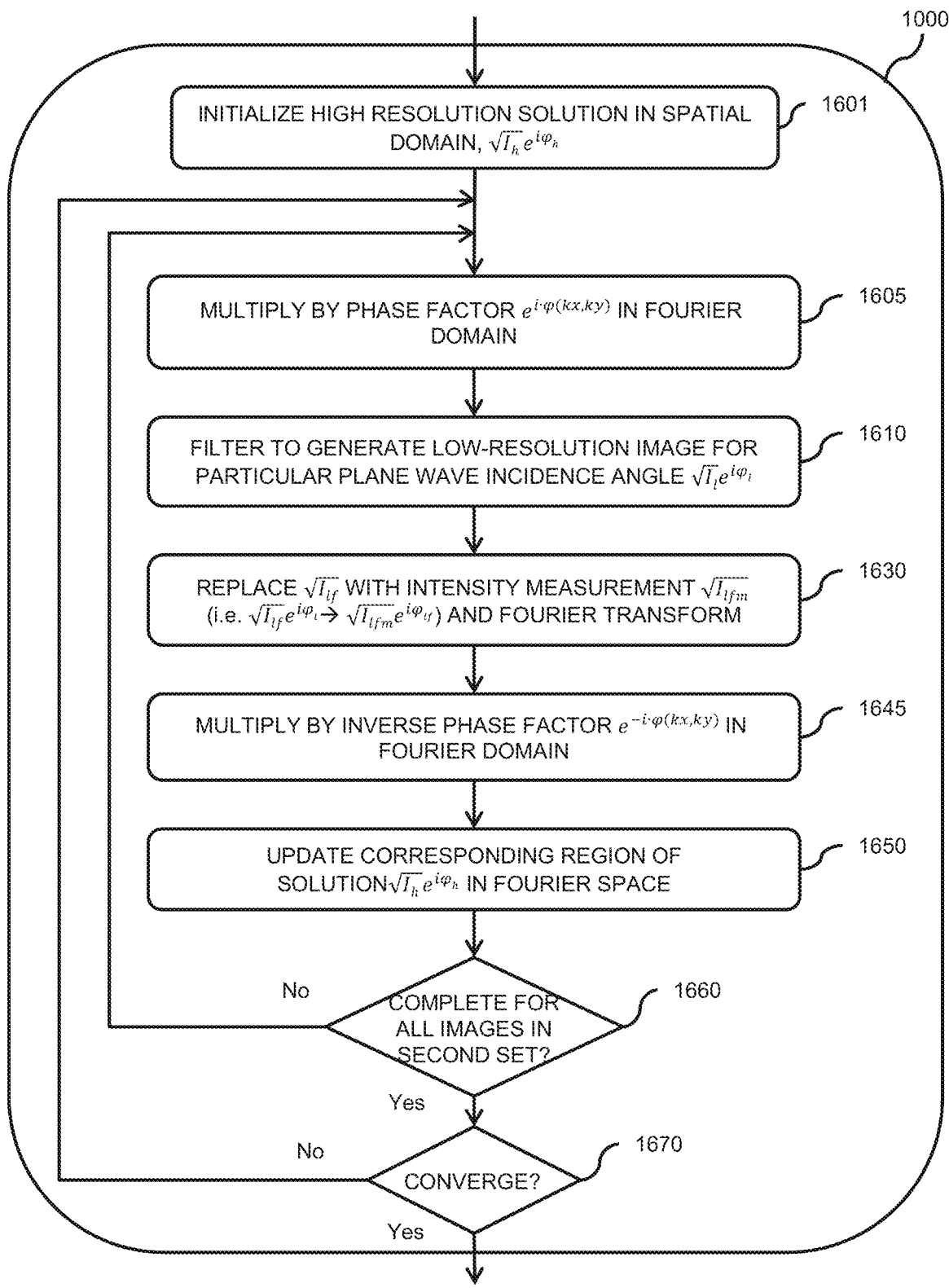
FIG. 12 is a flowchart of an example of a reconstruction process for an epi-illumination Fourier ptychographic imaging system with components arranged according to configuration A, according to an embodiment.
Figure 13:
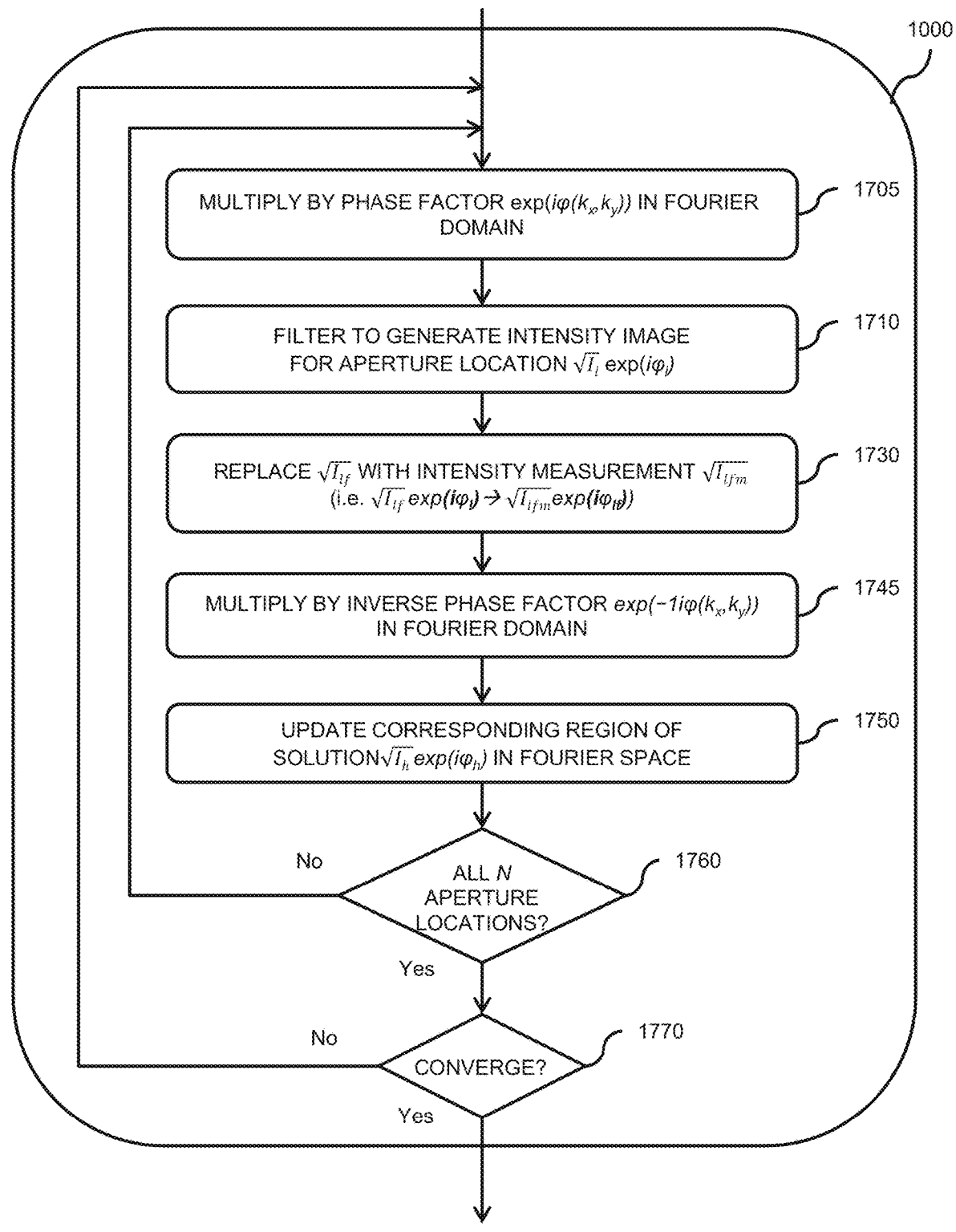
FIG. 13 is a flowchart of an example of a reconstruction process for an epi-illumination Fourier ptychographic imaging system with components arranged according to configuration B, according to an embodiment.
Figure 14:
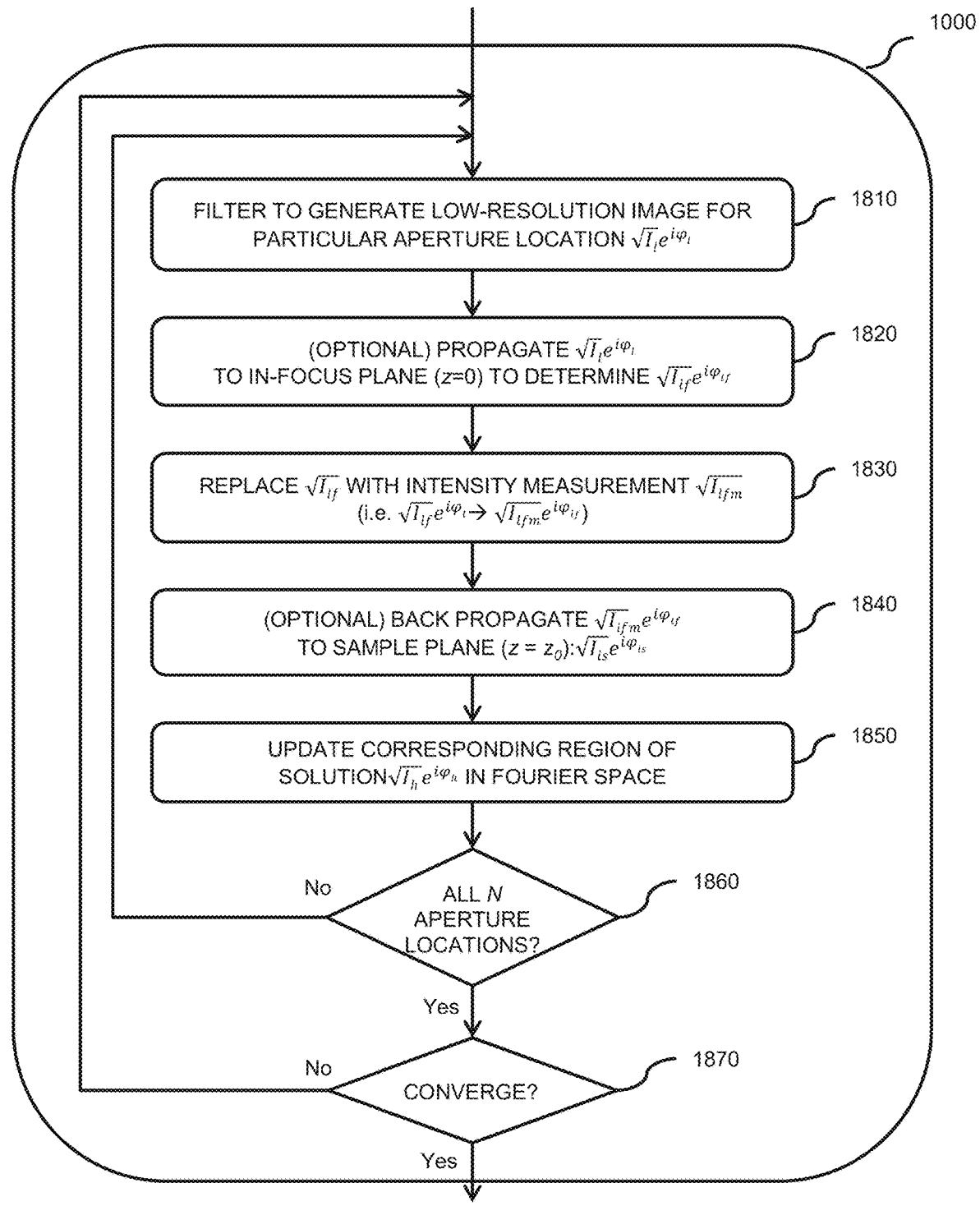
FIG. 14 is a flowchart of an example of a reconstruction process for an epi-illumination Fourier ptychographic imaging system with components arranged according to configuration B, according to an embodiment.

FIG. 11 and FIG. 12 are details of two examples of the ptychographic reconstruction process that apply to an EPI-FP-THICK system with components arranged according to configuration A. FIG. 13 and FIG. 14 are details of two examples of the ptychographic reconstruction process that apply to an EPI-FP-THICK system with components arranged according to configuration B.

FIG. 11 is a flowchart of an example of a reconstruction process for an EPI-FP-THICK system with components arranged according to configuration A, according to an embodiment. In this process, a high-resolution image of the sample may be computationally reconstructed from de-scattered image set $I_{2,i=1\ to\ N}$.

At 1501, a high-resolution image: $\sqrt{I_h}e^{i\varphi_h}$ is initialized in the spatial domain, and a Fourier transform is applied to the initial value to obtain an initialized Fourier transformed image $\tilde{I}_h$. The initialized high-resolution solution may be an initial guess. This initial guess may be determined based on the assumption that the sample is located at the out-of-focus plane $z=z_0$. In some cases, the initial guess may be determined as a random complex matrix (for both intensity and phase). In other cases, the initial guess may be determined as an interpolation of the low-resolution intensity measurement with a random phase. An example of an initial guess is $\varphi=0$ and $I_h$ interpolated from any low-resolution image of the sample area. Another example of an initial guess is a constant value. The Fourier transform of the initial guess can be a broad spectrum in the Fourier domain.

In the iterative operations of 1510, 1520, 1530, 1540, 1550, 1560, and 1570, the high-resolution image of the sample is computationally reconstructed by iteratively combining low-resolution intensity measurements in Fourier space using a processor. Optional operations 1520 and 1540 may be performed if the sample is out-of-focus by the amount of $z_0$.

At 1510, the processor performs low-pass filtering of the high-resolution image $\sqrt{I_h}e^{i\varphi_h}$ in the Fourier domain to generate a low-resolution image $\sqrt{I_l}e^{i\varphi_l}$ for a particular plane wave incidence angle $(\theta_x^i, \theta_y^i)$ with a wave vector $(k_x^i, k_y^i)$. The Fourier transform of the high-resolution image is $\tilde{I}_h$ and the Fourier transform of the low-resolution image for a particular plane wave incidence angle is $\tilde{I}_l$. In the Fourier domain, the reconstruction process filters a low-pass region from the spectrum $\tilde{I}_h$ of the high-resolution image $\sqrt{I_h}e^{i\varphi_h}$. In cases with an optical element in the form of an objective lens, this region is a circular aperture with a radius of $NA*k_0$, where $k_0$ equals $2\pi/\lambda$ (the wave number in vacuum), given by the coherent transfer function of an objective lens. In Fourier space, the location of the region corresponds to the incidence angle. For an oblique plane wave incidence with a wave vector $(k_x^i, k_y^i)$, the region is centered about a position $(-k_x^i, -k_y^i)$ in the Fourier domain of $\sqrt{I_h}e^{i\varphi_h}$.

At optional operation 1520, using the processor, the low-resolution image, $\sqrt{I_l}e^{i\varphi_l}$ is propagated in the Fourier domain to the in-focus plane at $z=0$ of the optical element to determine the low-resolution image at the focused position: $\sqrt{I_{lf}}e^{i\varphi_{lf}}$. In one embodiment, operation 1520 is performed by Fourier transforming the low-resolution image $\sqrt{I_l}e^{i\varphi_l}$, multiplying by a phase factor in the Fourier domain, and inverse Fourier transforming to obtain $\sqrt{I_{lf}}e^{i\varphi_{lf}}$. In another embodiment, operation 1520 is performed by the mathematically equivalent operation of convolving the low-resolution image $\sqrt{I_l}e^{i\varphi_l}$ with the point-spread-funtion for the defocus. In another embodiment, operation 1520 is performed as an optional sub-operation of operation 1510 by multiplying by multiplying $\tilde{I}$ by a phase factor in the Fourier domain before performing the inverse Fourier transform to produce $\sqrt{I_{lf}}e^{i\varphi_{lf}}$. Optional operation 1520 need not be included if the sample is located at the in-focus plane ($z=0$) of the optical element.

At operation 1530, using the processor, the computed amplitude component $\sqrt{I_{lf}}$ of the low-resolution image at the in-focus plane, $\sqrt{I_{lf}}e^{i\varphi_{lf}}$, is replaced with the square root of the low-resolution intensity measurement measured by the radiation detector. This forms an updated low resolution target: $\sqrt{I_{lf}}e^{i\varphi_{lf}}$.

At optional operation 1540, using the processor, the updated low-resolution image $\sqrt{I_{lfm}}e^{i\varphi_{lf}}$ is back-propagated to the sample plane ($z=z_0$) to determine $\sqrt{I_{ls}}e^{i\varphi_{lf}}$. Optional operation 1540 need not be included if the sample is located at the in-focus plane of the optical element, that is, where $z_0=0$. In one aspect, operation 1540 is performed by taking the Fourier transform of the updated low-resolution image $\sqrt{I_{lf}}e^{i\varphi_{lf}}$ and multiplying in the Fourier space by a phase factor, and then inverse Fourier transforming it. In another embodiment, operation 1540 is performed by convolving the updated low-resolution image $\sqrt{I_{lfm}}e^{i\varphi_{lf}}$ with the point-spread-function of the defocus. In another embodiment, operation 1540 is performed as a sub-operation of operation 1550 by multiplying by a phase factor after performing the Fourier transform onto the updated target image.

At operation 1550, using the processor, a Fourier transform is applied to the updated target image propagated to the sample plane: $\sqrt{I_{ls}}e^{i\varphi_{ls}}$, and this data is updated in the corresponding region of high-resolution solution $\sqrt{I_h}e^{i\varphi_h}$ in the Fourier space corresponding to the corresponding to the incidence wave vector $(k_x^i, k_y^i)$.

At operation 1560, the processor determines whether operations 1510 through 1560 have been completed for all the images in the second set of images. If operations 1510 through 1560 have not been completed for all the images, operations 1510 through 1560 are repeated for the next image.

At operation 1570, the processor determines whether the high-resolution solution has converged (operation 1570). For example, the processor may determine whether the high-resolution solution may have converged to a self-consistent solution. In one case, the processor compares the previous high-resolution solution of the previous iteration or initial guess to the present high-resolution solution, and if the difference is less than a certain value, the solution may have converged to a self-consistent solution. If the processor determines that the solution has not converged, then operations 1510 through 1570 are repeated. In one embodiment, operations 1510 through 1560 are repeated once. In other embodiments, operations 1510 through 1560 are repeated twice or more. If the solution has converged, the processor transforms the converged solution in Fourier space to the spatial domain to recover a high-resolution image $\sqrt{I_h}e^{i\varphi_h}$. If the processor determines that the solution has converged at operation 1570, then the process returns.

FIG. 12 is a flowchart of an example of a reconstruction process for an EPI-FP-THICK system with components arranged according to configuration A, according to an embodiment. In this process, a high-resolution image of the sample may be computationally reconstructed from de-scattered image set $I_{2,i=1\ to\ N}$. This reconstruction process includes digital wavefront correction. The process incorporates digital wavefront compensation in the two multiplication operations 1605 and 1645. Specifically, operation 1605 models the connection between the actual sample profile and the captured intensity data (with includes aberrations) through multiplication with a pupil function: $e^{i\cdot\varphi(k_x,k_y)}$ by the processor. Operation 1645 inverts such a connection to achieve an aberration-free reconstructed image. Sample defocus is essentially equivalent to introducing a defocus phase factor to the pupil plane (i.e., a defocus aberration):

$$e^{i\cdot\varphi(k_x,\ k_y)}=e^{i\sqrt{(2\pi/\lambda)^2-k_x^2-k_y^2}\cdot z_0},\ k_x^2+k_y^2<(NA\cdot 2\pi/\lambda)^2 \quad \text{(Eqn. 3)}$$

where $k_x$ and $k_y$ are the wavenumbers at the pupil plane, $z_0$ is the defocus distance, and NA is the numerical aperture of the optical element.

At 1601, a high-resolution image: $\sqrt{I_h}e^{i\varphi_h}$ is initialized in the spatial domain, and a Fourier transform is applied to the initial value to obtain an initialized Fourier transformed image $\tilde{I}_h$. The initialized high-resolution solution may be an initial guess. This initial guess may be determined based on the assumption that the sample is located at the out-of-focus plane $z=z_0$. In some cases, the initial guess may be determined as a random complex matrix (for both intensity and phase). In other cases, the initial guess may be determined as an interpolation of the low-resolution intensity measurement with a random phase. An example of an initial guess is $\varphi=0$ and $I_h$ interpolated from any low-resolution image of the sample area. Another example of an initial guess is a constant value. In one aspect, the Fourier transform of the initial guess is a broad spectrum in the Fourier domain.

In the iterative operations of 1605, 1610, 1630, 1645, 1650, 1660, and 1670, the high-resolution image of the sample is computationally reconstructed by iteratively combining low-resolution intensity measurements in Fourier space using a processor.

At operation 1605, the processor multiplies by a phase factor $e^{i\cdot\varphi(k_x,k_y)}$ in Fourier domain. At operation 1610, the processor performs low-pass filtering of the high-resolution image $\sqrt{I_h}e^{i\varphi_h}$ in the Fourier domain to generate a low-resolution image $\sqrt{I_l}e^{i\varphi_l}$ for a particular plane wave incidence angle $(\theta_x^i, \theta_y^i)$ with a wave vector $(k_x^i, k_y^i)$. The Fourier transform of the high-resolution image is $\tilde{I}_h$ and the Fourier transform of the low-resolution image for a particular plane wave incidence angle is $\tilde{I}_l$. In the Fourier domain, the process filters a low-pass region from the spectrum $\tilde{I}_h$ of the high-resolution image $\sqrt{I_h}e^{i\varphi_h}$. In cases with an optical element in the form of an objective lens, this region is a circular aperture with a radius of $NA^*k_0$, where $k_0$ equals $2\pi/\lambda$ (the wave number in vacuum), given by the coherent transfer function of an objective lens. In Fourier space, the location of the region corresponds to the incidence angle. For an oblique plane wave incidence with a wave vector $(k_x^i, k_y^i)$, the region is centered about a position $(-k_x^i, -k_y^i)$ in the Fourier domain of $\sqrt{I_h}e^{i\varphi_h}$.

At operation 1630, using the processor, the computed amplitude component $\sqrt{I_{lf}}$ of the low-resolution image at the in-focus plane, $\sqrt{I_{lf}}e^{i\varphi_{lf}}$, is replaced with the square root of the low-resolution intensity measurement $\sqrt{I_{lfm}}$ measured by the radiation detector. This forms an updated low resolution target: $\sqrt{I_{lfm}}e^{i\varphi_{lf}}$.

At operation 1645, the processor multiplies by an inverse phase factor $e^{-i\cdot\varphi(k_x,k_y)}$ in Fourier domain.

At operation 1650, using the processor, a Fourier transform is applied to the updated target image propagated to the sample plane: $\sqrt{I_{ls}}e^{i\varphi_{ls}}$, and this data is updated in the corresponding region of high-resolution solution $\sqrt{I_h}e^{i\varphi_h}$ in the Fourier space corresponding to the corresponding to the incidence wave vector $(k_x^i, k_y^i)$.

At operation 1660, the processor determines whether operations 1605 through 1650 have been completed for all images in the second set. If operations 1605 through 1650 have not been completed for all images, operations 1605 through 1650 are repeated for the next image in the second set of images.

At operation 1670, the processor determines whether the high-resolution solution has converged. For example, the processor may determine whether the high-resolution solution may have converged to a self-consistent solution. In one case, the processor compares the previous high-resolution solution of the previous iteration or initial guess to the present high-resolution solution, and if the difference is less than a certain value, the solution may have converged to a self-consistent solution. If processor determines that the solution has not converged, then operations 1605 through 1670 are repeated. In one embodiment, operations 1605 through 1670 are repeated once. In other embodiments, operations 1605 through 1670 are repeated twice or more. If the solution has converged, the processor transforms the converged solution in Fourier space to the spatial domain to recover a high-resolution image $\sqrt{I_h}e^{i\varphi_h}$. If the processor determines that the solution has converged at operation 1670, then the process returns.

FIG. 13 is a flowchart of an example of a reconstruction process for an EPI-FP-THICK system with components arranged according to configuration B, according to an embodiment. In this process, a high-resolution image of the sample may be computationally reconstructed from de-scattered image set $I_{2,i=1 \text{ to } N}$. The illustrated flowchart includes optional digital wavefront correction operations 1705 and 1745. Operation 1705 provides a connection between the actual sample profile and the captured intensity data (which may include aberrations) with multiplication of a pupil function: $e^{i\varphi(k_x, k_y)}$. Operation 1745 inverts this connection to determine an aberration-free reconstructed complex image of the sample. Sample defocus can be implemented by introducing the defocus phase factor to the pupil plane (i.e., a defocus aberration) according to Eqn. 3.

At operation 1705, the initial complex, higher resolution Fourier transformed image $\tilde{I}_h$ is multiplied by a phase factor $e^{i\varphi(k_x, k_y)}$ or $\exp(i\varphi(k_x,k_y))$ in the Fourier domain. At operation 1710, low-pass filtering of the higher-resolution image $\sqrt{I_h}e^{i\varphi_h}$ in the Fourier domain is performed to generate a lower resolution intensity image $\sqrt{I_l}e^{i\varphi_l}$ or $\sqrt{I_l}\exp(i\varphi_l)$ for an aperture location associated with a wave vector $(k_x^i, k_y^i)$. The Fourier transform of the higher-resolution image is $\tilde{I}_h$ and the Fourier transform of the lower resolution intensity image for a particular aperture location is $\tilde{I}_l$. In the Fourier domain, the low-pass region is filtered from the spectrum $\tilde{I}_h$ of the higher-resolution image $\sqrt{I_h}e^{i\varphi_h}$. In some cases, this low-pass region may be a circular aperture with a radius of $NA*k_0$, where $k_0$ equals $2\pi/\lambda$ (the wave number in vacuum), given by the coherent optical transfer function of an optical system (e.g., first optical system and/or second optical system). In Fourier space, the location of the low-pass region corresponds to a particular aperture location in the spatial domain.

At operation 1730, the computed amplitude component $\sqrt{I_{lf}}$ of the intensity image at the in-focus plane, $\sqrt{I_{lf}}e^{i\varphi_{lf}}$, is replaced with the square root of the intensity intensity measurement $\sqrt{I_{lfm}}$ measured by the radiation detector. This forms an updated lower resolution target: $\sqrt{I_{lfm}}e^{i\varphi_{lf}}$.

At operation 1745, the updated lower resolution target: $\sqrt{I_{lfm}}e^{i\varphi_{lf}}$ is multiplied by an inverse phase factor $e^{-i\varphi(k_x, k_y)}$ or $\exp(-1i\varphi(k_x,k_y))$ in Fourier domain. At operation 1750, a Fourier transform is applied to the updated target image propagated to the sample plane: $\sqrt{I_{ls}}e^{i\varphi_{ls}}$, and this data is updated in the corresponding region of higher-resolution solution $\sqrt{I_h}e^{i\varphi_h}$ in the Fourier space corresponding to the corresponding to the incidence wave vector $(k_x^i, k_y^i)$. At operation 1760, it is determined whether operations 1705 through 1750 have been completed for all aperture N locations. If operations 1705 through 1750 have not been completed for all aperture N locations, operations 1705 through 1750 are repeated for the next aperture location.

At operation 1770, it is determined whether the solution for the higher-resolution image has converged. If it is determined that the solution has not converged, then operations 1705 through 1770 are repeated. In one embodiment, operations 1705 through 1770 are repeated once. In other embodiments, operations 1705 through 1770 are repeated twice or more. If the solution has converged, the converged solution in Fourier space is transformed to the spatial domain to recover a higher-resolution image $\sqrt{I_h}e^{i\varphi_h}$. If it is determined that the solution has converged at operation 1770, then the method proceeds.

If the defocus distance is unknown, the EPI-FP-THICK method can digitally adjust the 'z' parameter to different values based on a computation of the auto-focusing index from Eqn. 3. The EPI-FP-THICK method can then construct the corresponding images, and select the sharpest image. This approach can also be extended to image a tiled sample. In this case, the EPI-FP-THICK method can digitally adjust the 'z' parameter to achieve acuity for each tiled region of the whole image and combine the in-focus regions to form a fully focused image of the full field of view.

In other embodiments, alternative digital multiplicative phase factors are included in multiplication operations 1705 and 1745 to correct for a variety of aberrations, as long as the factors correctly model the employed optics.

In some cases, the z-position of the sample may not be known a priori. In one aspect, this process may include a digital auto-focusing operation that determines the z-position of the sample and uses this z-position to digitally refocus. To compute the z-position of the sample, the EPI-FP-THICK method determines an auto-focusing index parameter. The auto-focusing index is defined by the following equation:

$$\text{Auto-focusing index: } 1/\Sigma \text{abs}(\sqrt{I_{lf}}-\sqrt{I_{lfm}}) \quad \text{(Eqn. 4)}$$

Where: $\sqrt{h_{lf}}$ is the amplitude image from the low-pass filtering, and $\sqrt{I_{lfm}}$ is the actual intensity measurement The summation in Eqn. 4 is for all aperture locations. After computing the estimated z-position of the sample, the process can digitally refocus to the estimated z-position. In some cases, the recovered solution of the higher-resolution image has been found to converge more quickly when using an accurate z-position.

FIG. 14 is a flowchart of an example of a reconstruction process for an EPI-FP-THICK system with components arranged according to configuration B, according to an embodiment. In this process, a high-resolution image of the sample may be computationally reconstructed from de-scattered image set $I_{2,i=1 \text{ to } N}$.

At operation 1810, low-pass filtering of the higher-resolution image $\sqrt{I_h}e^{i\varphi_h}$ in the Fourier domain is performed to generate a low-resolution image $\sqrt{I_l}e^{i\varphi_l}$ for a particular aperture location associated with a wave vector $(k_x^i, k_y^i)$. The Fourier transform of the higher-resolution image is $\tilde{I}_h$ and the Fourier transform of the low-resolution image for a particular aperture location is $\tilde{I}_l$. In the Fourier domain, the EPI-FP-THICK method filters a low-pass region from the spectrum $\tilde{I}_h$ of the higher-resolution image $\sqrt{I_h}e^{i\varphi_h}$. In cases with an optical element in the form of an objective lens, this region may be a circular aperture with a radius of $NA*k_0$, where $k_0$ equals $2\pi/\lambda$ (the wave number in vacuum), given by the coherent transfer function of an objective lens. In Fourier space, the location of the low-pass region corresponds to the aperture location. The region may be centered about a position $(-k_x^i, -k_y^i)$ in the Fourier domain of $\sqrt{I_h}e^{i\varphi_h}$.

At optional operation 1820, the low-resolution image, $\sqrt{I_l}e^{i\varphi_l}$ is propagated in the Fourier domain to the in-focus plane at z=0 of the optical element to determine the low-resolution image at the focused position: $\sqrt{I_{lf}}e^{i\varphi_{lf}}$. In one embodiment, Operation 1820 is performed by Fourier transforming the low-resolution image $\sqrt{I_l}e^{i\varphi_l}$, multiplying by a phase factor in the Fourier domain, and inverse Fourier transforming to obtain $\sqrt{I_{lf}}e^{i\varphi_{lf}}$. In another embodiment, operation 1820 is performed by the mathematically equivalent operation of convolving the low-resolution image $\sqrt{I_l}e^{i\varphi_l}$ with the point-spread-function for the defocus. In another embodiment, operation 1820 is performed as an optional sub-operation of operation 1810 by multiplying by multiplying $\tilde{I}_l$ by a phase factor in the Fourier domain before performing the inverse Fourier transform to produce $\sqrt{I_{lf}}e^{i\varphi_{lf}}$. Optional operation 1820 need not be included if the sample is located at the in-focus plane (z=0) of the optical element.

At operation 1830, the computed amplitude component $\sqrt{I_{lf}}$ of the low-resolution image at the in-focus plane, $\sqrt{I_{lf}}e^{i\varphi_{lf}}$, is replaced with the square root of the low-resolution intensity measurement $\sqrt{I_{lfm}}$ measured by the radiation detector of the EPI-FP-THICK system. This forms an updated low resolution target: $\sqrt{I_{lfm}}e^{i\varphi_{lf}}$.

At optional operation 1840, the updated low-resolution image $\sqrt{I_{lfm}}e^{i\varphi_{lf}}$ may be back-propagated propagated to the sample plane (z=$z_0$) to determine $\sqrt{I_{ls}}e^{i\varphi_{ls}}$. Optional operation 1840 need not be included if the sample is located at the in-focus plane of the optical element, that is, where $z_0$=0. In one case, operation 1840 is performed by taking the Fourier transform of the updated low-resolution image $\sqrt{I_{lfm}}e^{i\varphi_{lf}}$ and multiplying in the Fourier space by a phase factor, and then inverse Fourier transforming it. In another case, operation 1840 is performed by convolving the updated low-resolution image $\sqrt{I_{lfm}}e^{i\varphi_{lf}}$ with the point-spread-function of the defocus. In another case, operation 1840 is performed as a sub-operation of operation 1850 by multiplying by a phase factor after performing the Fourier transform onto the updated target image.

At operation 1850, a Fourier transform is applied to the updated target image propagated to the sample plane: $\sqrt{I_{lfm}}e^{i\varphi_{ls}}$, and this data is updated in the corresponding region of higher-resolution solution $\sqrt{I_h}e^{i\varphi_{ls}}$ in the Fourier space corresponding to the corresponding to the incidence wave vector ($k_x^i$, $k_y^i$) and associate aperture location.

At operation 1860, it is determined whether operations 1810 through 1860 have been completed for all N aperture locations. If operations 1810 through 1860 have not been completed for all N aperture locations, operations 1810 through 1860 are repeated for the next aperture location.

At operation 1870, it is determined whether the solution for the higher-resolution image has converged. For example, convergence may be determined if the higher-resolution complex image is a self-consistent solution. In one case, the previous higher-resolution complex image of the previous iteration or initial guess is compared to the present higher-resolution solution, and if the difference is less than a certain value, the solution may have converged to a self-consistent solution. If it is determined that the solution has not converged, then operations 1810 through 1870 are repeated. In one embodiment, operations 1810 through 1860 are repeated once. In other embodiments, operations 1810 through 1860 are repeated twice or more. If the solution has converged, the processor transforms the converged solution in Fourier space to the spatial domain to recover a higher-resolution image $\sqrt{I_h}e^{i\varphi_h}$. If the processor determines that the solution has converged at operation 1870, then the process may proceed.

V. Subsystems

Figure 15:
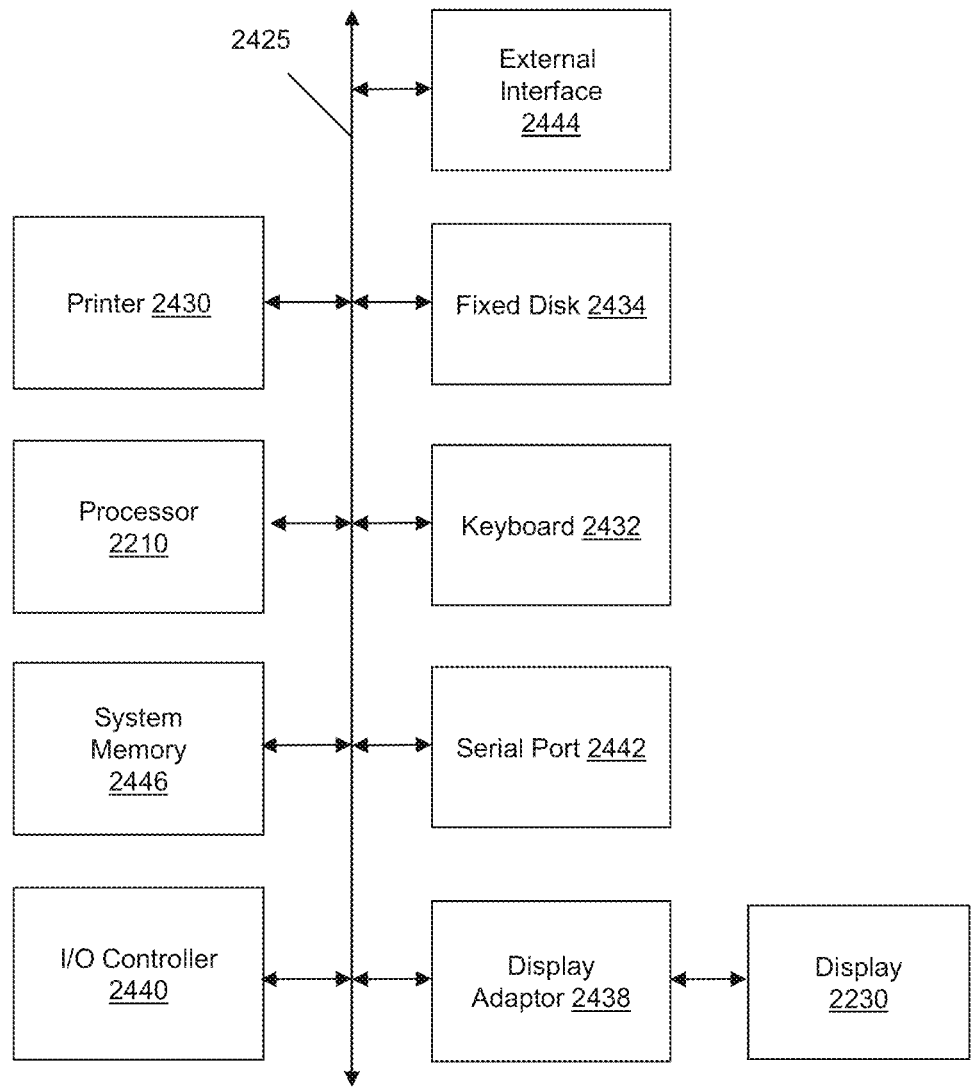
FIG. 15 is a block diagram of one or more subsystems that may be present in certain epi-illumination Fourier ptychographic imaging systems for high resolution imaging of thick samples, according to embodiments.

FIG. 15 is a block diagram of one or more subsystems that may be present in certain EPI-FP-THICK systems, according to embodiments. In certain aspects, a processor may be a component of the radiation detector.

The various components previously described in the Figures may operate using one or more of the subsystems to facilitate the functions described herein. Any of the components in the Figures may use any suitable number of subsystems to facilitate the functions described herein. Examples of such subsystems and/or components are shown in a FIG. 15. The subsystems shown in FIG. 15 are interconnected via a system bus 2425. Additional subsystems such as a printer 2430, keyboard 2432, fixed disk 2434 (or other memory comprising computer readable media), display 2456, which is coupled to display adapter 2438, and others are shown. Peripherals and input/output (I/O) devices, which couple to I/O controller 2440, can be connected by any number of means known in the art, such as serial port 2442. For example, serial port 2442 or external interface 2444 can be used to connect components to a wide area network such as the Internet, a mouse input device, or a scanner. The interconnection via system bus 2425 allows the processor to communicate with each subsystem and to control the execution of instructions from system memory 2446 or the fixed disk 2434, as well as the exchange of information between subsystems. The system memory 2446 and/or the fixed disk 2434 may embody the CRM 2454 in some cases. Any of these elements may be present in the previously described features.

In some embodiments, an output device such as the printer 2430 or display of the EPI-FP-THICK system can output various forms of data. For example, the EPI-FP-THICK system can output 2D color/monochromatic images (intensity and/or phase), data associated with images, or other data.

Modifications, additions, or omissions may be made to any of the above-described embodiments without departing from the scope of the disclosure. Any of the embodiments described above may include more, fewer, or other features without departing from the scope of the disclosure. Additionally, the operations of the described methods may be performed in any suitable order without departing from the scope of the disclosure.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a CRM, such as a random access memory (RAM), a read only memory (ROM), a magnetic medium such as a hard-drive or a floppy disk, or an optical medium such as a CD-ROM. Any such CRM may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. An epi-illumination Fourier ptychographic imaging system for high resolution imaging of thick samples, the system comprising:
a variable illumination source configured to provide plane wave illumination sequentially at each one of a plurality of incidence angles;
a first polarizer system having a first polarizing filter configured to polarize the plane wave illumination from the variable illumination source to a first polarization state incident upon a sample being imaged during operation;
collection optics configured to receive radiation issuing from the sample being imaged, wherein the collection optics are located to the same side of the sample from which the variable illumination source provides the plane wave illumination;
a second polarizer system configured to receive radiation passed through the collection optics, the second polarizer system having a second polarizing filter in a first orientation and a third polarizing filter in a second orientation orthogonal to the first orientation;
a radiation detector configured to receive radiation from the second polarizer system, the radiation detector configured to acquire a first sequence of intensity images of the sample based at least in part on radiation from the first polarizer system and a second sequence of intensity images of the sample based at least in part on radiation from the second polarizer system, wherein each intensity image of each of the first and second sequences of intensity images corresponds to a different incidence angle of the plurality of incidence angles; and
a processor configured to determine a sequence of de-scattered surface intensity images from the first sequence of intensity images and the second sequence of intensity images.

2. The system of claim 1, wherein the processor is further configured to determine the sequence of de-scattered surface intensity images by determining the difference between each intensity image in the first sequence and each corresponding intensity image of the second sequence.

3. The system of claim 1, wherein the processor is further configured to construct a higher resolution image of the sample by iteratively combining the sequence of de-scattered surface intensity images in Fourier space, the higher resolution image having higher resolution than resolution of the first and second sequences of intensity images.

4. The system of claim 3, wherein the processor constructs the higher resolution image of the sample using a Fourier ptychographic reconstruction process.

5. The system of claim 1, wherein the first polarizer system comprises a polarizer film disposed over the variable illumination source.

6. The system of claim 1, wherein the radiation issuing from the sample is diffracted radiation.

7. The system of claim 1, wherein the plane wave illumination from the variable illumination source is one of visible light, infrared light, microwave radiation, acoustic radiation, and x-ray radiation.

8. The system of claim 1, wherein the second polarizing filter while in the first orientation is configured to pass radiation in the first polarization state and the third polarizing filter while in the second orientation is configured to pass radiation in a second polarization state.

9. The system of claim 8,
wherein the first polarizer system comprises a plurality of first polarizer elements, and
wherein the second polarizer system comprises a pattern of interleaved first polarizer elements and a plurality of second polarizer elements.

10. The system of claim 9, wherein the second polarizer system comprises a polarizer film disposed over the radiation detector.

11. The system of claim 10, wherein the pattern is a checkboard pattern.

12. The system of claim 1, wherein the processor constructs the higher resolution image of the sample using a Fourier ptychographic reconstruction process that includes multiplying an initial high resolution image by a pupil function in the Fourier domain.

13. An epi-illumination Fourier ptychographic imaging system for high resolution imaging of thick samples, the system comprising:
a variable illumination source configured to provide plane wave illumination sequentially at each one of a plurality of incidence angles;
a first polarizer system having a first polarizing filter configured to polarize radiation received from the variable illumination source to a first polarization state incident upon a sample;
collection optics configured to receive radiation issuing from the sample, wherein the collection optics are located to the same side of the sample from which the variable illumination source provides the plane wave illumination;
a second polarizer system configured to receive radiation passed through the collection optics, the second polarizer system having a second polarizing filter configured to rotate between a first orientation and a second orientation orthogonal to the first orientation;
a radiation detector configured to receive radiation from the second polarizer system, the radiation detector configured to acquire a first sequence of intensity images of the sample while the second polarizing filter is in the first orientation and a second sequence of intensity images of the sample while the second polarizing filter is in the second orientation, wherein each intensity image of each of the first and second sequences of intensity images corresponds to a different incidence angle of the plurality of incidence angles; and
a processor configured to determine a sequence of de-scattered surface intensity images from the first sequence of intensity images and the second sequence of intensity images.

14. The system of claim 13, wherein the processor is further configured to determine the sequence of de-scattered surface intensity images by determining the difference between each intensity image in the first sequence and each corresponding intensity image of the second sequence.

15. The system of claim 13, wherein the processor is further configured to construct a higher resolution image of the sample by iteratively combining the sequence of de-scattered surface intensity images in Fourier space.

16. The system of claim 15, wherein the processor constructs the higher resolution image of the sample using a Fourier ptychographic reconstruction process.

17. The system of claim 13, wherein the first polarizer system comprises a polarizer film disposed over the variable illumination source.

18. The system of claim 13, wherein the radiation issuing from the sample is diffracted radiation.

19. The system of claim 13, wherein the plane wave illumination from the variable illumination source is one of visible light, infrared light, microwave radiation, acoustic radiation, and x-ray radiation.

* * * * *